(12) United States Patent
Waller et al.

(10) Patent No.: US 10,726,800 B2
(45) Date of Patent: Jul. 28, 2020

(54) GENERATING QUINCUNX VIDEO STREAMS FOR LIGHT MODULATING BACKPLANES WITH CONFIGURABLE MULTI ELECTRODE PIXELS

(71) Applicants: Craig Michael Waller, Dallas, TX (US); Eric Paul Eisenbrandt, Allen, TX (US)

(72) Inventors: Craig Michael Waller, Dallas, TX (US); Eric Paul Eisenbrandt, Allen, TX (US)

(73) Assignee: Syndiant, Inc., Dallas, TX (US)

( * ) Notice: Subject to any disclaimer, the term of this patent is extended or adjusted under 35 U.S.C. 154(b) by 0 days.

(21) Appl. No.: 16/261,512

(22) Filed: Jan. 29, 2019

(65) Prior Publication Data
US 2019/0156767 A1    May 23, 2019

Related U.S. Application Data

(63) Continuation-in-part of application No. 15/984,297, filed on May 18, 2018, which is a continuation-in-part of application No. 15/433,947, filed on Feb. 15, 2017, now Pat. No. 10,002,576, which is a continuation of application No. 14/273,550, filed on May 9, 2014, now Pat. No. 9,613,573.

(51) Int. Cl.
*G02F 1/01* (2006.01)
*G09G 3/36* (2006.01)
*G02F 1/1362* (2006.01)
*G02F 1/29* (2006.01)
*G02F 1/1343* (2006.01)

(52) U.S. Cl.
CPC ............ *G09G 3/36* (2013.01); *G02F 1/1362* (2013.01); *G02F 1/136277* (2013.01); *G02F 1/29* (2013.01); *G02F 1/1343* (2013.01)

(58) Field of Classification Search
CPC .... G02F 1/1362; G02F 1/136277; G02F 1/29; G02F 1/1343
See application file for complete search history.

(56) References Cited

U.S. PATENT DOCUMENTS

2014/0112394 A1* 4/2014 Sullivan ................. H04N 19/46
375/240.26

* cited by examiner

*Primary Examiner* — Joseph P Martinez
(74) *Attorney, Agent, or Firm* — Edward S. Mao

(57) ABSTRACT

A method to generate a quad-quincunx video stream is disclosed. The method generates a quad-quincunx video stream from a high resolution video stream by generating a first first-type quincunx field from a first high resolution video frame, a first second-type quincunx field from a second high resolution video frame, a first third-type quincunx field from a third high resolution video frame, and a first fourth-type quincunx field from a fourth high resolution video frame.

20 Claims, 43 Drawing Sheets

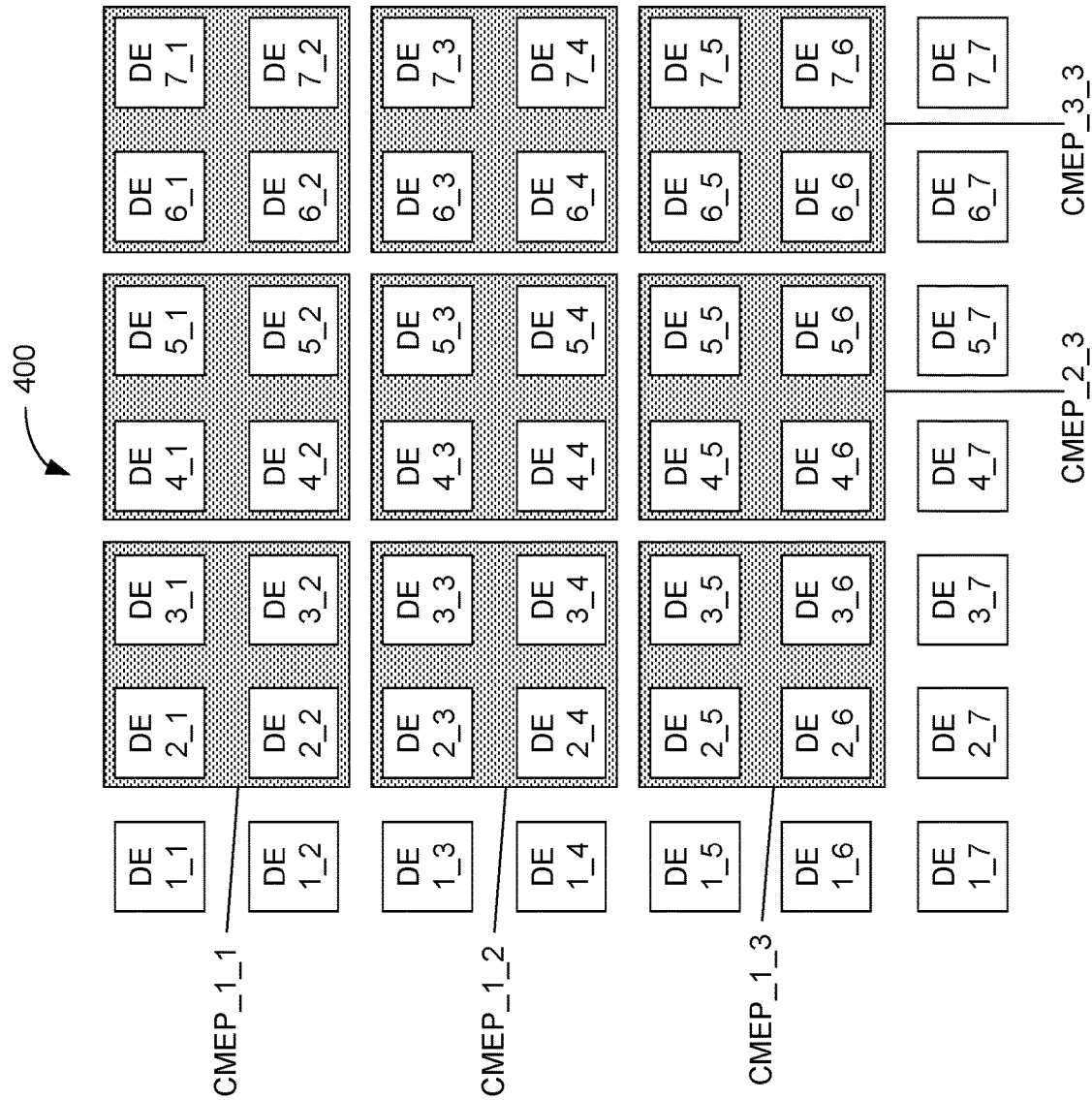

| QEP(0,0) = HRP(0,0) | QEP(1,0) = HRP(2,0) | QEP(2,0) = HRP(4,0) |
|---|---|---|
| QEP(0,1) = HRP(0,2) | QEP(1,1) = HRP(2,2) | QEP(2,1) = HRP(4,2) |

QEF_1000

FIG. 10B

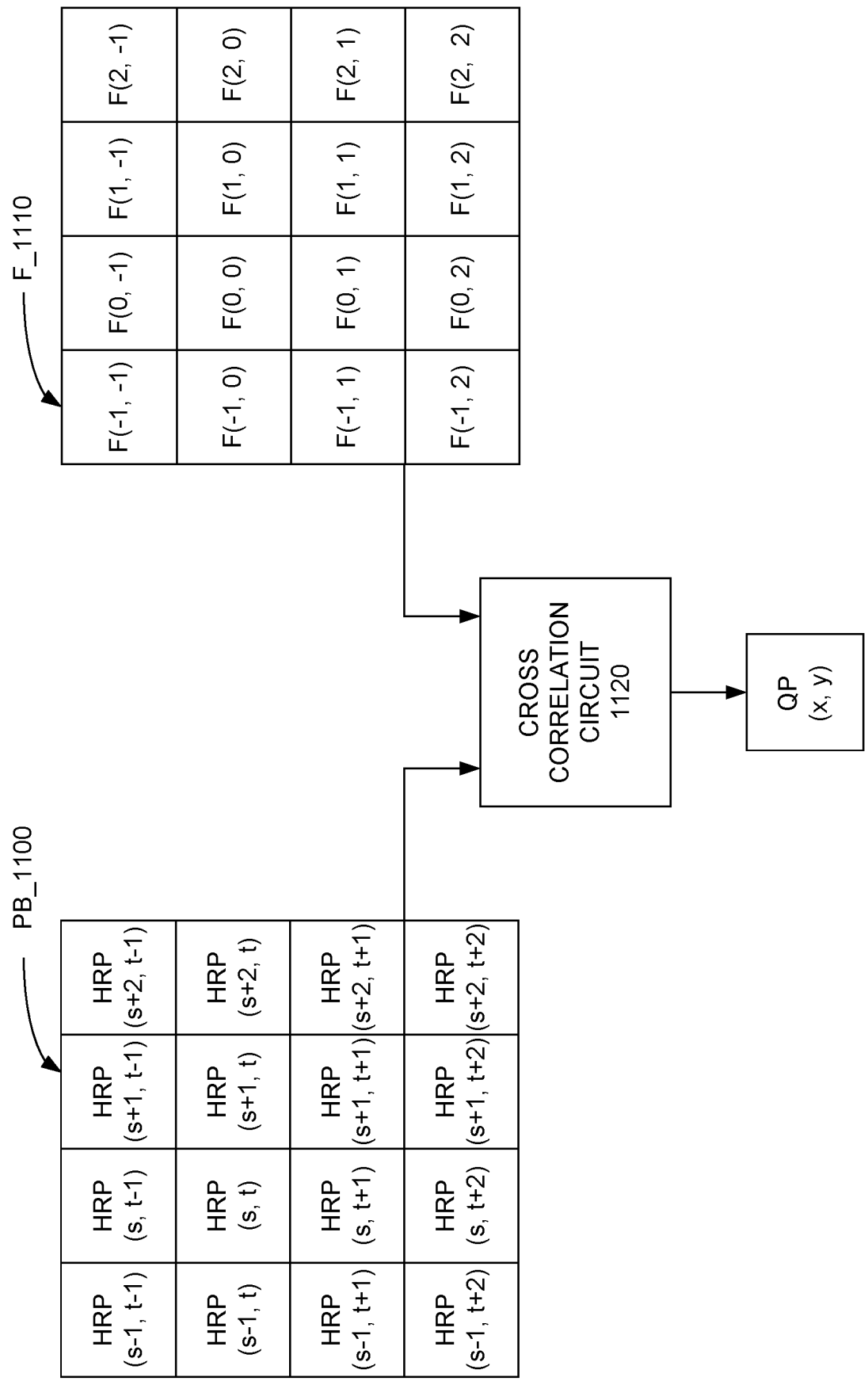

| F(-1, -1) = 0 | F(0, -1) = -1/32 | F(1, -1) = -1/32 | F(2, -1) = 0 |
|---|---|---|---|
| F(-1, 0) = -1/32 | F(0, 0) = 5/16 | F(1, 0) = 5/16 | F(2, 0) = -1/32 |
| F(-1, 1) = -1/32 | F(0, 1) = 5/16 | F(1, 1) = 5/16 | F(2, 1) = -1/32 |
| F(-1, 2) = 0 | F(0, 2) = -1/32 | F(1, 2) = -1/32 | F(2, 2) = 0 |

| F(-1, -1) = -1/28 | F(0, -1) = -1/28 | F(1, -1) = -1/28 | F(2, -1) = -1/28 |
|---|---|---|---|
| F(-1, 0) = -1/28 | F(0, 0) = 5/14 | F(1, 0) = 5/14 | F(2, 0) = -1/28 |
| F(-1, 1) = -1/28 | F(0, 1) = 5/14 | F(1, 1) = 5/14 | F(2, 1) = -1/28 |
| F(-1, 2) = -1/28 | F(0, 2) = -1/28 | F(1, 2) = -1/28 | F(2, 2) = -1/28 |

|   |   |
|---|---|
| F(0, 0) = 1/4 | F(1, 0) = 1/4 |
| F(0, 1) = 1/4 | F(1, 1) = 1/4 |

|   |   |
|---|---|
| HRP (s, t) | HRP (s+1, t) |
| HRP (s, t+1) | HRP (s+1, t+1) |

QTRF_1700

| QTRP(0,0) = HRP(1,0) | QTRP(1,0) = HRP(3,0) | QTRP(2,0) = HRP(5,0) |
|---|---|---|
| QTRP(0,1) = HRP(1,2) | QTRP(1,1) = HRP(3,2) | QTRP(2,1) = HRP(5,2) |

FIG. 17B

QTLF_1700

| QTLP(0,0) = HRP(0,0) | QTLP(1,0) = HRP(2,0) | QTLP(2,0) = HRP(4,0) |
|---|---|---|
| QTLP(0,1) = HRP(0,2) | QTLP(1,1) = HRP(2,2) | QTLP(2,1) = HRP(4,2) |

FIG. 17A

| QBRP(0,0) = HRP(1,1) | QBRP(1,0) = HRP(3,1) | QBRP(2,0) = HRP(5,1) |
|---|---|---|
| QBRP(0,1) = HRP(1,3) | QBRP(1,1) = HRP(3,3) | QBRP(2,1) = HRP(5,3) |

QTRF_1700

FIG. 17D

| QBLP(0,0) = HRP(0,1) | QBLP(1,0) = HRP(2,1) | QBLP(2,0) = HRP(4,1) |
|---|---|---|
| QBLP(0,1) = HRP(0,3) | QBLP(1,1) = HRP(2,3) | QBLP(2,1) = HRP(4,3) |

QTLF_1700

GENERATING QUINCUNX VIDEO STREAMS FOR LIGHT MODULATING BACKPLANES WITH CONFIGURABLE MULTI ELECTRODE PIXELS

RELATED APPLICATIONS

This application is a continuation-in-part of U.S. application Ser. No. 15/984,297 entitled "Generating Quincunx Video Streams for Light Modulating Backplanes with Configurable Multi Electrode Pixels" filed by Craig Michael Waller, and Eric Paul Eisenbrandt, and Timothy Randall Rost, on May 18, 2018. application Ser. No. 15/984,297 is a continuation-in-part of U.S. application Ser. No. 15/433,947 entitled "LIGHT MODULATING BACKPLANE WITH CONFIGURABLE MULTI-ELECTRODE PIXELS" filed by Andrew Ian Russell, Craig Michael Waller, and Eric Paul Eisenbrandt, on Feb. 15, 2017. application Ser. No. 15/433,947 is a continuation of U.S. application Ser. No. 14/273,550 entitled "LIGHT MODULATING BACKPLANE WITH CONFIGURABLE MULTI-ELECTRODE PIXELS" filed by Andrew Ian Russell, Craig Michael Waller, and Eric Paul Eisenbrandt, on May 9, 2014, which issued as U.S. Pat. No. 9,513,573 on Apr. 4, 2017.

BACKGROUND OF THE INVENTION

Field of the Invention

The present invention relates to display technology. More specifically, the present invention relates to digital backplanes that control light modulating elements, spatial light modulators and light sources.

Discussion of Related Art

Micro-displays typically include light modulating backplane and a light modulating unit or a light emitting unit. Light modulating units include such technologies as liquid crystal on silicon (LCOS) and digital micro mirrors devices (DMD). Light emitting units include technologies such as Organic light emitting diodes (OLED). The technology used in such micro displays can also be used to make larger display units.

FIGS. 1A and 1B illustrate a small portion of a conventional LCOS display 100. Specifically, FIG. 1B only shows 24 pixels of LCOS display 100. Generally, a LCOS display would have millions of pixels. FIG. 1A is a cross sectional view of display 100 along the A A' cut shown in FIG. 1B. However FIG. 1B shows only one layer of LCOS display 100.

In FIG. 1A, a substrate 110 supports pixel control circuits PCC_1_1, PCC_2_1, PCC_3_1, PCC_4_1, PCC_5_1, and PCC_6_1. Above the pixel control circuits are pixel electrodes PE_1_1, PE_2_1, PE_3_1, PE_4_1, PE_5_1, and PE_6_1. Each pixel electrode PE_X_Y is coupled to and controlled by pixel control circuit PCC_X_Y. Thus, pixel electrode PE_1_1 is coupled to and controlled by pixel control circuit PCC_1_1. Similarly, electrodes PE_2_1, PE_3_1, PE_4_1, PE_5_1, and PE_6_1 are coupled to and controlled by pixel control circuits PCC_2_1, PCC_3_1, PCC_4_1, PCC_5_1, and PCC_6_1, respectively. For LCOS display 100, the pixel electrodes are made of a reflective conductor to reflect incoming light as explained below. As shown in FIG. 1B, the polarized electrodes are arranged in a rectangular matrix. For clarity the pixel electrodes are PE_X_Y, where X refers to the column location of the pixel electrode and Y refers to the row location of the pixel electrode.

Substrate 110 would also include various, logic circuits to support the operation of the pixel control circuits. For clarity these logic circuits are omitted in the Figures because the omitted logic circuits, which are well known in the art, are not an integral aspect of the present invention. Substrate 110, the pixel control circuits, the pixel electrodes and the omitted logic circuits form the light modulating backplane. An example of a light modulating backplane is described in U.S. Pat. No. 7,071,908, entitled "Digital Backplane" by Guttag et al., which is included herein by reference. Another example of a light modulating backplane is described in U.S. Pat. No. 8,605,015 entitled "Spatial Light Modulator with Masking Comparators" by Guttag et al., which is incorporated herein by reference.

The light modulating unit of LCOS display 100 includes a liquid crystal layer 120, an alignment layer 130, a transparent common electrode layer 140, and a protective glass layer 150. Protective glass layer 150 protects the rest of LCOS display 100 but typically does not manipulate incoming or reflected light. Transparent common electrode layer 140 works with the pixel electrodes to manipulate the liquid crystals in liquid crystal layer 120. Alignment layer 130 aligns the liquid crystals in liquid crystal layer 120 to properly manipulate incoming and reflected light. Liquid crystal layer 120 contains liquid crystals that are controlled by the pixel electrodes to selectively pass incoming polarized light through liquid crystal layer 120. Specifically, when a pixel electrode is charged to an "active state" by the corresponding pixel control circuit polarized light can pass through the area of liquid crystal layer 120 above the pixel electrode and be reflected back by the pixel electrode. However, if the pixel electrode is in an inactive state polarized light is blocked in the area of liquid crystal layer 120 above the pixel electrode. Pulse width modulation is used to create different contrast levels. For color displays, color filters can be included in the light modulating unit or field sequential color schemes (i.e. rapidly cycling through three different colored light sources).

The transition from standard definition video to high definition video and beyond has created a great demand for higher resolution displays. However, for light modulating backplanes the size of the pixel control circuits is becoming a limiting factor for the density of pixels in a light modulating backplane. Thus, to create higher resolution light modulating backplanes using conventional techniques, the overall size of the light modulating backplane must be increased. However, increasing the size of the light modulating backplane would also increase the cost and power consumption. Hence there is a need for a method or system create high resolution light modulating backplanes and a need for an efficient way to generate the appropriate video stream for the displays.

SUMMARY

Accordingly, the present invention provides a novel method to generate quad-quincunx video streams for use with high resolution light modulating backplane with configurable multi-electrode pixels. A quad-quincunx video stream is generated from a high resolution video stream by generating a first first-type quincunx field from a first high resolution video frame, generating a first second-type quincunx field from a second high resolution video frame, generating a first third-type quincunx field from a third high resolution video frame, and generating a first fourth-type quincunx field from a fourth high resolution video frame. The first second-type quincunx field follows the first first-type quincunx field in the quad quincunx video stream. The first third-type quincunx field follows the first second-type quincunx field in the quincunx video stream and the first fourth-type quincunx field follows the first third-type quincunx field in the quad-quincunx video stream. In a specific embodiment of the present invention the first first-type quincunx field is a top left quincunx field, the first second-type quincunx field is a bottom right quincunx field, the first third-type quincunx field is a top right quincunx field, and the first fourth-type quincunx field is a bottom left quincunx field.

In another embodiment of the present invention, the quad-quincunx video stream is enhanced by generating a second third-type quincunx field from the first high resolution frame, generating a second fourth-type quincunx field from the second high resolution frame, generating a second first-type quincunx field from the third high resolution video frame, and generating a second second-type quincunx field from the fourth high resolution video frame. The second third-type quincunx field precedes the first second-type quincunx field, the second-fourth-type quincunx field precedes the first third-type quincunx field, the second first-type quincunx field precedes the first third-type quincunx field and the second second-type quincunx field precedes the first fourth type quincunx field.

The present invention will be more fully understood in view of the following description and drawings.

BRIEF DESCRIPTION OF THE DRAWINGS

FIGS. 4A-4E is an illustration of a portion of a light modulating backplane in accordance with one embodiment of the present invention.

FIGS. 10A, 10B, and 10C illustrate the relationship of quincunx pixels and high resolution pixels.

FIG. 11 illustrates how a quincunx pixel is created using a smoothing filter in accordance with one embodiment of the present invention.

FIGS. 12A, 12B, and 12C are smoothing filters in accordance to some embodiments of the present invention.

FIGS. 14A and 14B, show the pixel block and smoothing filter used in another embodiment of the present invention.

FIGS. 17A-17D illustrate the relationship of quincunx pixels and high resolution pixels.

DETAILED DESCRIPTION

As explained above, the resolution of conventional light modulating backplanes are limited by the size of the pixel control circuits, the desired power consumption, or support memory of millions of pixels. However light modulating backplanes in accordance with embodiments of the present have an effective resolution greater than the number pixel control circuits. Configurable multi-electrode pixels are used with interlacing schemes so that a single pixel control circuit controls different pixels in different frames.

Figure 1A:
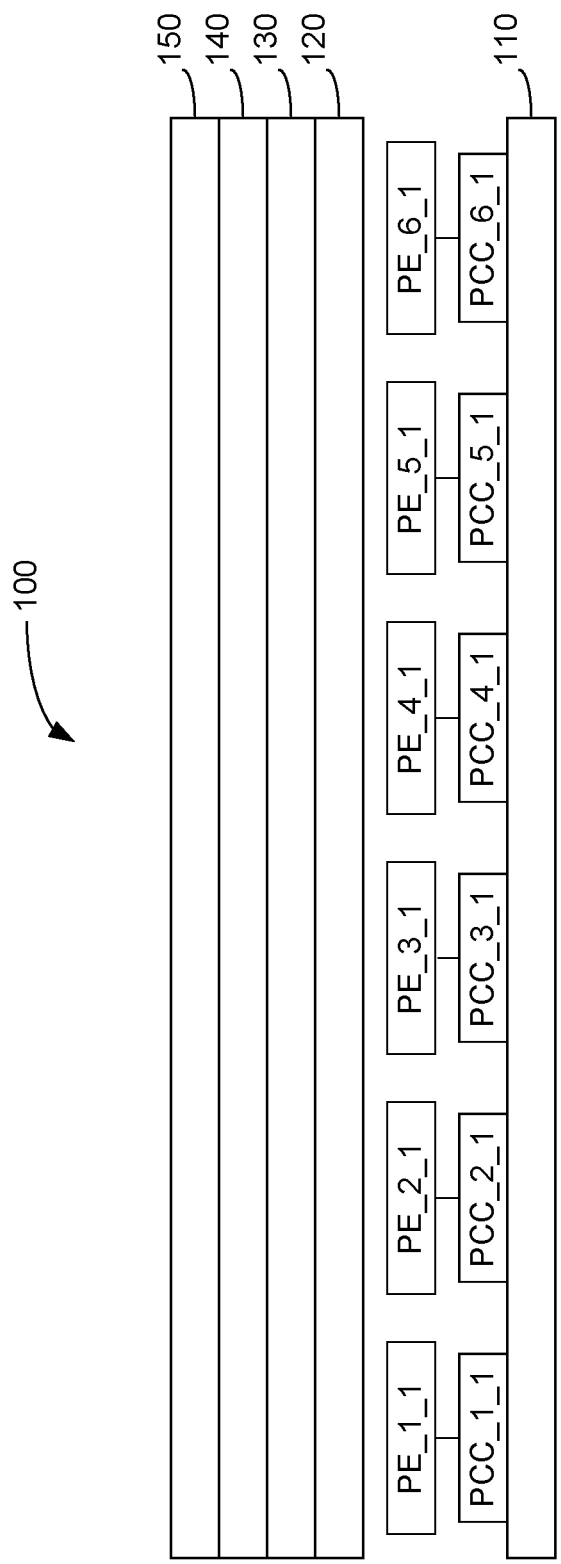
FIGS. 1A-1B illustrate a portion of a conventional LCOS display.
Figure 1B:
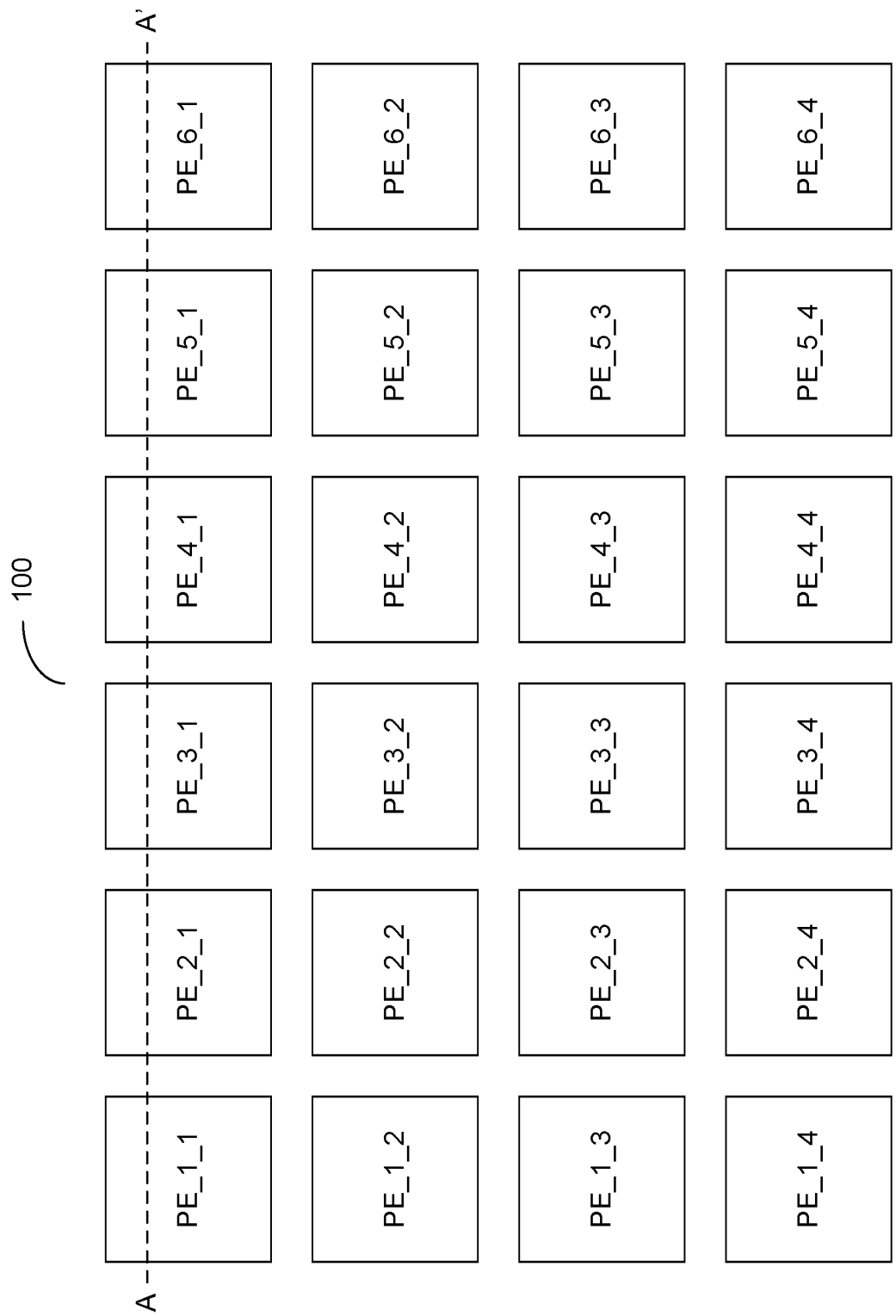
Figure 2A:
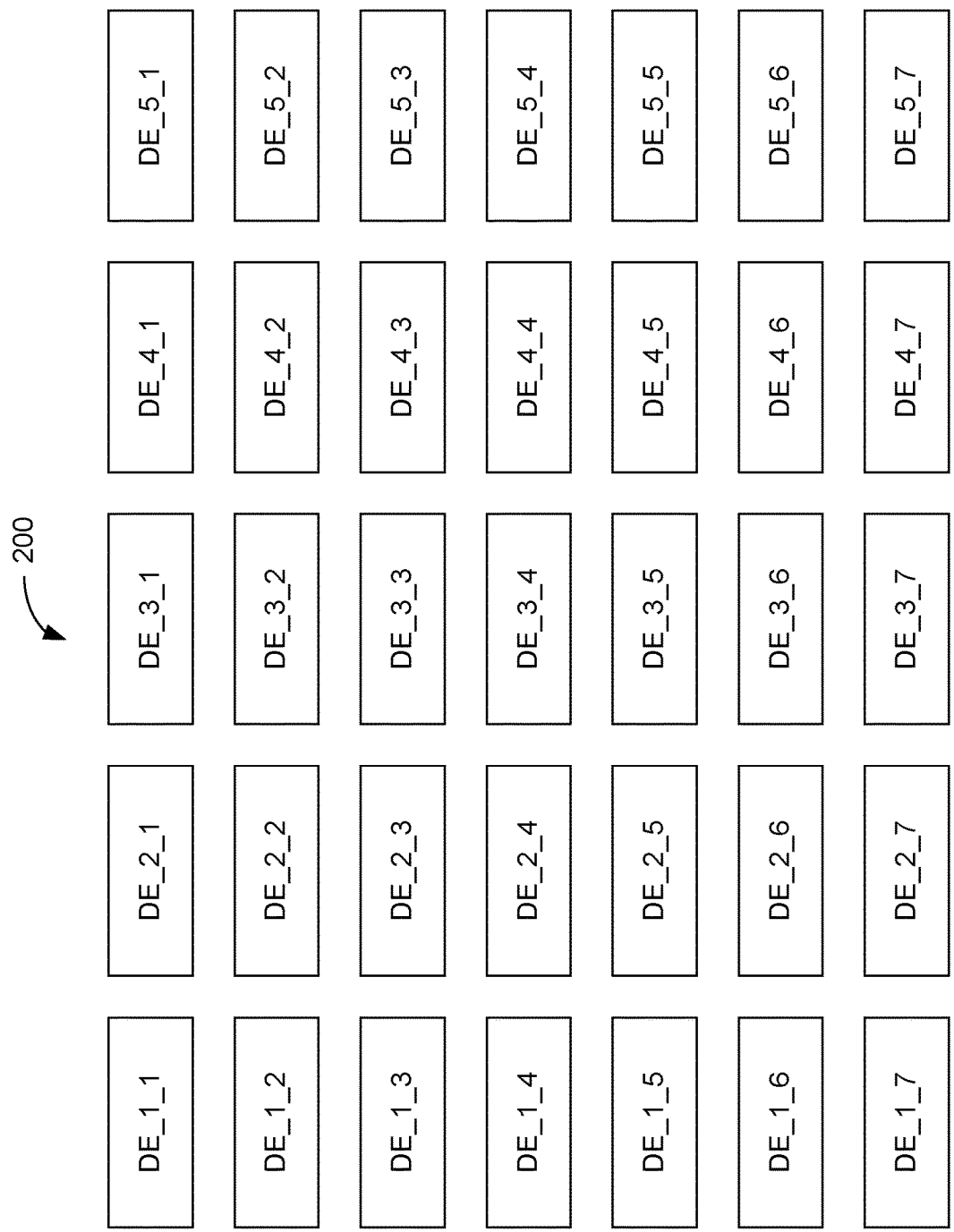
FIGS. 2A-2C is an illustration of a portion of a light modulating backplane in accordance with one embodiment of the present invention.
Figure 2B:
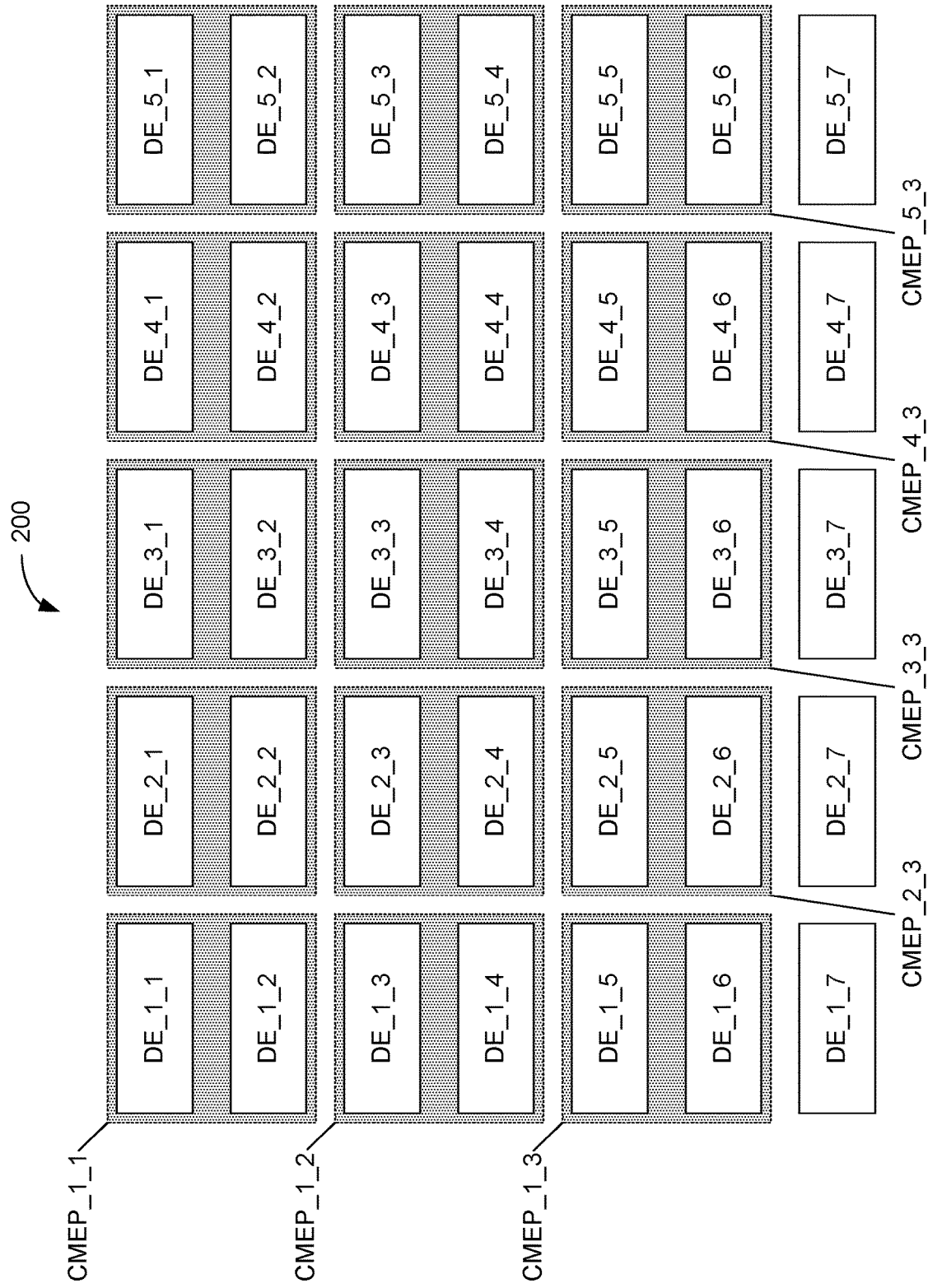
Figure 2C:
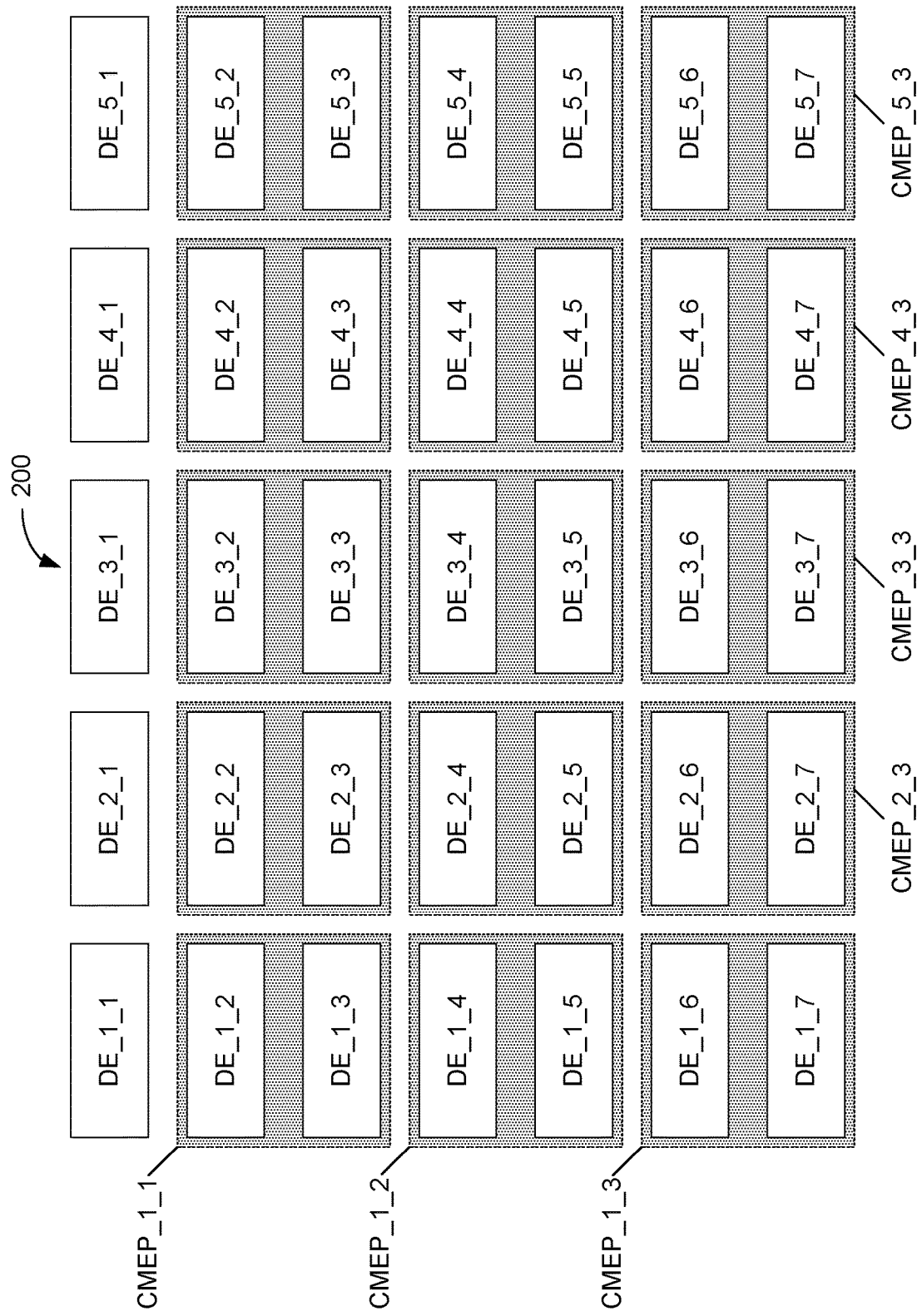

As illustrated in FIG. 2A, a light modulating backplane 200 includes a plurality of dot electrodes in a matrix. The dot electrodes are labeled DE_X_Y, where X refers to the column location of the dot electrode and Y refers to the row location of the dot electrode. FIG. 2A only shows a small portion of light modulating backplane 200. Specifically, 7 rows and 5 columns of dot electrodes are illustrated. In light modulating backplane 200, each dot electrode DE_X_Y has a rectangular shape, with a larger width than height. Light modulating backplane 200 uses novel configurable multi-electrode pixels and a bob interlacing to increase the effective resolution of light modulating backplane 200 as illustrated in FIGS. 2B and 2C. In bob interlacing, a frame of a video are converted into fields which contain only half the rows of the original frame. The fields are alternating even fields and odd fields, in which the even fields contain even rows of a frame and the odd fields contain the odd rows of a frame. The alternating fields appear to eye to be a full frame. FIG. 2B illustrates the arrangement of the configurable multi-electrode pixels during odd fields and FIG. 2C illustrates the arrangement of the configurable multi-electrode pixels during even fields. In FIG. 2B, fifteen of the configurable multi-electrode pixels are shown. To better illustrate each configurable multi-electrode pixel, the area of each configurable multi-electrode pixel is shaded; this shading is only for illustrative purposes in FIG. 2B and has no functional significance. Specifically, configurable multi-electrode pixel CMEP_1_1 include dot electrodes DE_1_1 and DE_1_2, configurable multi-electrode pixel CMEP_1_2 include dot electrodes DE_1_3 and DE_1_4, configurable multi-electrode pixel CMEP_1_3 include dot electrodes DE_1_5 and DE_1_6, configurable multi-electrode pixel CMEP_2_3 include dot electrodes DE_2_5 and DE_2_6, configurable multi-electrode pixel CMEP_3_3 include dot electrodes DE_3_5 and DE_3_6, configurable multi-electrode pixel CMEP_4_3 include dot electrodes DE_4_5 and DE_4_6, configurable multi-electrode pixel CMEP_5_3 include dot electrodes DE_5_5 and DE_5_6, and in general configurable multi-electrode pixel CMEP_X_Y includes dot electrodes DE_X_2*Y and DE_X_(2*Y−1). For even fields, as illustrated in FIG. 2C configurable multi-electrode pixel CMEP_1_1 include dot electrodes DE_1_2 and DE_1_3, configurable multi-electrode pixel CMEP_1_2 include dot electrodes DE_1_4 and DE_154, configurable multi-electrode pixel CMEP_1_3 include dot electrodes DE_1_5 and DE_1_6, configurable multi-electrode pixel CMEP_2_3 include dot electrodes DE_2_6 and DE_2_7, configurable multi-electrode pixel CMEP_3_3 include dot electrodes DE_3_6 and DE_3_7, configurable multi-electrode pixel CMEP_4_3 include dot electrodes DE_4_6 and DE_4_7, configurable multi-electrode pixel CMEP_5_3 include dot electrodes DE_5_6 and DE_5_7 and in general configurable multi-electrode pixel CMEP_X_Y includes dot electrodes DE_X_2*Y and DE_X_(2*Y+1). Thus, the rows of configurable multi-electrode pixels in FIG. 2B and FIG. 3B are vertically offset by a dot electrode. This offset improves the quality of the interlaced image to the human eye.

Figure 3:
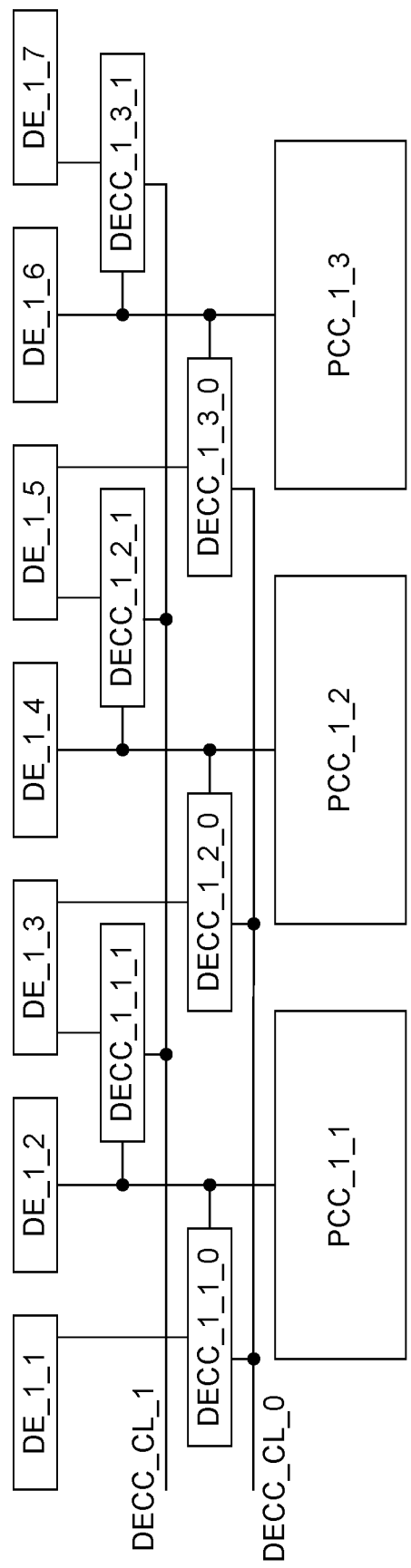
FIG. 3 is a schematic illustration of a portion of a light modulating backplane in accordance with one embodiment of the present invention.

Conventional light modulating backplanes that make use of interlacing, still include a pixel control circuit for each dot electrode. However, in light modulating backplane 200 in accordance with one embodiment of the present invention, only about half the number of pixel control circuits are used. FIG. 3 is a schematic diagram of a portion of a column of light modulating backplane 200 in accordance with one embodiment of the present invention. FIG. 3 includes pixel control circuits PCC_1_1, PCC_1_2, and PCC_1_3, dot electrodes DE_1_1, DE_1_2, DE_1_3, DE_1_4, DE_1_5,1 DE_1_6, and DE_1_7, dot electrode connection circuits DECC_1_1_0, DECC_1_1_1, DECC_1_2_0, DECC_1_2_1, DECC_1_3_0, and DECC_1_3_1, and dot electrode connection circuit control lines DECC_CL_1_0 and DECC_CL_1_1.

Pixel control circuit PCC_1_1, which is part of configurable multi-electrode pixel CMEP_1_1 in FIGS. 2B and 2C, is coupled to dot electrode DE_1_2. Dot electrode connection circuit DECC_1_1_0 is coupled between pixel control circuit PCC_1_1 and dot electrode DE_1_1. Dot electrode connection circuit DECC_1_1_1 is coupled between pixel control circuit PCC_1_1 and dot electrode DE_1_3. For odd fields (See FIG. 2B), dot electrode connection circuit DECC_1_1_0 is put in an active state (i.e. conducting) and electrically connects dot electrode DE_1_1 to pixel control circuit PCC_1_1. Conversely, dot electrode connection circuit DECC_1_1_1 is put in an inactive state (i.e. non-conducting) and electrically isolates dot electrode DE_1_3 from pixel control circuit PCC_1_1. For even fields (see FIG. 2C), dot electrode connection circuit DECC_1_1_0 is put in the inactive state and electrically isolates dot electrode DE_1_1 from pixel control circuit PCC_1_1. Conversely, dot electrode connection circuit DECC_1_1_1 is put in the active state and electrically connects dot electrode DE_1_3 to pixel control circuit PCC_1_1.

Pixel control circuit PCC_1_2, which is part of configurable multi-electrode pixel CMEP_1_2 in FIGS. 2B and 2C, is coupled to dot electrode DE_1_4. Dot electrode connection circuit DECC_1_2_0 is coupled between pixel control circuit PCC_1_2 and dot electrode DE_1_3. Dot electrode connection circuit DECC_1_2_1 is coupled between pixel control circuit PCC_1_2 and dot electrode DE_1_5. For odd fields (See FIG. 2B), dot electrode connection circuit DECC_1_2_0 is put in an active state (i.e. conducting) and electrically connects dot electrode DE_1_3 to pixel control circuit PCC_1_2. Conversely, dot electrode connection circuit DECC_1_2_1 is put in an inactive state (i.e. non-conducting) and electrically isolates dot electrode DE_1_5 from pixel control circuit PCC_1_2. For even fields (see FIG. 2C), dot electrode connection circuit DECC_1_2_0 is put in the inactive state and electrically isolates dot electrode DE_1_3 from pixel control circuit PCC_1_2. Conversely, dot electrode connection circuit DECC_1_2_1 is put in the active state and electrically connects dot electrode DE_1_5 to pixel control circuit PCC_1_2.

Pixel control circuit PCC_1_3, which is part of configurable multi-electrode pixel CMEP_1_3 in FIGS. 2B and 2C, is coupled to dot electrode DE_1_6. Dot electrode connection circuit DECC_1_3_0 is coupled between pixel control circuit PCC_1_3 and dot electrode DE_1_5. Dot electrode connection circuit DECC_1_3_1 is coupled between pixel control circuit PCC_1_3 and dot electrode DE_1_7. For odd fields (See FIG. 2B), dot electrode connection circuit DECC_1_3_0 is put in an active state (i.e. conducting) and electrically connects dot electrode DE_1_5 to pixel control circuit PCC_1_3. Conversely, dot electrode connection circuit DECC_1_3_1 is put in an inactive state (i.e. non-conducting) and electrically isolates dot electrode DE_1_7 from pixel control circuit PCC_1_3. For even fields (see FIG. 2C), dot electrode connection circuit DECC_1_3_0 is put in the inactive state and electrically isolates dot electrode DE_1_5 from pixel control circuit PCC_1_3. Conversely, dot electrode connection circuit DECC_1_3_1 is put in the active state and electrically connects dot electrode DE_1_7 to pixel control circuit PCC_1_3.

In general, pixel control circuit PCC_X_Y, which is part of configurable multi-electrode pixel CMEP_X_Y, is coupled to dot electrode DE_X_2Y. Dot electrode connection circuit DECC_X_Y_0 is coupled between pixel control circuit PCC_X_Y and dot electrode DE_X_(2*Y−1). Dot electrode connection circuit DECC_X_Y_1 is coupled between pixel control circuit PCC_X_Y and dot electrode DE_X_(2*Y+1). For odd fields, dot electrode connection circuit DECC_X_Y_0 is put in an active state (i.e. conducting) and electrically connects dot electrode DE_X_(2*Y−1) to pixel control circuit PCC_X_Y. Conversely, dot electrode connection circuit DECC_X_Y_1 is put in an inactive state (i.e. non-conducting) and electrically isolates dot electrode DE_X_(2*Y+1) from pixel control circuit PCC_X_Y. For even fields (see FIG. 2C), dot electrode connection circuit DECC_X_Y_0 is put in the inactive state and electrically isolates dot electrode DE_X_(2*Y−1) from pixel control circuit PCC_X_Y. Conversely, dot electrode connection circuit DECC_X_Y_1 is put in the active state and electrically connects dot electrode DE_X_(2*Y+1) to pixel control circuit PCC_X_Y.

Because half of the dot electrode connection circuits are active and the other half the dot electrode connection circuits are inactive, the dot electrode connection circuits can be controlled with two control lines. Thus for the embodiment of FIG. 3, dot electrode connection circuit control line DECC_CL_1 is coupled to dot electrode connection circuits DECC_X_Y_1 and dot electrode connection circuit control line DECC_CL_0 is coupled to the dot electrode circuits DECC_X_Y_0. However in other embodiments of the present invention, different control schemes can be used with the dot electrode connection circuits. For example in some embodiments of the present invention, the dot electrode connection circuits may require more than one control line (See for example the embodiment of dot electrode connection circuit in FIG. 7). In other embodiments of the present invention, each dot electrode connection circuit is controlled by a separate control line (or control lines). In other embodiments of the present invention each row and/or column of dot electrode connection circuits are controlled by separate control lines.

In the embodiment of FIG. 3 the dot electrodes can be classified as dedicated dot electrodes and configurable dot electrodes. Specifically, dot electrodes that are coupled directly to a single pixel control circuit are dedicated dot electrodes. For example dot electrode DE_1_2 which is directly connected to pixel control circuit PCC_1_1 is a dedicated dot electrode. Conversely, dot electrodes that are coupled to multiple pixel control circuits through dot electrode connection circuits so that the dot electrode can be controlled by different pixel control circuits are configurable dot electrodes. For example dot electrode DE_1_3 which can be controlled by either pixel control circuit PCC_1_1 (through dot electrode connection circuit DECC_1_1_1) or pixel control circuit PCC_1_2 (through dot electrode connection circuit DECC_1_2_0) is a configurable dot electrode. However, other embodiments of the present invention may be made without dedicated dot electrodes.

Figure 4A:
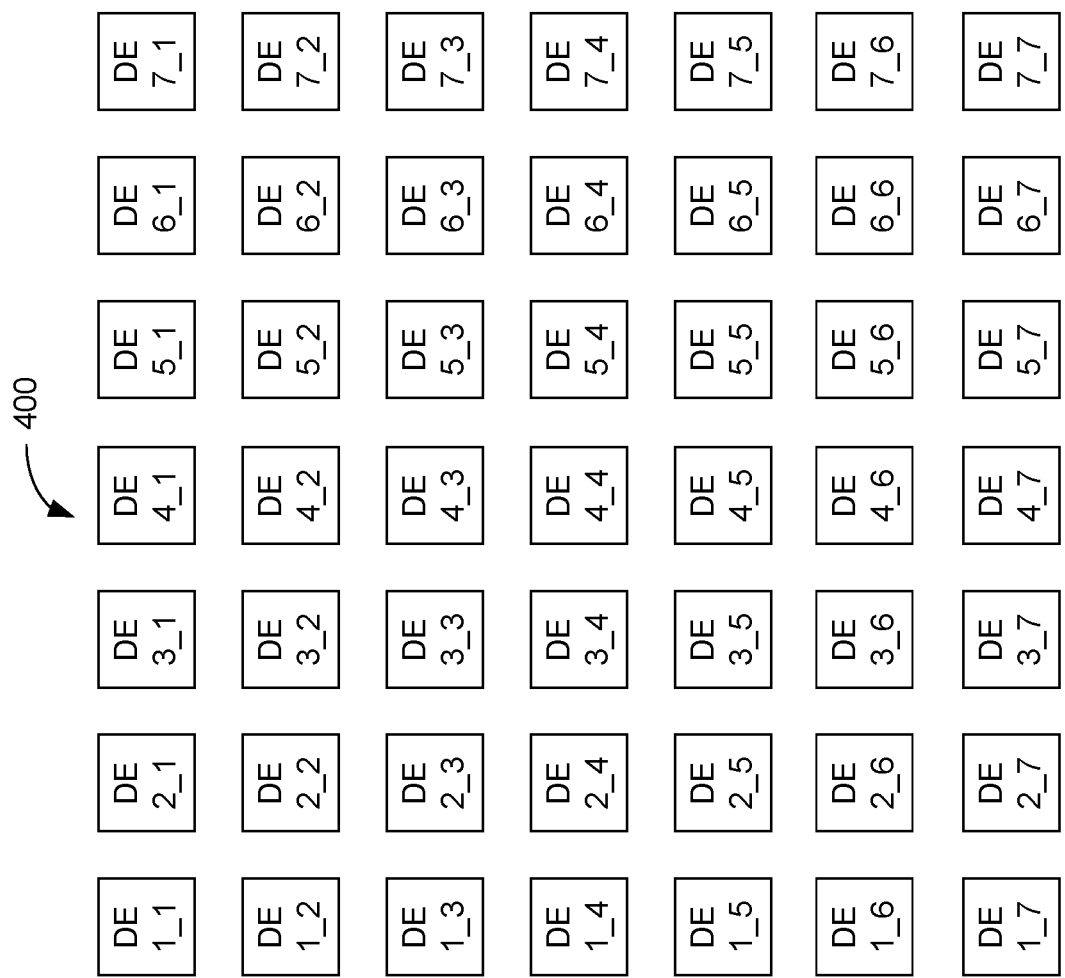
Figure 4B:
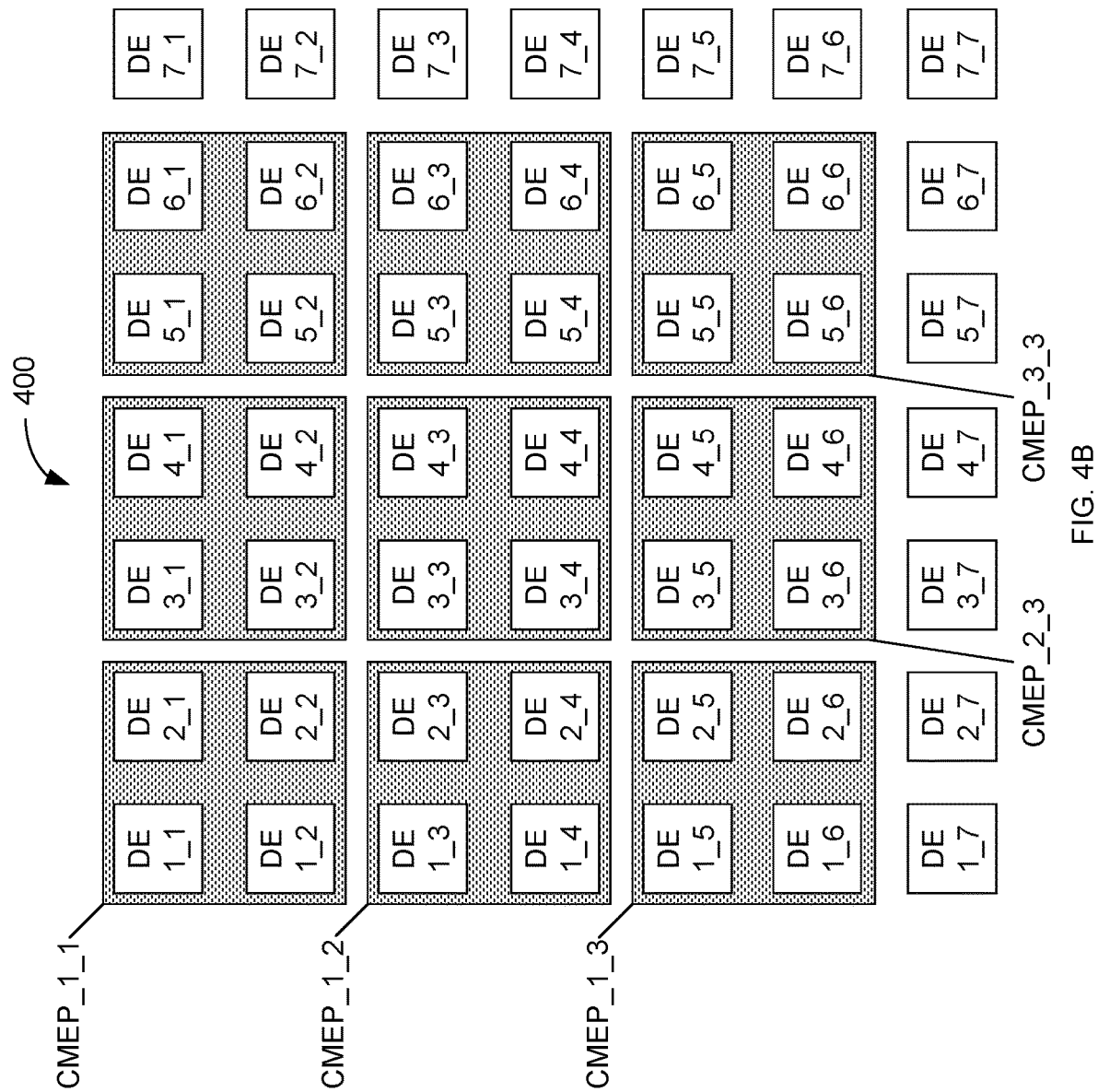
Figure 4C:
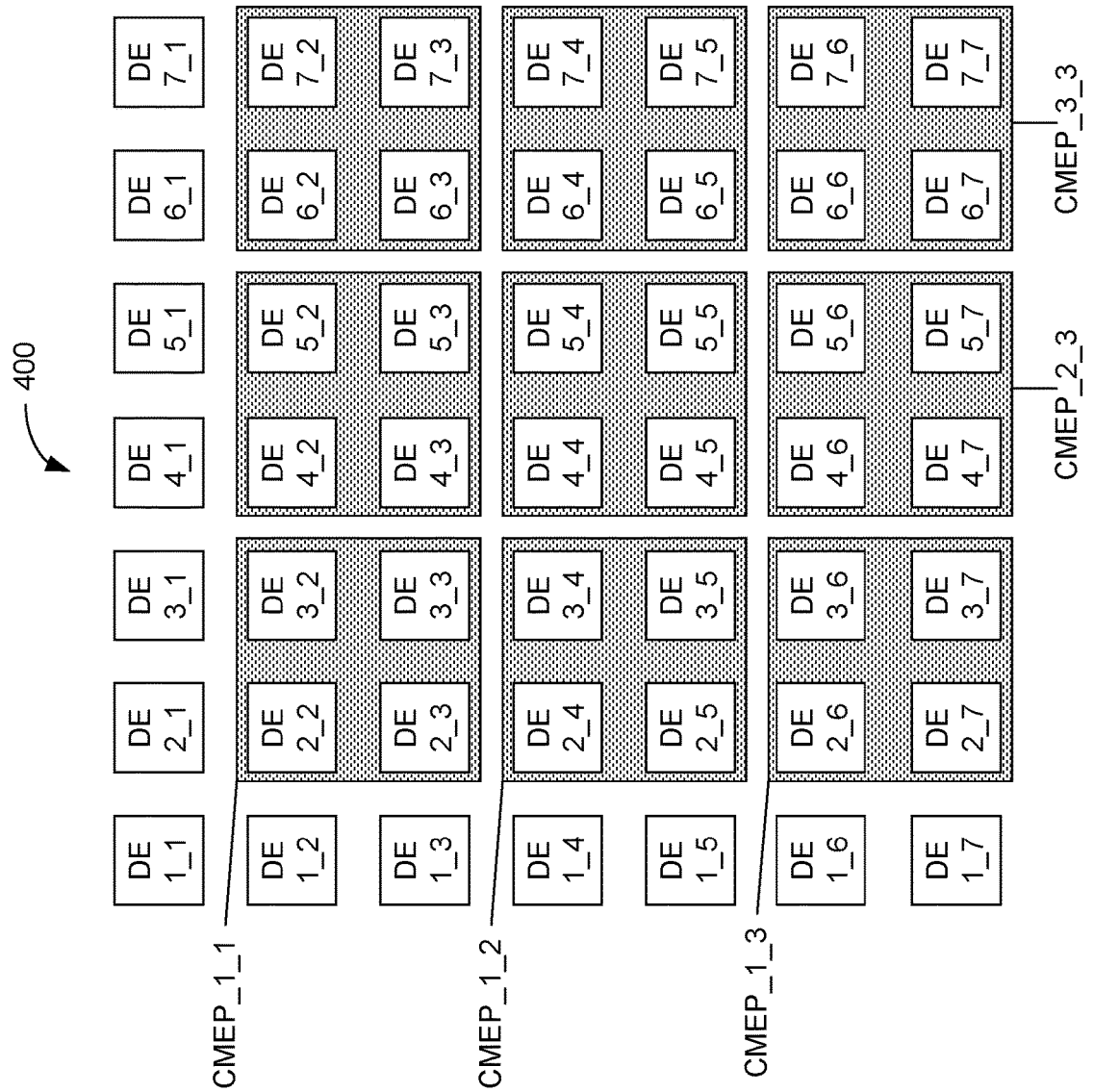

FIG. 4A shows a small portion of a light modulating backplane 400 in accordance with another embodiment of the present invention. Specifically, 7 rows and 7 columns of dot electrodes are illustrated. In light modulating backplane 400, each dot electrode DE_X_Y has a square shape. Light modulating backplane 400 uses novel configurable multi-electrode pixels and a quincunx interlacing to increase the effective resolution of light modulating backplane 400 as illustrated in FIGS. 4B and 4C. In quincunx interlacing, a frame of a video are converted into fields which contain only half the rows and half the columns of the original frame. The fields are alternating even fields and odd fields, in which the even fields contain even rows and even columns of a frame and the odd fields contain the odd rows and odd columns of a frame. The alternating fields appear to eye to be a full frame. FIG. 4B illustrates the arrangement of the configurable multi-electrode pixels during odd fields and FIG. 4C illustrates the arrangement of the configurable multi-electrode pixels during even fields. In FIG. 4B, nine of the configurable multi-electrode pixels are shown. To better illustrate each configurable multi-electrode pixel, the area of each configurable multi-electrode pixel is shaded; this shading is only for illustrative purposes in FIG. 4B and has no functional significance. Specifically, configurable multi-electrode pixel CMEP_1_1 include dot electrodes DE_1_1, DE_2_1, DE_1_2, and DE_2_2. Configurable multi-electrode pixel CMEP_1_2 includes dot electrodes DE_1_3, DE_2_3, DE_1_4, and DE_2_4. Configurable multi-electrode pixel CMEP_1_3 include dot electrodes DE_1_5, DE_2_5, DE_1_6, and DE_2_6. Configurable multi-electrode pixel CMEP_2_3 includes dot electrodes DE_3_5, DE_4_5, DE_3_6, and DE_4_6. Configurable multi-electrode pixel CMEP_3_3 includes dot electrodes DE_5_5, DE_6_5, DE_5_6, and DE_6_6. In general a configurable multi-electrode pixel CMEP_X_Y includes dot electrodes DE_(2*X−1)_(2*Y−1), DE_(2*X)_(2*Y−1), DE_(2*X−1)_(2*Y), and DE_(2*X)_(2*Y).

For even fields, as illustrated in FIG. 4C configurable multi-electrode pixel CMEP_1_1 include dot electrodes DE_2_2, DE_3_2, DE_2_3, and DE_3_3. Configurable multi-electrode pixel CMEP_1_2 includes dot electrodes DE_2_4, DE_3_4, DE_2_5, and DE_3_5. Configurable multi-electrode pixel CMEP_1_3 includes dot electrodes DE_2_6, DE_3_6, DE_2_7, and DE_3_7. Configurable multi-electrode pixel CMEP_2_3 include dot electrodes DE_4_6, DE_5_6, DE_4_7, and DE_5_7. Configurable multi-electrode pixel CMEP_3_3 includes dot electrodes DE_6_6, DE_7_6, DE_6_7, and DE_7_7. In general a configurable multi-electrode pixel CMEP_X_Y includes dot electrodes DE_(2*X)_(2*Y), DE_(2*X+1)_(2*Y), DE_(2*X)_(2*Y+1), and DE_(2*X+1)_(2*Y+1). Thus, the rows of configurable multi-electrode pixels in FIG. 4B and FIG. 4C are vertically offset by a dot electrode and horizontally offset by a dot electrode. This offset improves the quality of the interlaced image to the human eye.

Figure 4D:
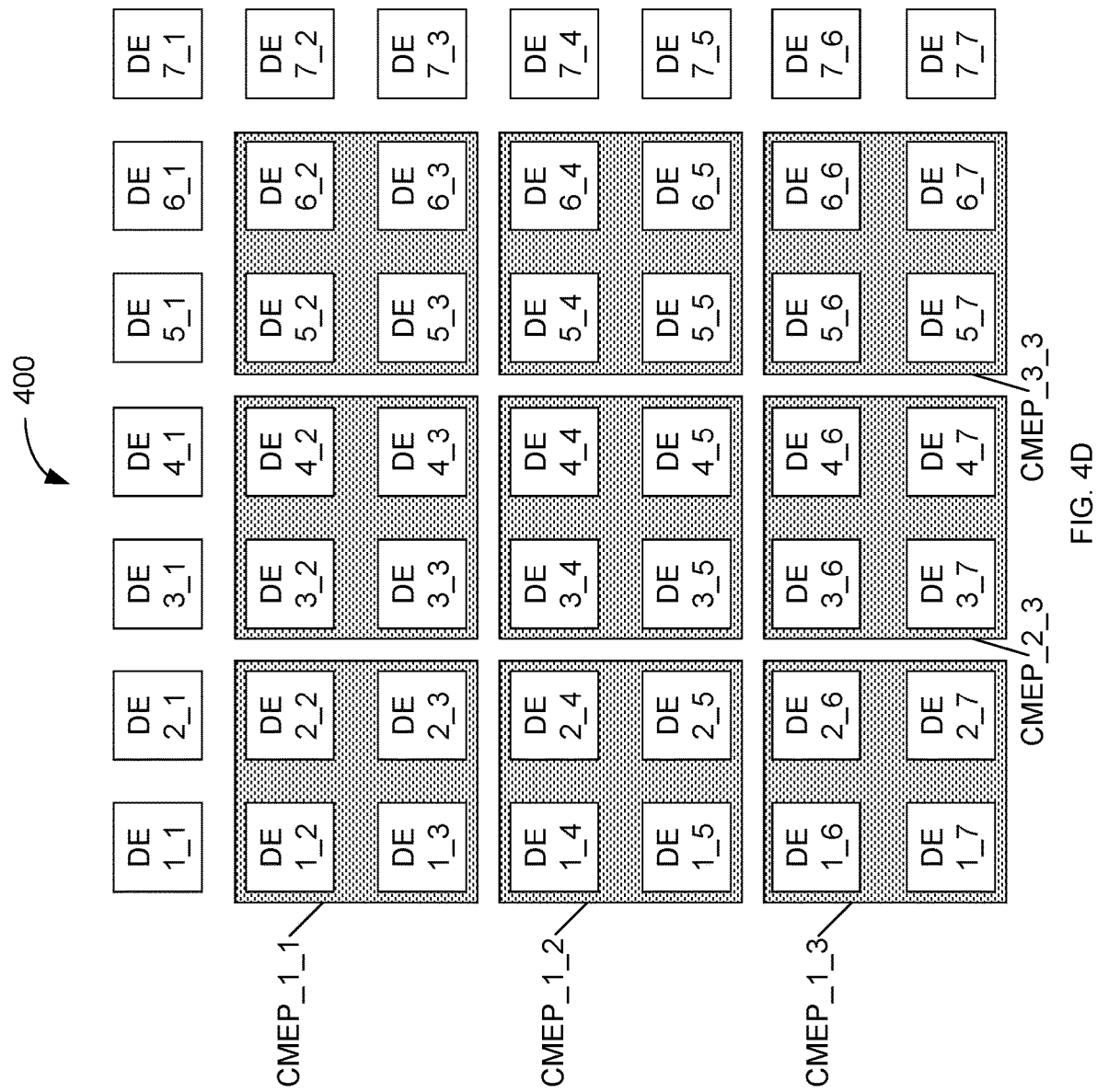

In some embodiments of the present invention, other arrangement of dot electrodes are also used in light modulating backplane 400. FIGS. 4D and 4E illustrate other arrangements of the configurable multi-electrode pixels. In FIG. 4D, nine of the configurable multi-electrode pixels are shown. To better illustrate each configurable multi-electrode pixel, the area of each configurable multi-electrode pixel is shaded; this shading is only for illustrative purposes in FIG. 4D and has no functional significance. Specifically, configurable multi-electrode pixel CMEP_1_1 include dot electrodes DE_1_2, DE_2_2, DE_1_3, and DE_2_3. Configurable multi-electrode pixel CMEP_1_2 includes dot electrodes DE_1_4, DE_2_4, DE_1_5, and DE_2_5. Configurable multi-electrode pixel CMEP_1_3 include dot electrodes DE_1_6, DE_2_6, DE_1_7, and DE_2_7. Configurable multi-electrode pixel CMEP_2_3 includes dot electrodes DE_3_6, DE_4_6, DE_3_7, and DE_4_7. Configurable multi-electrode pixel CMEP_3_3 includes dot electrodes DE_5_6, DE_6_6, DE_5_7, and DE_6_7. In general a configurable multi-electrode pixel CMEP_X_Y includes dot electrodes DE_(2*X−1)_(2*Y), DE_(2*X)_(2*Y), DE_(2*X−1)_(2*Y+1), and DE_(2*X)_(2*Y+1).

In FIG. 4E configurable multi-electrode pixel CMEP_1_1 include dot electrodes DE_2_1, DE_3_1, DE_2_2, and DE_3_2. Configurable multi-electrode pixel CMEP_1_2 includes dot electrodes DE_2_3, DE_3_3, DE_2_4, and DE_3_4. Configurable multi-electrode pixel CMEP_1_3 includes dot electrodes DE_2_5, DE_3_5, DE_2_6, and DE_3_6. Configurable multi-electrode pixel CMEP_2_3 include dot electrodes DE_4_5, DE_5_5, DE_4_6, and DE_5_6. Configurable multi-electrode pixel CMEP_3_3 includes dot electrodes DE_6_5, DE_7_5, DE_6_6, and DE_7_6. In general a configurable multi-electrode pixel CMEP_X_Y includes dot electrodes DE_(2*X)_(2*Y−1), DE_(2*X+1)_(2*Y−1), DE_(2*X)_(2*Y), and DE_(2*X+1)_(2*Y). Like the multi-electrode pixels of FIGS. 4B and 4C, the rows of configurable multi-electrode pixels in FIG. 4D and FIG. 4E are vertically offset by a dot electrode and horizontally offset by a dot electrode. Thus, the configurable multi-electrode pixels in FIG. 4D and FIG. 4E could be used for quincunx interlacing. Furthermore, some embodiments of the present invention can make use of all four arrangements of configurable multi-electrode pixels to display a video stream.

Figure 5A:
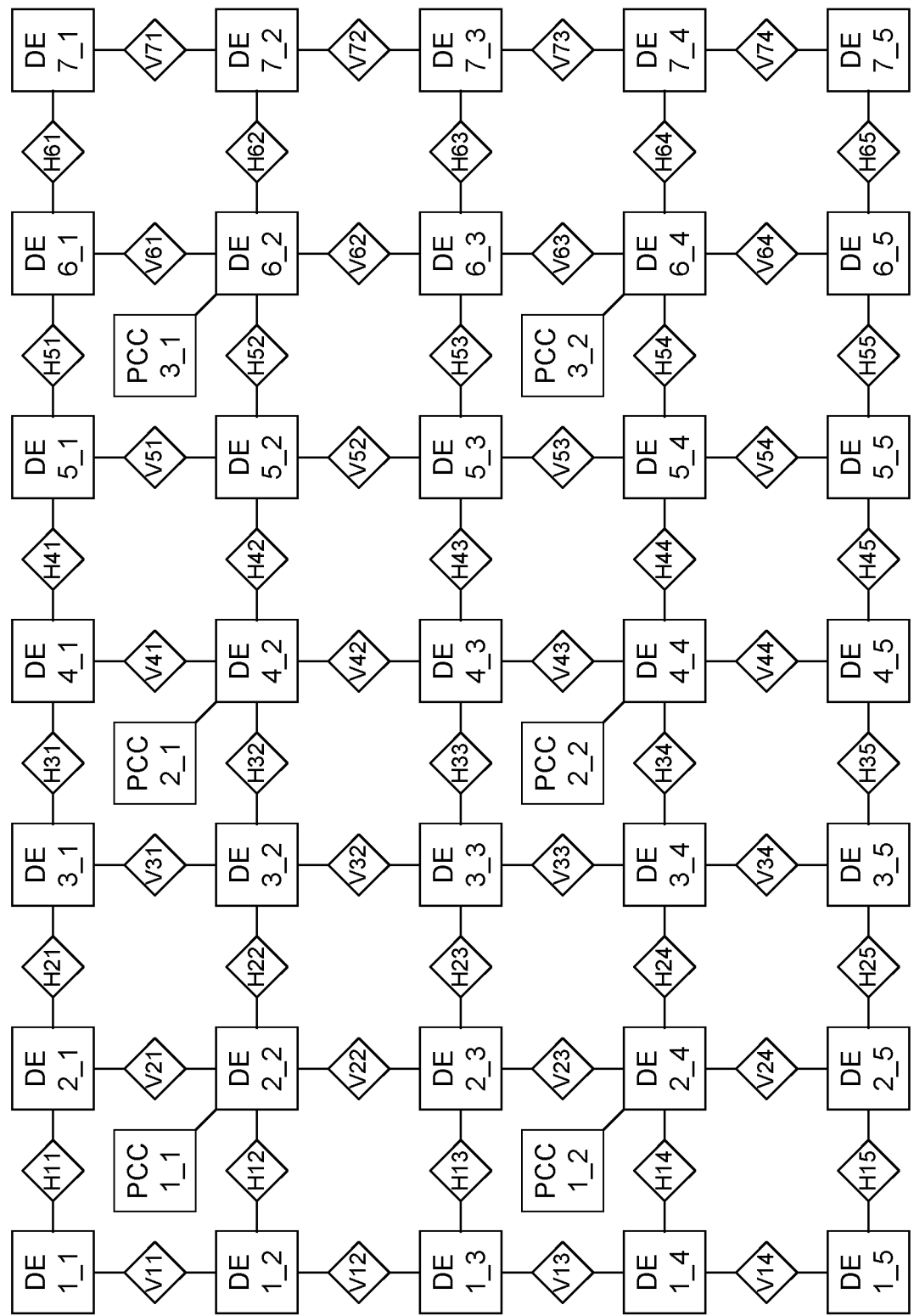
FIGS. 5A-5E is a schematic illustration of a portion of a light modulating backplane in accordance with one embodiment of the present invention.

In light modulating backplane 400 in accordance with one embodiment of the present invention, one pixel control circuit is used to control four dot electrodes at a time. FIG. 5A is a schematic diagram of a portion of light modulating backplane 400 in accordance with one embodiment of the present invention. FIG. 5A includes pixel control circuits PCC_1_1, PCC_1_2, PCC_2_1, PCC_2_2, PCC_3_1, and PCC_3_2; dot electrodes DE_1_1, DE_1_2, DE_1_3, DE_1_4, DE_1_5, DE_2_1, . . . DE_7_4, and DE_7_5; dot electrode connection circuit DECC_H_1_1, DECC_H_1_2, DECC_H_1_3, DECC_H_1_4, DECC_H_1_5, DECC_H_2_1, . . . DECC_H_7_3, and DECC_H_7_4; and dot electrode connection circuit DECC_V_1_1, DECC_V_1_2, DECC_V_1_3, DECC_V_1_4, DECC_H_2_1, . . . DECC_H_6_4, and DECC_H_6_5. Due to space constraints in FIG. 5A, each dot electrode connection circuit DECC_H_X_Y is drawn as a diamond and labeled as HXY, similarly each dot electrode connection circuit DECC_V_X_Y is drawn as a diamond and labeled as VXY. In actual implementation, the dot electrodes would be on a first plane overlying the pixel control circuits and dot electrode connection circuits. In addition due to space constraints the control lines for the dot electrode connection circuits are omitted. For clarity, FIGS. 5B, 5C, 5D, and 5E are included to illustrate the state of the dot electrode connection circuits for the configurable multi-electrode pixels of FIG. 4B, FIG. 4C, FIG. 4D, and FIG. 4E, respectively. Specifically, in FIGS. 5B, 5C, 5D and 5E dot electrode connection circuits in the active state (i.e. conducting) are shaded while the dot electrode connection circuits in the inactive state (i.e. non-conducting) are not shaded. Furthermore, configurable multi-electrode pixels are marked by large squares in FIGS. 5B, 5C, 5D and 5E.

Figure 5B:
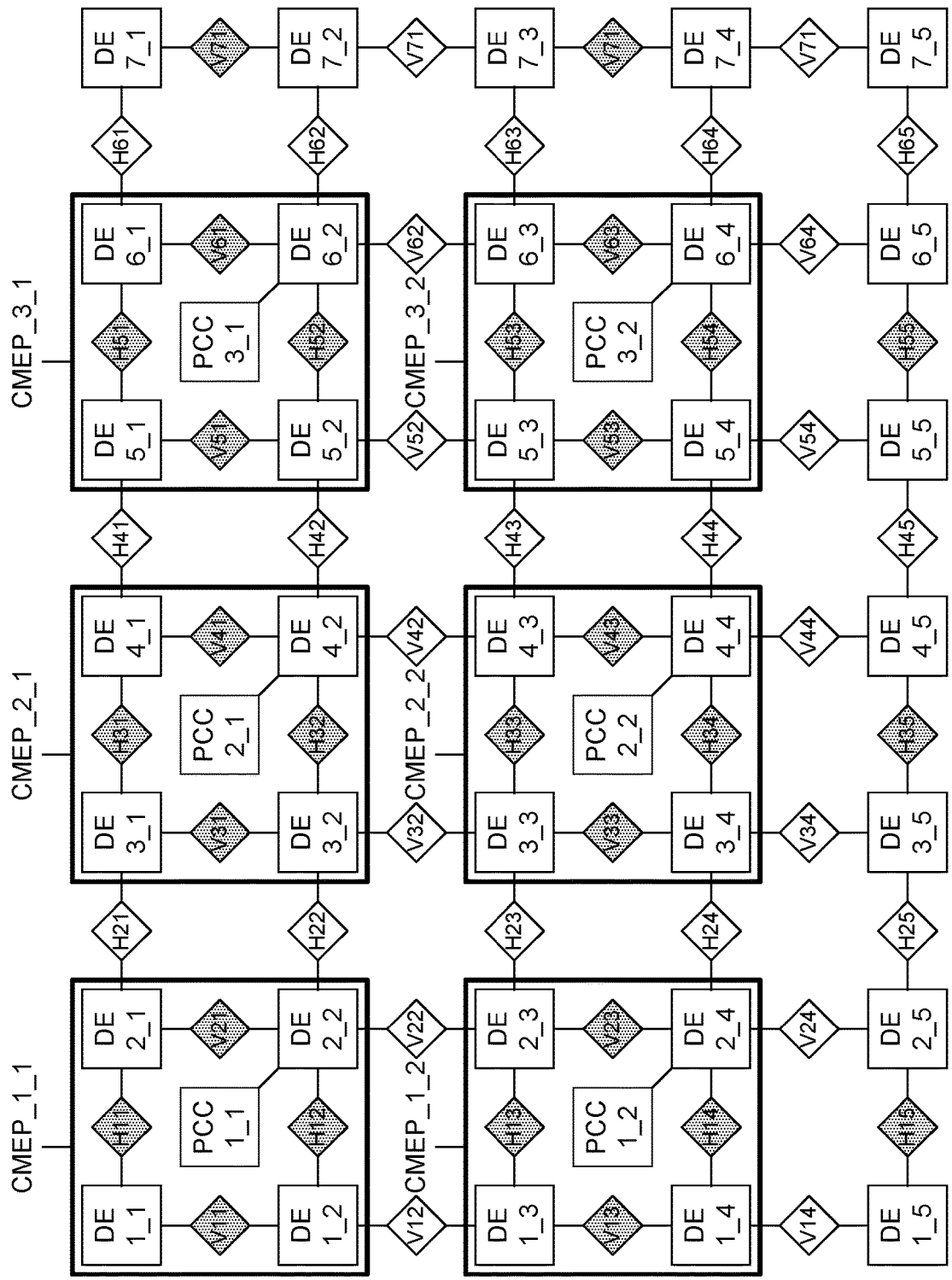
Figure 5C:
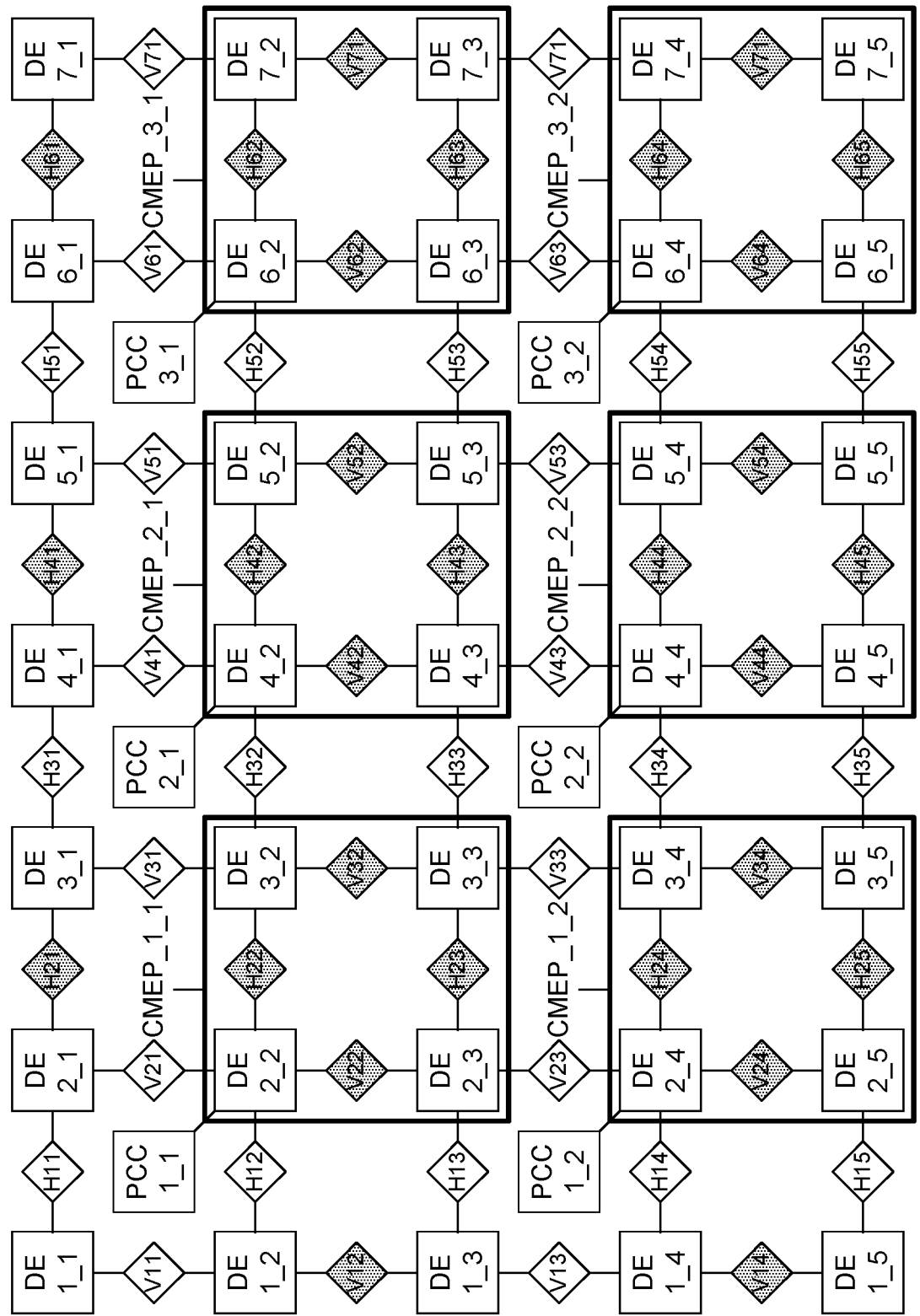

Pixel control circuit PCC_1_1, which is part of configurable multi-electrode pixel CMEP_1_1 in FIGS. 4B, 4C, 4D and 4E, is coupled to dot electrode DE_2_2. Dot electrode connection circuit DECC_V_2_1 is coupled between dot electrode DE_2_2 and dot electrode DE_2_1. Dot electrode connection circuit DECC_H_1_2 is coupled between dot electrode DE_2_2 and dot electrode DE_1_2. Dot electrode connection circuit DECC_H_1_1 is coupled between dot electrode DE_2_1 and dot electrode DE_1_1. Dot electrode connection circuit DECC_V_1_1 is coupled between dot electrode DE_1_2 and dot electrode DE_1_1. Dot electrode connection circuit DECC_V_2_2 is coupled between dot electrode DE_2_2 and dot electrode DE_2_3. Dot electrode connection circuit DECC_H_2_2 is coupled between dot electrode DE_2_2 and dot electrode DE_3_2. Dot electrode connection circuit DECC_H_2_3 is coupled between dot electrode DE_2_3 and dot electrode DE_3_3. Dot electrode connection circuit DECC_V_3_2 is coupled between dot electrode DE_3_2 and dot electrode DE_3_3. As shown in FIG. 5B, for odd fields, dot electrode connection circuits DECC_H_1_1, DECC_H_1_2, DECC_V_1_1, and DECC_V_2_1 are all set to the active state (i.e. conducting) allowing pixel control circuit PCC_1_1 to control dot electrodes DE_1_1, DE_2_1, DE_1_2, and DE_2_2. As shown in FIG. 5C, for even fields, dot electrode connection circuits DECC_H_2_2, DECC_H_2_3, DECC_V_2_2, and DECC_V_3_2 are all set to the active state (i.e. conducting) allowing pixel control circuit PCC_1_1 to control dot electrodes DE_2_2, DE_3_2, DE_2_3, and DE_3_3.

Pixel control circuit PCC_2_1, which is part of configurable multi-electrode pixel CMEP_2_1 in FIGS. 5B, 5C, 5D, and 5E, is coupled to dot electrode DE_4_2. Dot electrode connection circuit DECC_V_4_1 is coupled between dot electrode DE_4_2 and dot electrode DE_4_1. Dot electrode connection circuit DECC_H_3_2 is coupled between dot electrode DE_4_2 and dot electrode DE_3_2. Dot electrode connection circuit DECC_H_3_1 is coupled between dot electrode DE_4_1 and dot electrode DE_3_1. Dot electrode connection circuit DECC_V_3_1 is coupled between dot electrode DE_3_2 and dot electrode DE_3_1. Dot electrode connection circuit DECC_V_4_2 is coupled between dot electrode DE_4_2 and dot electrode DE_4_3. Dot electrode connection circuit DECC_H_4_2 is coupled between dot electrode DE_4_2 and dot electrode DE_5_2. Dot electrode connection circuit DECC_H_4_3 is coupled between dot electrode DE_4_3 and dot electrode DE_5_3. Dot electrode connection circuit DECC_V_5_2 is coupled between dot electrode DE_5_2 and dot electrode DE_5_3. As shown in FIG. 5B, for odd fields, dot electrode connection circuits DECC_H_3_1, DECC_H_3_2, DECC_V_3_1, and DECC_V_4_1 are all set to the active state (i.e. conducting) allowing pixel control circuit PCC_2_1 to control dot electrodes DE_3_1, DE_4_1, DE_3_2, and DE_4_2. As shown in FIG. 5C, for even fields, dot electrode connection circuits DECC_H_4_2, DECC_H_4_3, DECC_V_4_2, and DECC_V_5_2 are all set to the active state (i.e. conducting) allowing pixel control circuit PCC_2_1 to control dot electrodes DE_4_2, DE_5_2, DE_4_3, and DE_5_3.

In general, each dot electrode connection circuit DECC_H_X_Y is coupled between dot electrode DE_X_Y and dot electrode DE_X+1 Y. Each dot electrode connection circuit DECC_V_X_Y is coupled between dot electrode DE_X_Y and dot electrode DE_X_Y+1. Dot electrode pixel control circuit PCC_X_Y is coupled to dot electrode DE_2*X_2*Y.

For the arrangement of FIG. 5B which corresponds with FIG. 4B, dot electrode connection circuits DECC_H_X_Y is active if X is an odd number. Conversely, dot electrode connection circuits DECC_V_X_Y is active if Y is an odd number. Thus, for the arrangement of FIG. 5B each pixel control circuit PCC_X_Y control dot electrodes DE_2*X_2*Y, DE_(2*X−1)_2*Y, DE_2*X_(2*Y−1), and DE_(2*X−1)_(2*Y−1).

For the arrangement of FIG. 5C, which corresponds with FIG. 4C, dot electrode connection circuits DECC_H_X_Y is active if X is an even number. Conversely, dot electrode connection circuits DECC_V_X_Y is active if Y is an even number. Thus, for the arrangement of FIG. 5C each pixel control circuit PCC_X_Y control dot electrodes DE_2*X_2*Y, DE_(2*X+1)_2*Y, DE_2*X_(2*Y+1), and DE_(2*X+1)_(2*Y+1).

Figure 5D:
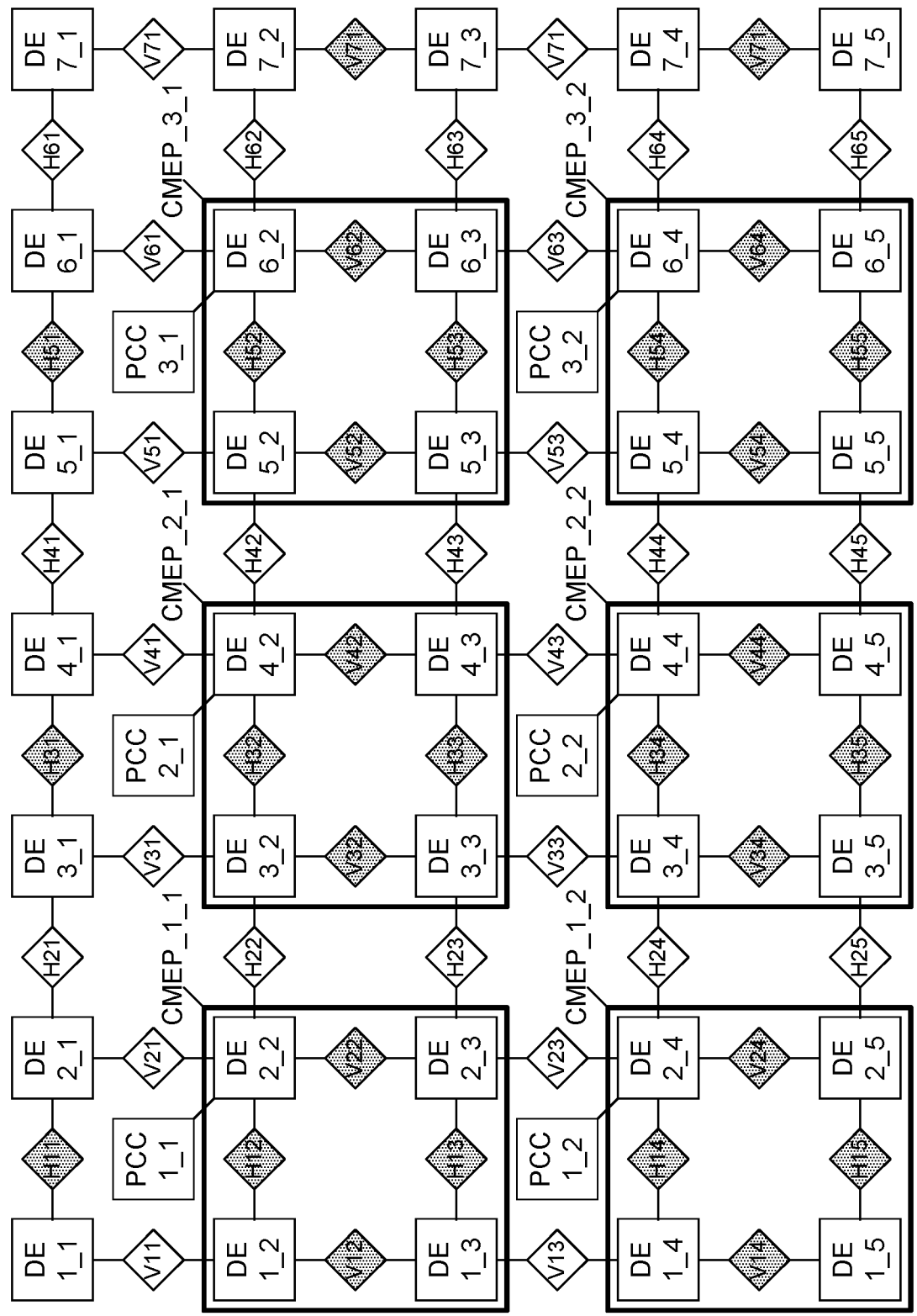

For the arrangement of FIG. 5D which corresponds with FIG. 4D, dot electrode connection circuits DECC_H_X_Y is active if X is an odd number. Conversely, dot electrode connection circuits DECC_V_X_Y is active if Y is an even number. Thus, for the arrangement of FIG. 5D each pixel control circuit PCC_X_Y control dot electrodes DE_(2*X−1)_2*Y, DE_2*X_2*Y, DE_(2*X−1)_(2*Y+1), and DE_(2*X)_(2*Y+1).

Figure 5E:
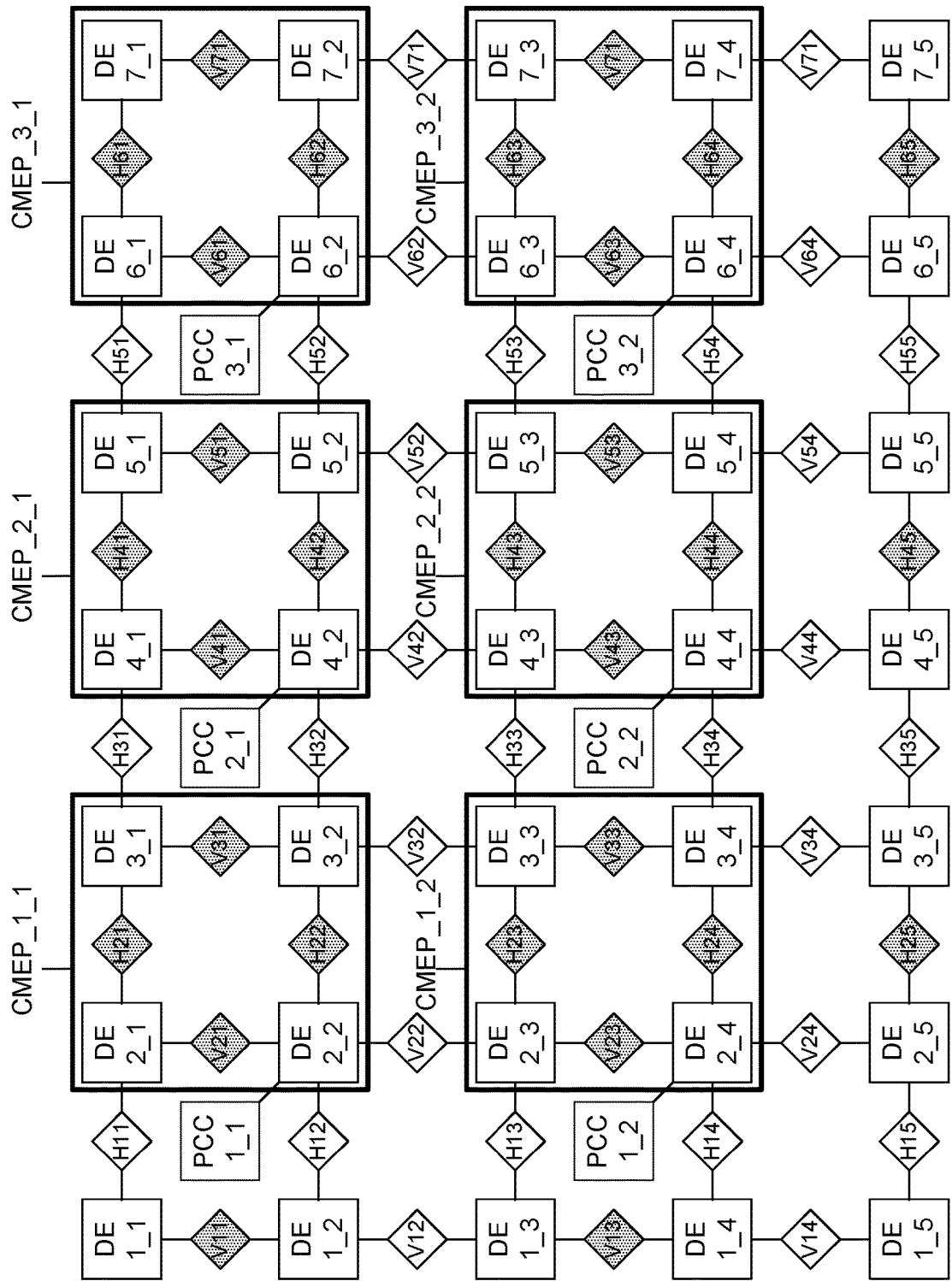

For the arrangement of FIG. 5E which corresponds with FIG. 4E, dot electrode connection circuits DECC_H_X_Y is active if X is an even number. Conversely, dot electrode connection circuits DECC_V_X_Y is active if Y is an odd number. Thus, for the arrangement of FIG. 5E each pixel control circuit PCC_X_Y control dot electrodes DE_(2*X)_(2*Y−1), DE_(2*X+1)_2*Y, DE_(2*X)_(2*Y), and DE_(2*X+1)_(2*Y−1).

In one embodiment of the present invention, two state control lines are routed to each of the dot electrode control circuits. The state control lines indicate which of the four arrangements of configurable multi-electrode pixels should be used (as illustrated by FIGS. 5B-5E). Each dot electrode control circuit includes a small decoding circuit to determine whether to be active or inactive.

Figure 8:
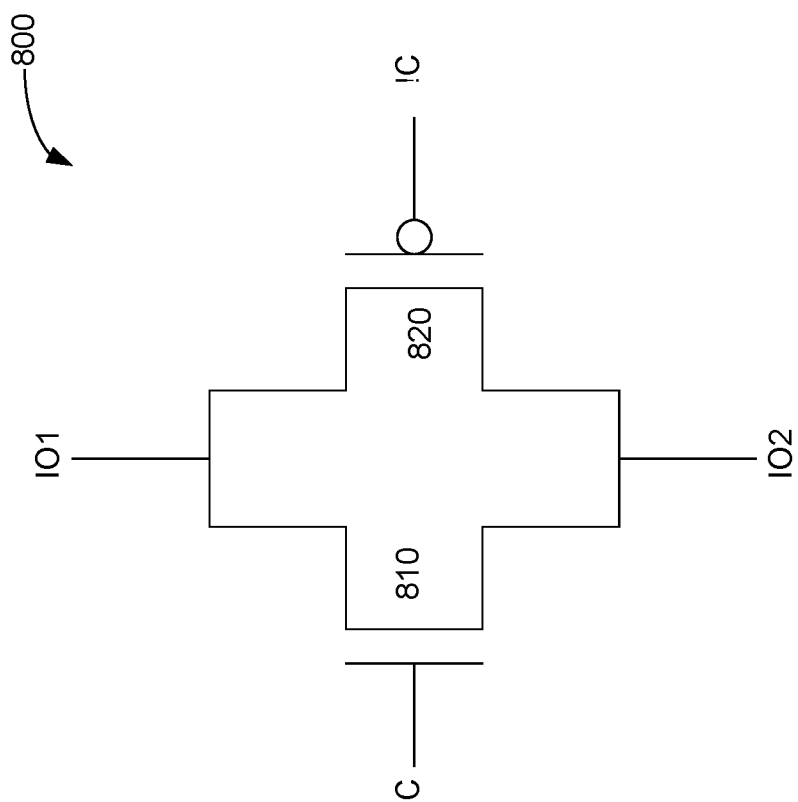
FIG. 8 is schematic diagram of a dot electrode connection circuit in accordance with one embodiment of the present invention.

However, in other embodiments of the present invention, including a decoding circuit in each dot electrode connection circuit would require too much area. Therefore, in one embodiment of the present invention that uses dot electrode control circuit 800, which is illustrated in FIG. 8, complementary control lines are selectively routed to the dot electrode connection circuits so that no decoding unit is required. As explained in more detail below, the dot electrode control circuit in FIG. 8 has a two control terminals C and !C. If logic high is provided on control terminal C and logic low is provided on control terminal !C, dot electrode control circuit 800 is active; otherwise, dot electrode control circuit 800 is inactive.

In this embodiment, two complementary pair of control lines are used. For consistency, control lines V_CNTRL and !V_CNTRL are used with dot electrode connection circuits DECC_V_X_Y and control lines H_CNTRL and !HCNTRL are used with dot electrode connection circuits DECC_H_X_Y. Specifically for a dot electrode control circuit DECC_V_X_Y, when Y is odd then control line V_CNTRL is coupled to control terminal C and control line !V_CNTRL is coupled to control terminal !C. However when Y is even then control line V_CNTRL is coupled to control terminal !C and control line !V_CNTRL is coupled to control terminal C. Thus, when control line V_CNTRL is at logic high, then dot electrode connection circuit DECC_V_X_Y is active if Y is odd and inactive if Y is even. However when control line V_CNTRL is at logic low, then electrode connection circuit DECC_V_X_Y is inactive if Y is odd and inactive if Y is even.

For a dot electrode control circuit DECC_H_X_Y, when X is odd, then control line H_CNTRL is coupled to control terminal C and control line !H_CNTRL is coupled to control line !C. However when X is even then control line H_CNTRL is coupled to control terminal !C and control line !H_CNTRL is coupled to control terminal C. Thus, when control line H_CNTRL is at logic high then dot electrode connection circuit DECC_H_X_Y is active if X is odd and inactive if X is even.

When control line V_CNTRL is logic high and control line H_CNTRL is logic high then the arrangement shown in FIG. 5B is selected. When control line V_CNTRL is logic low and control line H_CNTRL is logic low then the arrangement shown in FIG. 5C is selected. When control line V_CNTRL is logic low and control line H_CNTRL is logic high then the arrangement shown in FIG. 5D is selected. When control line V_CNTRL is logic high and control line H_CNTRL is logic low then the arrangement shown in FIG. 5E is selected.

Figure 5F:
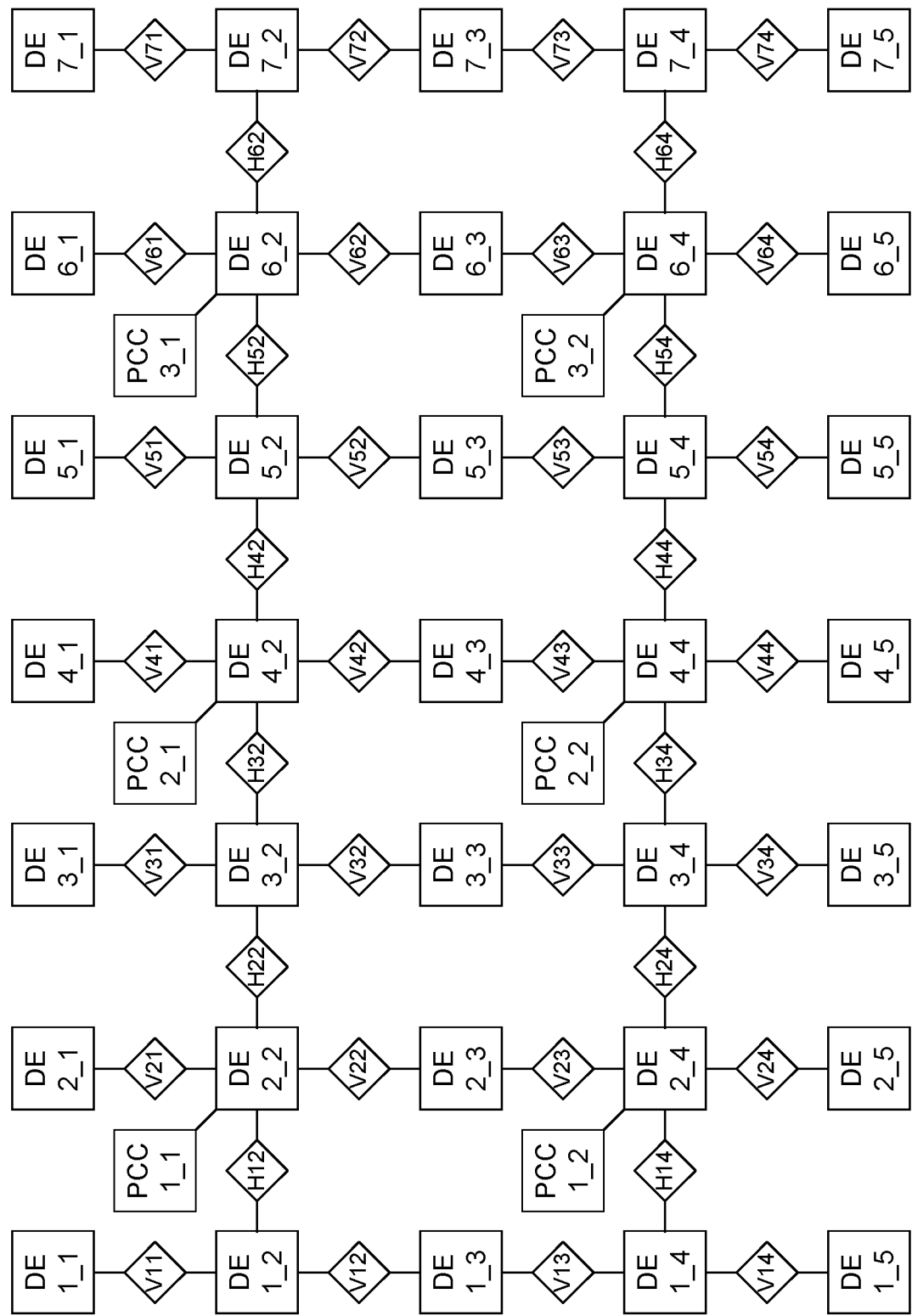
FIGS. 5F-5J is a schematic illustration of a portion of a light modulating backplane in accordance with another embodiment of the present invention.

For quad-quincunx videos (which is explained in detail below) all four of the configurable multi-electrode pixel arrangements are used. Even when all four of the configurable multi-electrode pixel arrangements are used some of the dot electrode connection circuits are redundant and unnecessary, FIG. 5F is a schematic diagram of a portion of a light modulating backplane in accordance with another embodiment of the present invention. The light modulating backplane of FIG. 5F is basically the same as the light modulating backplane of FIG. 5A except that redundant dot electrode connection circuits are removed. For brevity on the differences between FIG. 5A and FIG. 5F are described. In the light modulating backplane of FIG. 5F, half of the horizontal dot electrode connection circuits are removed. Specifically, dot electrode connection circuits H_x_y, where y is an odd number are removed in the light modulating backplane of FIG. 5F as compared to the light modulating backplane of FIG. 5A. For clarity, FIGS. 5G, 5H, 5I, and 5J are included to illustrate the state of the dot electrode connection circuits for the configurable multi-electrode pixels of FIG. 4B, FIG. 4C, FIG. 4D, and FIG. 4E, respectively. Specifically, in FIGS. 5G, 5H, 5I and 5J dot electrode connection circuits in the active state (i.e. conducting) are shaded while the dot electrode connection circuits in the inactive state (i.e. non-conducting) are not shaded. Furthermore, configurable multi-electrode pixels are marked by large squares in FIGS. 5G, 5H, 5I, and 5J.

Figure 5G:
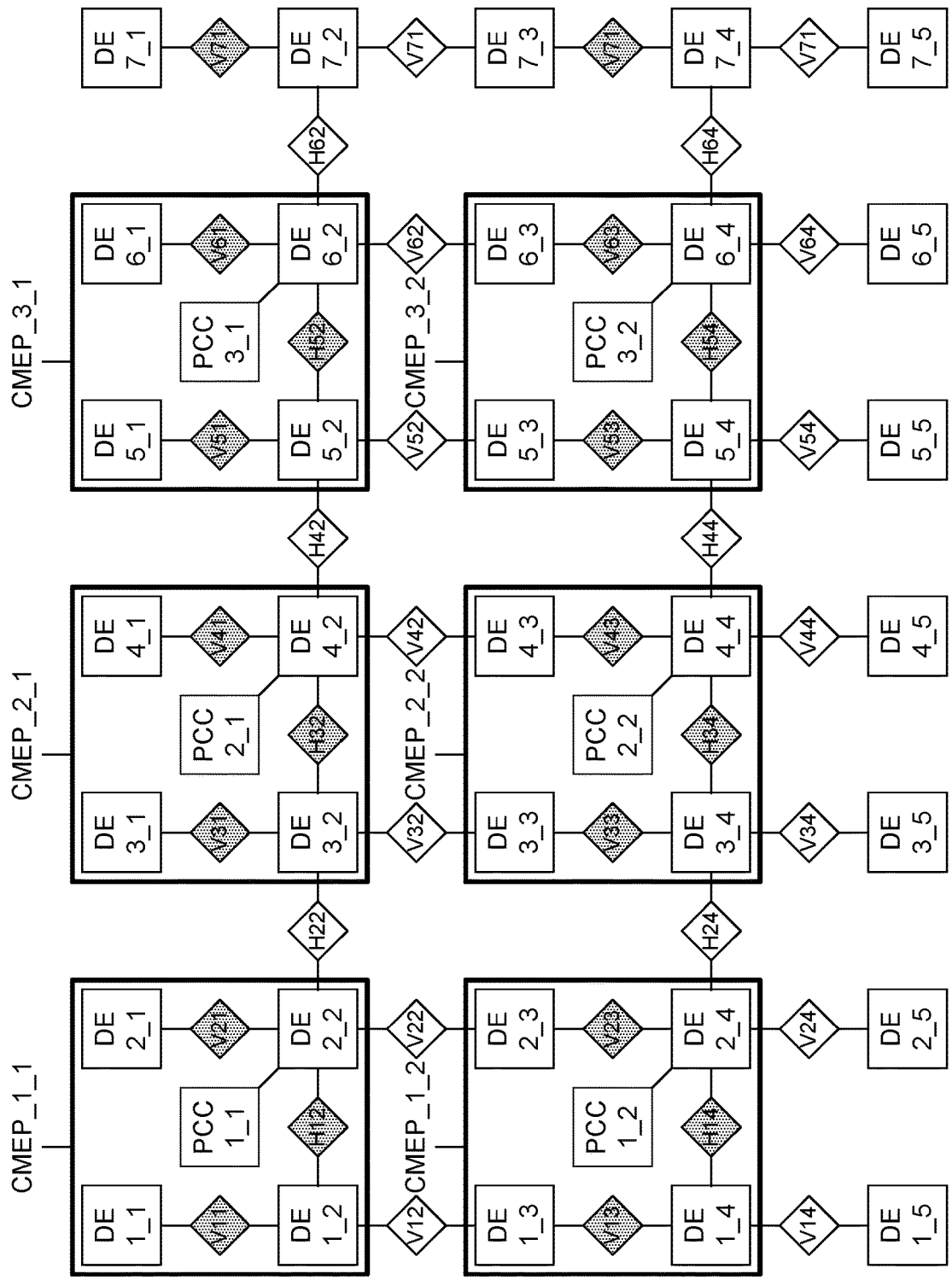

For the arrangement of FIG. 5G which corresponds with FIG. 4B, dot electrode connection circuits DECC_H_X_Y is active if X is an odd number. Conversely, dot electrode connection circuits DECC_V_X_Y is active if Y is an odd number. As explained above, to reduce redundancy, dot electrode connection circuits DECC_H_X_Y, where Y is odd have been removed. Thus, for the arrangement of FIG. 5G each pixel control circuit PCC_X_Y control dot electrodes DE_2\*X_2\*Y, DE_(2\*X−1)_2\*Y, DE_2\*X_(2\*Y−1), and DE_(2\*X−1)_(2\*Y−1).

Figure 5H:
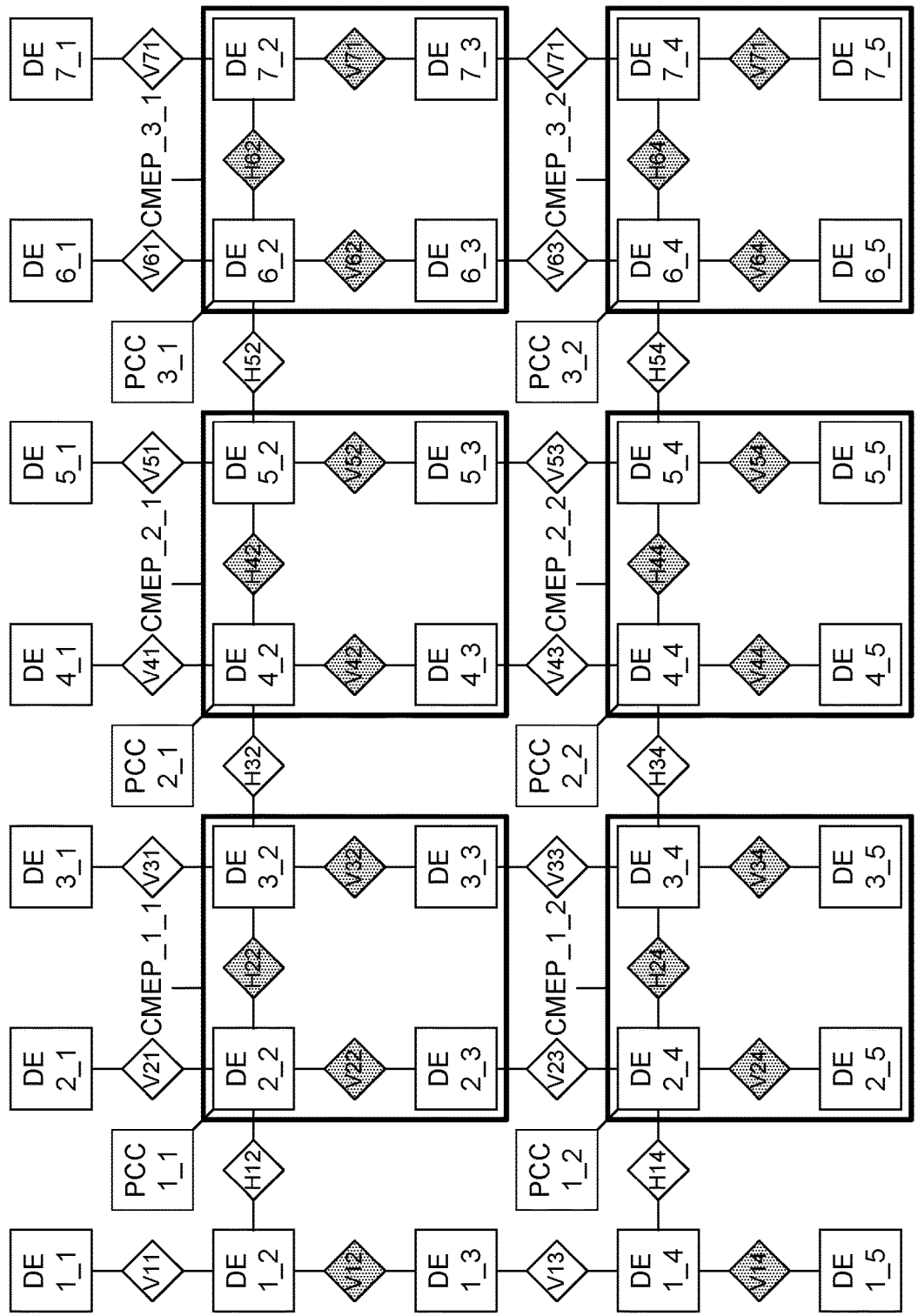

For the arrangement of FIG. 5H, which corresponds with FIG. 4C, dot electrode connection circuits DECC_H_X_Y is active if X is an even number. Conversely, dot electrode connection circuits DECC_V_X_Y is active if Y is an even number. As explained above, to reduce redundancy, dot electrode connection circuits DECC_H_X_Y, where Y is odd have been removed. Thus, for the arrangement of FIG. 5H each pixel control circuit PCC_X_Y control dot electrodes DE_2\*X_2\*Y, DE_(2\*X+1)_2\*Y, DE_2\*X_(2\*Y+1), and DE_(2\*X+1)_(2\*Y+1).

Figure 5I:
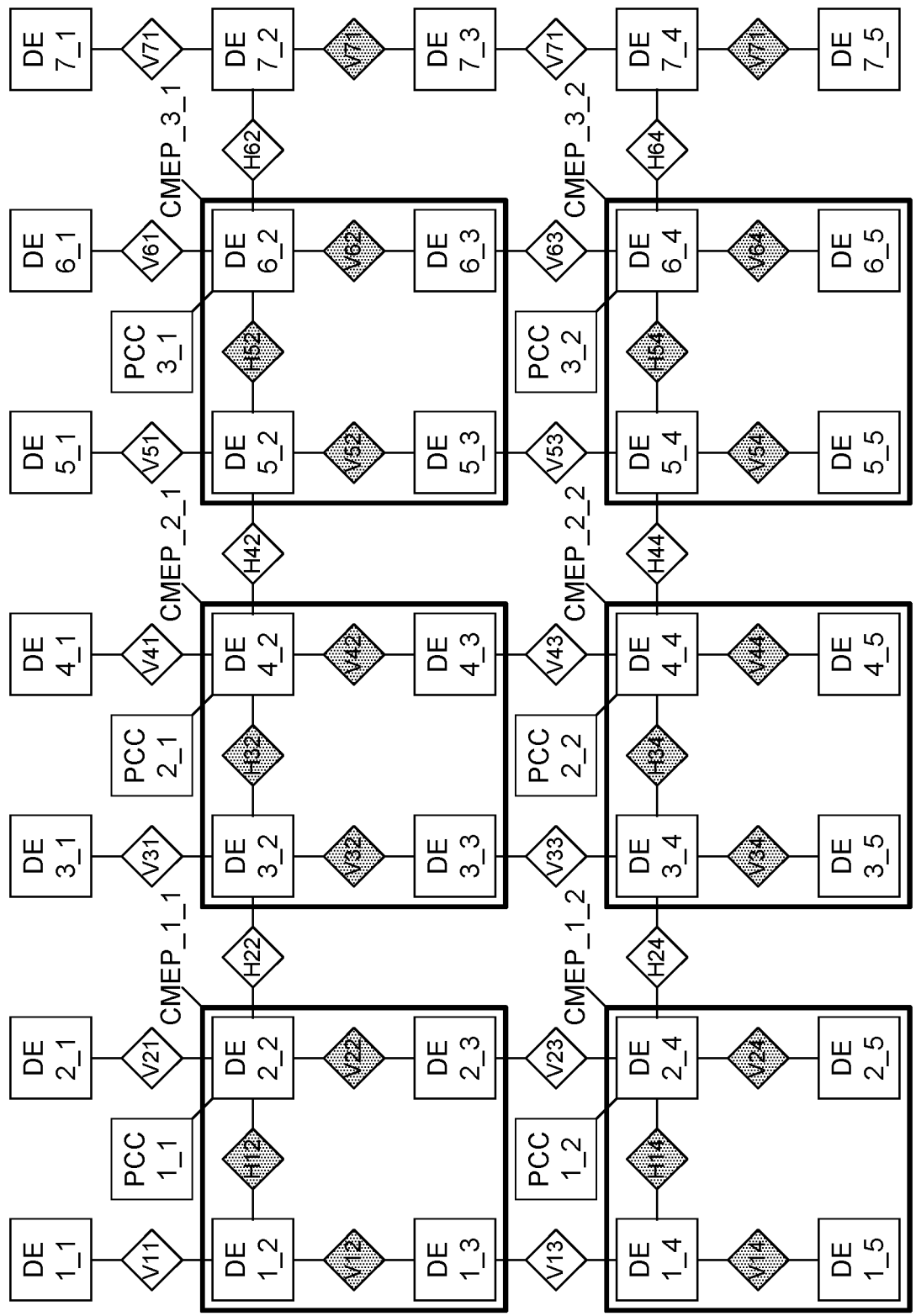

For the arrangement of FIG. 5I which corresponds with FIG. 4D, dot electrode connection circuits DECC_H_X_Y is active if X is an odd number. Conversely, dot electrode connection circuits DECC_V_X_Y is active if Y is an even number. As explained above, to reduce redundancy, dot electrode connection circuits DECC_H_X_Y, where Y is odd have been removed. Thus, for the arrangement of FIG. 5I each pixel control circuit PCC_X_Y control dot electrodes DE_(2\*X−1)_2\*Y, DE_2\*X_2\*Y, DE_(2\*X−1)_(2\*Y+1), and DE_(2\*X)_(2\*Y+1).

Figure 5J:
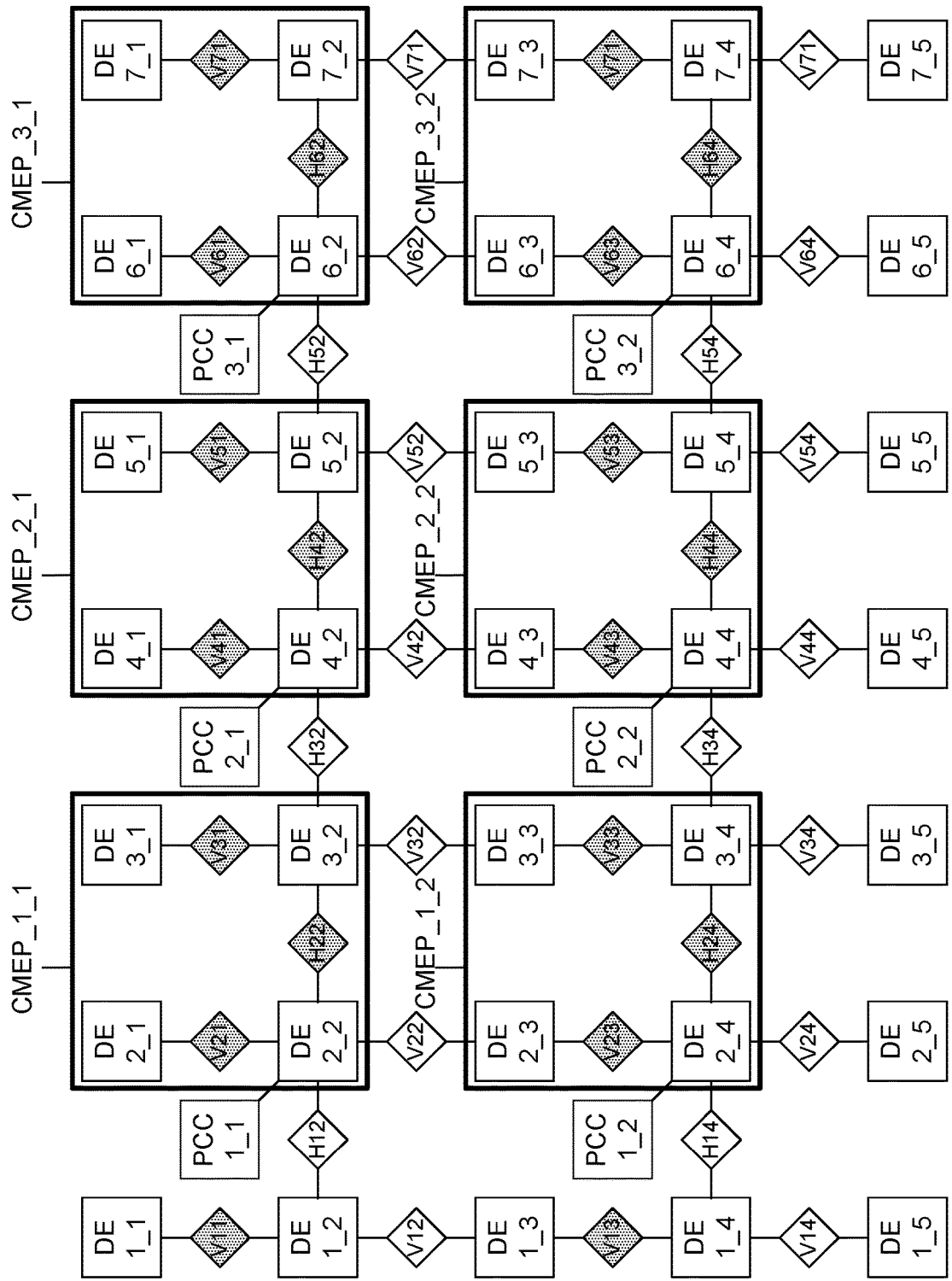

For the arrangement of FIG. 5J which corresponds with FIG. 4E, dot electrode connection circuits DECC_H_X_Y is active if X is an even number. Conversely, dot electrode connection circuits DECC_V_X_Y is active if Y is an odd number. As explained above, to reduce redundancy, dot electrode connection circuits DECC_H_X_Y, where Y is odd have been removed. Thus, for the arrangement of FIG. 5E each pixel control circuit PCC_X_Y control dot electrodes DE_(2\*X)_(2\*Y−1), DE_(2\*X+1)_2\*Y, DE_(2\*X)_(2\*Y), and DE_(2\*X+1)_(2\*Y−1).

Light modulating backplanes in accordance with other embodiments of the present invention may remove a different set of dot electrode connection circuits from the embodiment of FIG. 5A and still be able to use all four of the configurable multi-electrode pixel arrangements. For example, in another embodiment of the present invention, dot electrode connection circuits H_X_Y, where Y is an even number are removed. In still another embodiment of the present invention, dot electrode connection circuits V_X_Y, where X is an even number are removed. In still another embodiment of the present invention, dot electrode connection circuits V_X_Y, where X is an odd number are removed.

For Quincunx interlacing only two of the arrangements shown in FIGS. 5B-5E are used. Specifically, one embodiment of the present invention uses the arrangement of FIG. 5B and FIG. 5C. In FIG. 5B and FIG. 5C half of the dot electrode connection circuits are active and the other half the dot electrode connection circuits are inactive, the dot electrode connection circuits can be controlled with two control lines. Thus for the embodiment of FIG. 5A-5C, a first dot electrode connection circuit control line can be coupled to dot electrode connection circuits DECC_H_X_Y, where X is odd and to dot electrode connection circuits DECC_V_X_Y, where Y is odd. A second dot electrode connection circuit control line is coupled to dot electrode connection circuits DECC_H_X_Y, where X is even and to dot electrode connection circuits DECC_V_X_Y, where Y is even. However in other embodiments of the present invention, different control schemes can be used with the dot electrode connection circuits. For example in some embodiments of the present invention, the dot electrode connection circuits may require more than one control line (See for example the embodiment of dot electrode connection circuit in FIG. 8). In other embodiments of the present invention, each dot electrode connection circuit is controlled by a separate control line (or control lines).

Furthermore, since only two of the configurable multi-electrode pixel arrangements are used for quincunx interlacing some of the dot electrode connection circuits are redundant and unnecessary. In FIG. 5B, dot electrode DE_1_2 is coupled to pixel control circuit PCC_1_1 through two paths. The first path connecting dot electrode DE_1_2 to pixel control circuit PCC_1_1 is through dot electrode connection circuit DECC_H_1_2 and dot electrode DE_2_2. The second path connecting dot electrode DE_1_2 to pixel control circuit PCC_1_1 is through dot electrode connection circuit DECC_V_1_1, dot electrode DE_1_1, dot electrode connection circuit DECC_H_1_1, dot electrode DE_2_1, dot electrode connection circuit DECC_V_2_1, and dot electrode DE_2_2. Therefore, dot electrode connection circuit DECC_H_1_2 can be eliminated without changing the functionality of the embodiment of FIGS. 5A-5C. In fact all dot electrodes connection circuits DECC_H_X_Y, where Y is even can be eliminated. Thus some embodiments of the present invention would eliminate these redundant circuits to reduce the required area of the light modulating backplane. Due to the symmetrical nature of the embodiment of FIG. 5A-5C, other dot electrode connection circuits could be eliminated instead.

Figure 6A:
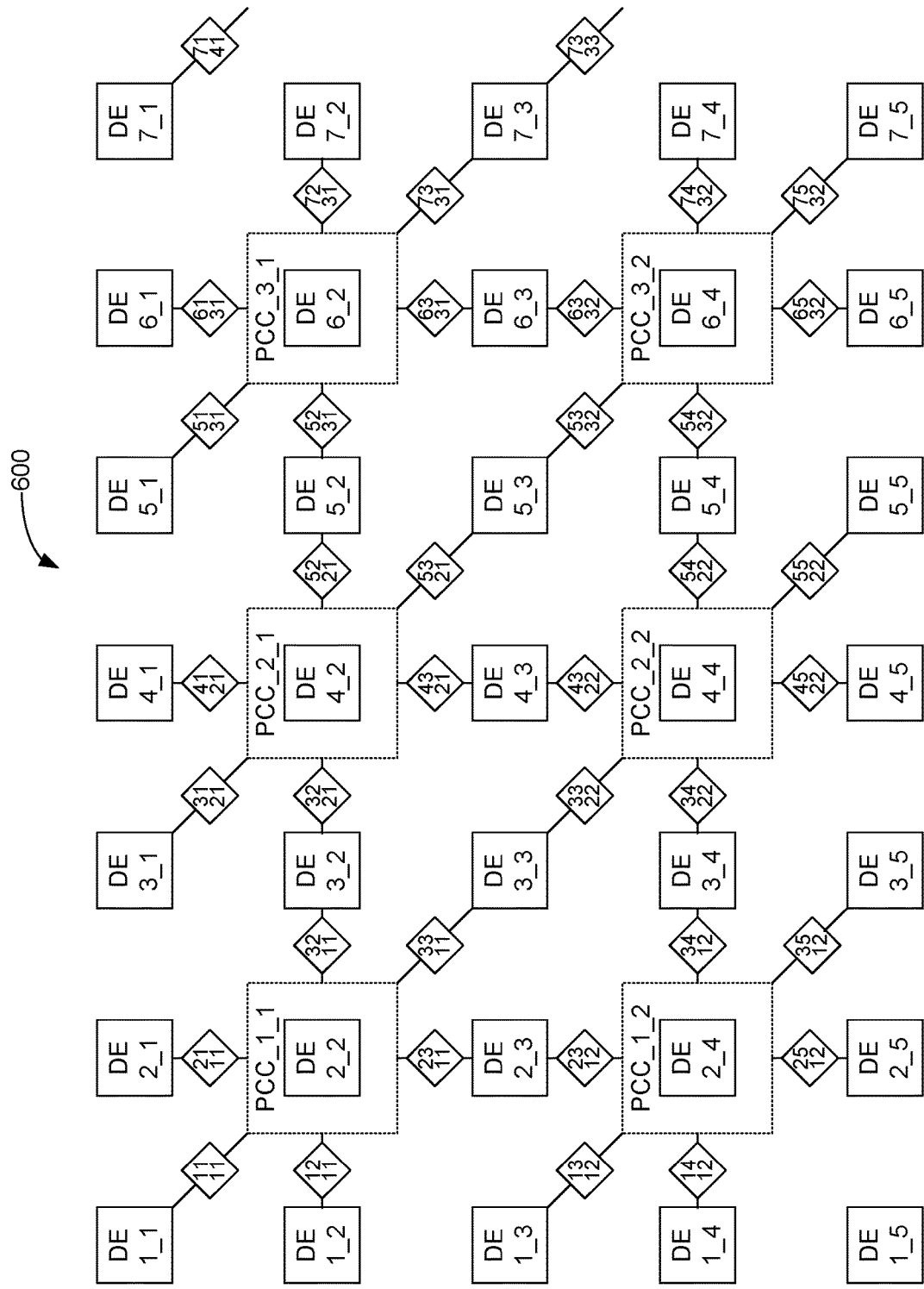
FIGS. 6A-6C is a schematic illustration of a portion of a light modulating backplane in accordance with one embodiment of the present invention.

FIG. 6A is a schematic diagram of a portion of light modulating backplane 600 in accordance with one embodiment of the present invention. Like light modulating backplane 400 (FIG. 5A), light modulating backplane 600 (FIG. 6A) includes pixel control circuits PCC_1_1, PCC_1_2, PCC_2_1, PCC_2_2, PCC_3_1, and PCC_3_2; dot electrodes DE_1_1, DE_1_2, DE_1_3, DE_1_4, DE_1_5, DE_2_1, . . . DE_7_4, and DE_7_5. However for clarity, the pixel control circuits of FIG. 6A are drawn behind dot electrode and thus are drawn using dotted lines.

Figure 6B:
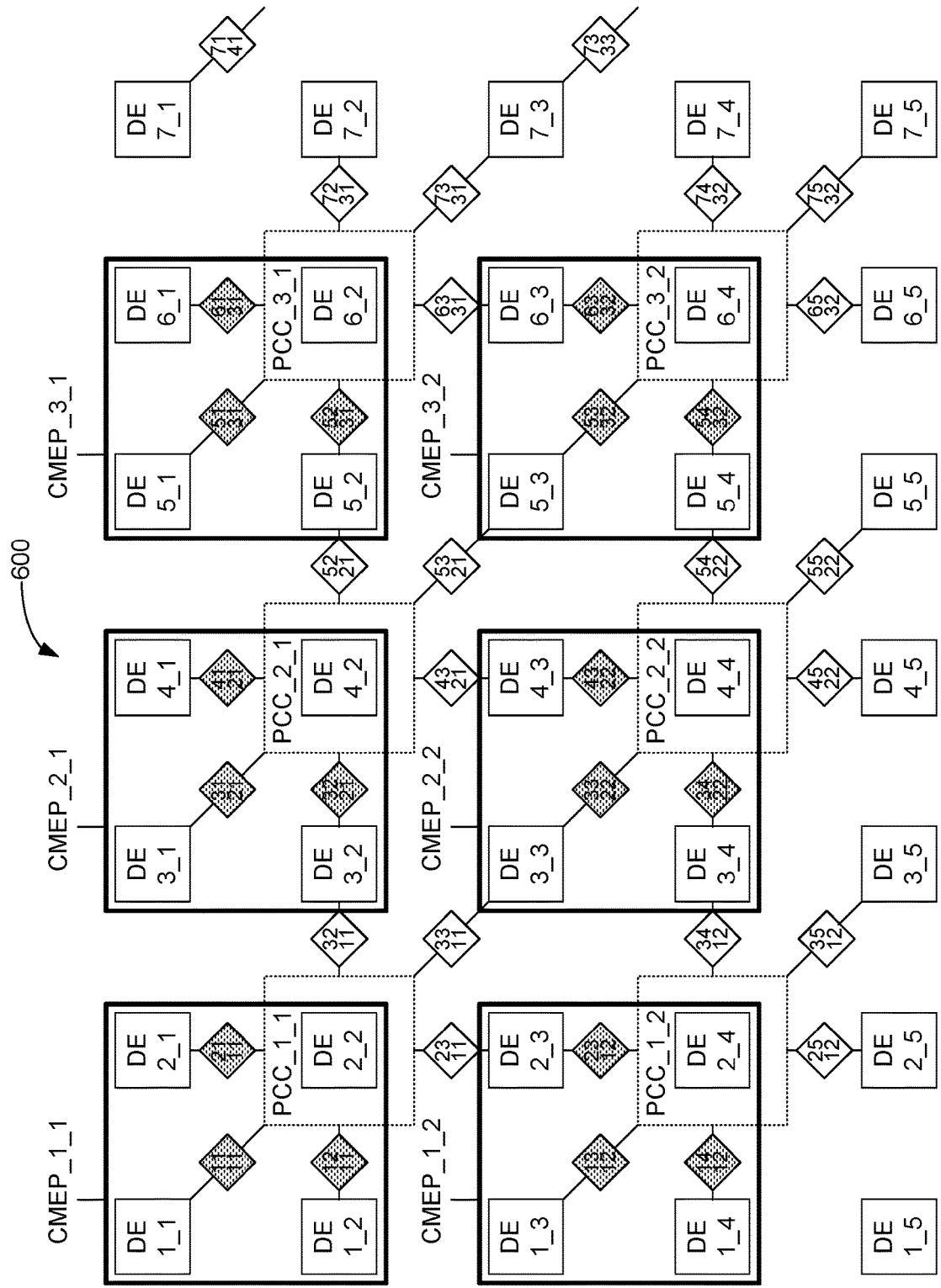
Figure 6C:
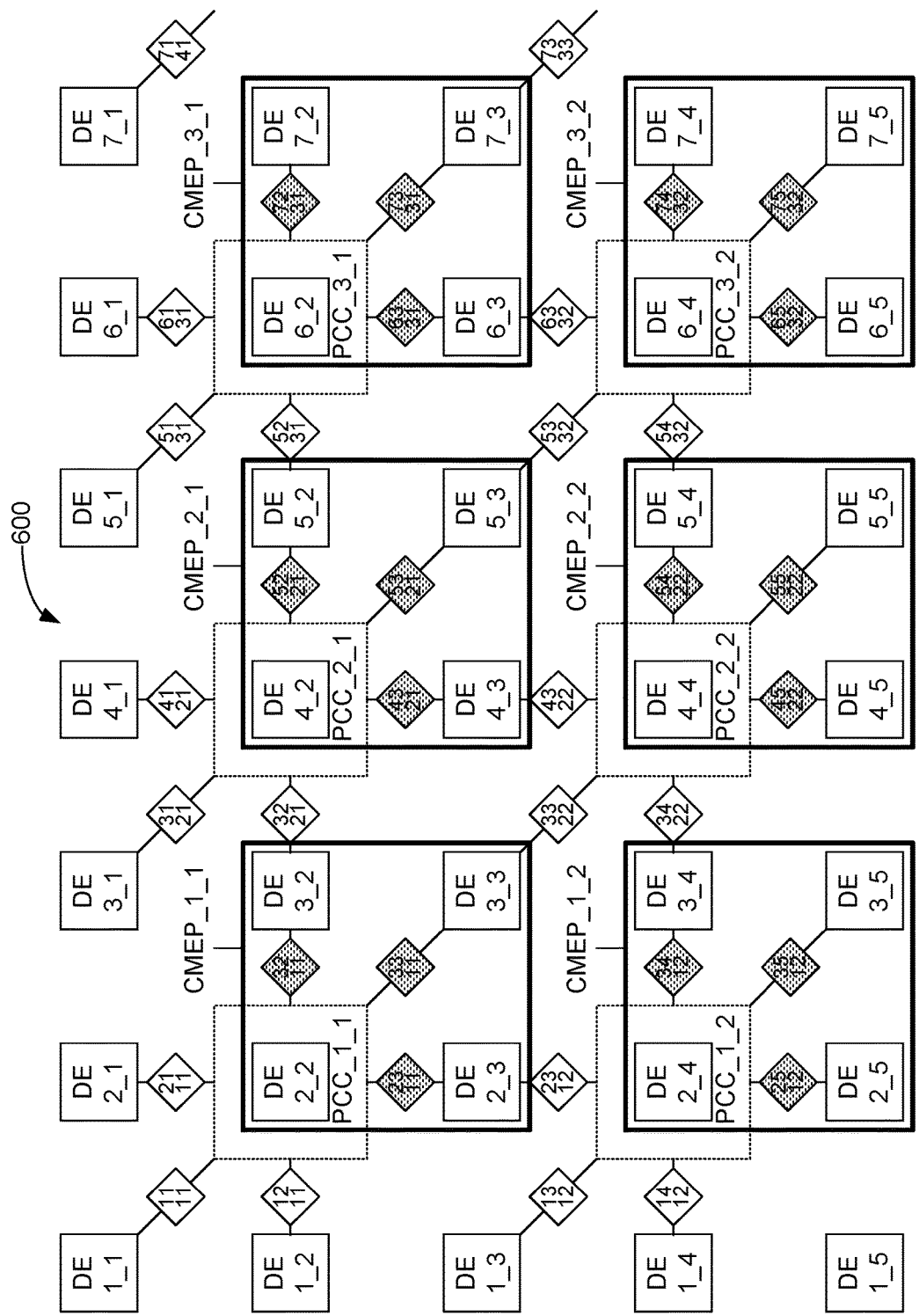

Specifically, pixel control circuit PCC_1_1 is behind dot electrode DE_2_2, pixel control circuit PCC_2_1 is behind dot electrode DE_4_2 and in general a pixel control circuit PCC_X_Y is behind dot electrode DE_(2*X)_(2*Y). Furthermore dot electrode DE_(2*X)_(2*Y), which is in front of a pixel control circuit PCC_X_Y is coupled to pixel control circuit PCC_X_Y. Thus, for example pixel control circuit PCC_3_2 is coupled to dot electrode DE_6_4. The primary difference between light modulating backplane 400 and light modulating backplane 600 is that dot electrode connection circuits in light modulating backplane 600 are coupled between dot electrodes and pixel control circuits, whereas in light modulating backplane 400 some dot electrode connection circuits are coupled between dot electrodes. Therefore for FIG. 6A, a dot electrode connection circuit is DECC_IJ_XY is coupled between dot electrode DE_I_J and pixel control circuit PCC_X_Y. However Due to space constraints in FIG. 6A, each dot electrode connection circuit DECC_IJ_XY is drawn as a diamond and labeled as IJ over XY. Thus for example dot electrode connection circuit DECC_32_11 is coupled between dot electrode DE_32_11 is a diamond with the label 32 over 11. In actual implementation, the dot electrodes would be on a first plane overlying the pixel control circuits and dot electrode connection circuits. In addition due to space constraints the control lines for the dot electrode connection circuits are omitted. For Clarity, FIGS. 6B and 6C are included to illustrate the state of the dot electrode connection circuits for odd fields (FIG. 6B) and even fields (FIG. 6C). Specifically, in FIGS. 6B and 6C dot electrode connection circuits in the active state (i.e. conducting) are shaded while the dot electrode connection circuits in the inactive state (i.e. non-conducting) are not shaded. Furthermore, configurable multi-electrode pixels are marked by large squares in FIGS. 6B and 6C.

Pixel control circuit PCC_1_1, which is part of configurable multi-electrode pixel CMEP_1_1 in FIGS. 6B and 6C, is coupled to dot electrode DE_2_2. Dot electrode connection circuit DECC_11_11 is coupled between dot electrode DE_1_1 pixel control circuit PCC_1_1. Dot electrode connection circuit DECC_21_11 is coupled between dot electrode DE_2_1 pixel control circuit PCC_1_1. Dot electrode connection circuit DECC_12_11 is coupled between dot electrode DE_1_2 pixel control circuit PCC_1_1. Dot electrode connection circuit DECC_32_11 is coupled between dot electrode DE_3_2 pixel control circuit PCC_1_1. Dot electrode connection circuit DECC_23_11 is coupled between dot electrode DE_2_3 pixel control circuit PCC_1_1. Dot electrode connection circuit DECC_33_11 is coupled between dot electrode DE_3_3 pixel control circuit PCC_1_1. As shown in FIG. 6B, for odd fields, dot electrode connection circuits DECC_11_11, DECC_21_11 and DECC_12_11 are all set to the active state (i.e. conducting) allowing pixel control circuit PCC_1_1 to control dot electrodes DE_1_1, DE_2_1, DE_1_2, and DE_2_2. As shown in FIG. 6C, for even fields, dot electrode connection circuits DECC_32_11, DECC_23_11, and DECC_33_11 are all set to the active state (i.e. conducting) allowing pixel control circuit PCC_1_1 to control dot electrodes DE_2_2, DE_3_2, DE_2_3, and DE_3_3.

Pixel control circuit PCC_2_1, which is part of configurable multi-electrode pixel CMEP_2_1 in FIGS. 6B and 6C, is coupled to dot electrode DE_4_2. Dot electrode connection circuit DECC_31_21 is coupled between dot electrode DE_3_1 pixel control circuit PCC_2_1. Dot electrode connection circuit DECC_41_21 is coupled between dot electrode DE_4_1 pixel control circuit PCC_2_1. Dot electrode connection circuit DECC_32_21 is coupled between dot electrode DE_3_2 pixel control circuit PCC_2_1. Dot electrode connection circuit DECC_52_21 is coupled between dot electrode DE_5_2 pixel control circuit PCC_2_1. Dot electrode connection circuit DECC_43_21 is coupled between dot electrode DE_4_3 pixel control circuit PCC_2_1. Dot electrode connection circuit DECC_53_21 is coupled between dot electrode DE_5_3 pixel control circuit PCC_2_1. As shown in FIG. 6B, for odd fields, dot electrode connection circuits DECC_31_11, DECC_41_21 and DECC_32_21 are all set to the active state (i.e. conducting) allowing pixel control circuit PCC_2_1 to control dot electrodes DE_3_1, DE_4_1, DE_3_2, and DE_4_2. As shown in FIG. 6C, for even fields, dot electrode connection circuits DECC_52_11, DECC_43_11, AND DECC_53_21 are all set to the active state (i.e. conducting) allowing pixel control circuit PCC_2_1 to control dot electrodes DE_4_2, DE_5_2, DE_4_3, and DE_5_3.

In general, a pixel control circuit PCC_X_Y, which is part of configurable multi-electrode pixel CMEP_X_Y, is coupled to dot electrode DE_(2*X)_(2*Y). Dot electrode connection circuit DECC_(2*X−1)_(2*Y−1)_XY is coupled between dot electrode DE_(2*X−1)_(2*Y−1) pixel control circuit PCC_X_Y. Dot electrode connection circuit DECC_(2*X)_(2*Y−1)_XY is coupled between dot electrode DE_(2*X)_(2*Y−1) pixel control circuit PCC_X_Y. Dot electrode connection circuit DECC_(2*X−1)_(2*Y)_XY is coupled between dot electrode DE_(2*X−1)_(2*Y) pixel control circuit PCC_X_Y. Dot electrode connection circuit DECC_(2*X+1)_(2*Y)_XY is coupled between dot electrode DE_(2*X+1)_(2*Y) pixel control circuit PCC_X_Y. Dot electrode connection circuit DECC_(2*X+1)_(2*Y)_XY is coupled between dot electrode DE_(2*X)_(2*Y+1) pixel control circuit PCC_X_Y. Dot electrode connection circuit DECC_(2*X+1)_(2*Y+1)_XY is coupled between dot electrode DE_(2*X+1)_(2*Y+1) pixel control circuit PCC_X_Y. For odd fields, dot electrode connection circuits DECC_(2*X−1)_(2*Y−1)_XY, DECC_(2*X)_(2*Y−1)_XY, and DECC_(2*X−1)_(2*Y)_XY are all set to the active state (i.e. conducting) allowing pixel control circuit PCC_X_Y to control dot electrodes DE_(2*X−1)_(2*Y−1), DE_(2*X)_(2*Y−1), DE_(2*X−1)_(2*Y), and DE_(2*X)_(2*Y). For even fields, dot electrode connection circuits DECC_(2*X+1)_(2*Y+1)_XY, DECC_(2*X)_(2*Y+1)_XY, and DECC_(2*X+1)_(2*Y)_XY are all set to the active state (i.e. conducting) allowing pixel control circuit PCC_X_Y to control dot electrodes DE_(2*X+1)_(2*Y+1), DE_(2*X)_(2*Y+1), DE_(2*X+1)_(2*Y), and DE_(2*X)_(2*Y).

Figure 7:
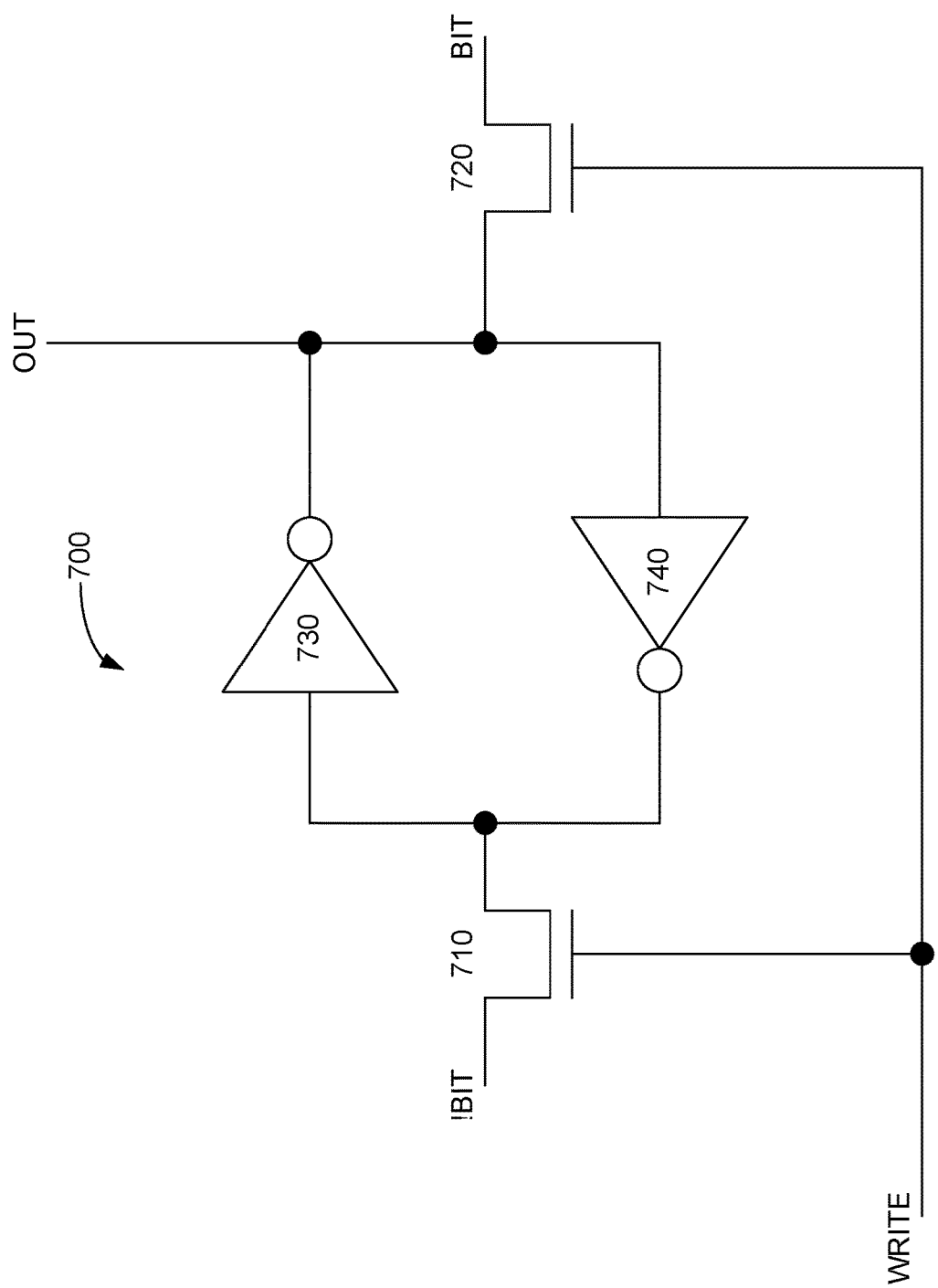
FIG. 7 is a schematic diagram of a pixel control circuit in accordance with one embodiment of the present invention.

In most embodiments of the present invention, each pixel control circuits is a one-bit memory cell. The value of the memory cell is rapidly changed using various pulse width modulation techniques to create different contrast levels in the configurable multi-electrode pixels. Most Conventional memory cells can be used for pixel control circuits. FIG. 7 is a circuit diagram of memory cell 700 used in some embodiment of the present invention. Memory Cell 700 includes a transistor 710, an transistor 720, an inverter 730, and an inverter 740. Inverters 730 and 740 are cross coupled (i.e. the input terminal of inverter 720 is coupled to the output terminal of inverter 740 and the input terminal of inverter 740 is coupled to the output terminal of inverter 730) to store a bit value. The output terminal of inverter 730 provides output terminal OUT for memory cell 700. Output terminal OUT would be coupled to dot electrodes and dot electrode connection circuits. Transistors 710 and 720 are used to change the value stored by inverters 730 and 740. Specifically, complementary input signals BIT and !BIT are applied to an input terminal of transistor 720 and 710, respectively. The output terminal of transistor 710 is coupled to the input terminal of inverter 730 and the output terminal of transistor 720 is coupled to the input terminal of inverter 740. The gate terminals of transistor 710 and 720 are coupled to a write control signal WRITE. When write control signal WRITE is in an active state (e.g. logic one), the bit stored by inverter 730 and 740 is overwritten by transistors 710 and 720. When write control signal WRITE is in the inactive state then the inverters 730 and 740 are undisturbed and stores the current bit value. In most embodiments of the present inventions, pixel control circuits are formed as a memory array. In these embodiments write control circuit WRITE is often called a row select line and complementary inputs BIT and !BIT would extend to multiple columns of memory cells.

Dot electrode connection circuits are simple switches that can put in an active state that is electrically conductive or an inactive state that is not electrically conductive (i.e. non-conductive). Any circuit that can be configured to be conductive or not conductive can be used as a dot electrode connection circuit. FIG. 8 is a circuit diagram of a dot electrode connection circuit 800 used in some embodiments of the present invention. Dot electrode connection circuit 800 is a conventional CMOS transmission gate made up of a NMOS transistor 810 and a PMOS transistor 820 coupled in parallel between a first input/output terminal 101 and a second input/output terminal 102. A first control terminal C is coupled to the gate terminal of NMOS transistor 810 and a second control terminal !C is coupled to the gate terminal of PMOS transistor 820. When control signal C is at logic high and control signal !C is at logic low, dot electrode connection circuit 800 is in the active state and becomes conductive between input output terminal 101 and input/output terminal 102. Conversely, When control signal C is at logic low and control signal !C is at logic high, dot electrode connection circuit 800 is in the inactive state and becomes non-conductive between input output terminal 101 and input/output terminal 102.

Figure 9:
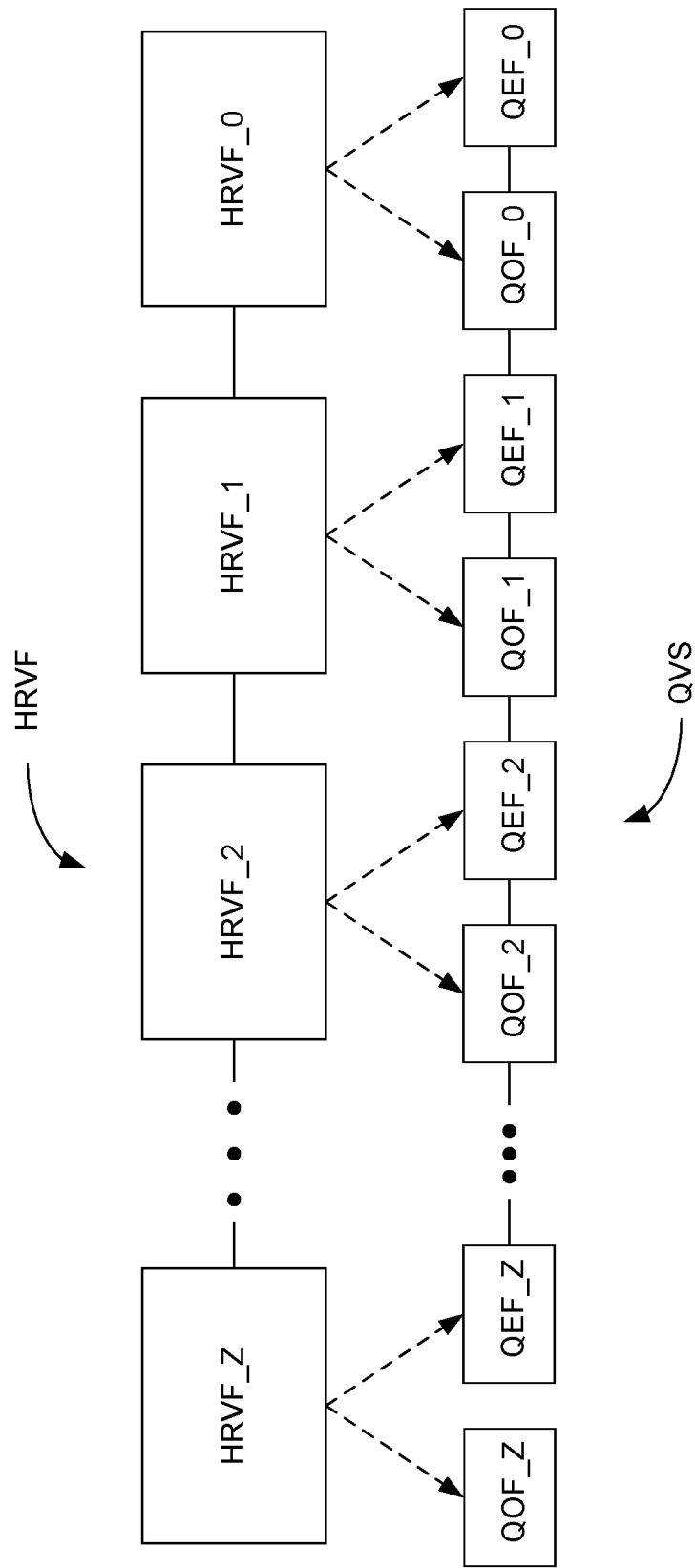
FIG. 9 illustrates the creation of a quincunx video stream from a high resolution video stream.

As illustrated in FIG. 9, a high resolution video stream HRVS includes Z+1 high resolution video frames HRVF_0, HRVF_1, HRVF_2, to HRVF_Z, where Z is a positive integer. A quincunx video stream QVS is formed from high resolution video stream HRVS by sub-sampling each high resolution video frame to form a quincunx even field and a quincunx odd field.

Specifically as shown in FIG. 9, Quincunx even field QEF_0 and quincunx odd field QOF_0 are formed by sub-sampling high resolution video frame HRVF_0; quincunx even field QEF_1 and a quincunx odd field QOF_1 are formed by sub-sampling high resolution video frame HRVF_1; Quincunx even field QEF_2 and a quincunx odd field QOF_2 are formed by sub-sampling high resolution video frame HRVF_2 and so forth until quincunx even field QEF_Z and a quincunx odd field QOF_Z are formed by sub-sampling high resolution video frame HRVF_Z. Specifically, each pixel in the quincunx even field has an associated pixel in the high resolution video frame. Similarly, each pixel in the quincunx odd field has an associated pixel in the high resolution video frame.

Figure 10A:
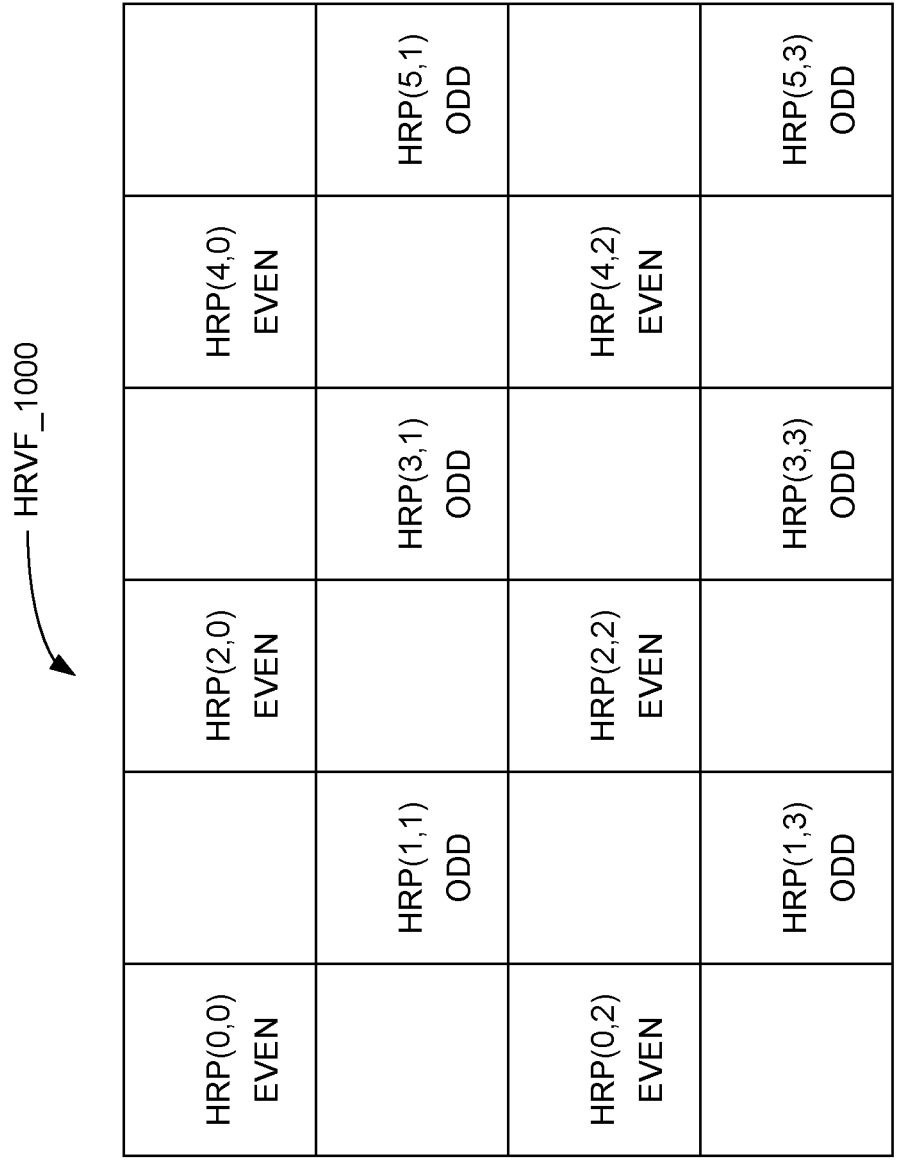

FIG. 10A illustrates the sub-sampling for quincunx interlacing. Specifically, FIG. 10 shows a small section of a high resolution video frame HRVF_1000. More specifically, twenty four pixels from the top left corner of high resolution video frame HRVF_1000 are shown. The pixels of high resolution video frame HRVF_1000 have an x-coordinate indicating the column location of the pixel and a y-coordinate indicating the row location of the pixel. Pixels in high resolution video frame HRVF_1000 are labeled as pixel HRP{x, y}. With pixel HRP(0, 0) being in the top left corner of high resolution video frame HRVF_1000.

Quincunx even field QEF_1000 (a portion of which is shown in FIG. 10B) has only one forth the number of pixels as high resolution frame HRVF_1000. Each pixel QEP(i, j) of quincunx even field is associated with pixel HRP(2*i, 2*j) of high resolution video frame HRVF_1000. Thus the x and y coordinate of the pixels associated with the pixels of the quincunx even field are both even. In FIG. 10A, each pixel HRP(x, y) in which both x and y are even are used to form the quincunx even field and are labeled with "EVEN" for clarity. In FIG. 10B, each pixel QEP(i, j) in quincunx even field QEF_1000 is equal to pixel HRP(2*i, 2*j) of high resolution video frame HRFV_1000. Thus, as shown in FIG. 10B, pixel QEP(0, 0) is set equal pixel HRP(0, 0); pixel QEP(1, 0) is set equal pixel HRP(2, 0); pixel QEP(2, 0) is set equal pixel HRP(4, 0); pixel QEP(0, 1) is set equal pixel HRP(0, 2); pixel QEP(1, 1) is set equal pixel HRP(2, 2); pixel QEP(2, 1) is set equal pixel HRP(4, 2).

Figure 10C:
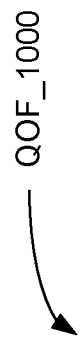

Quincunx odd field QEF_1000 (a portion of which is shown in FIG. 10C) has only one forth the number of pixels as high resolution frame HRVF_1000. Each pixel QOP(i, j) of quincunx even field is associated with pixel HRP(2*i+1, 2*j+1) of high resolution video frame HRVF_1000. Thus the x and y coordinate of the pixels associated with the pixels of the quincunx odd field are both odd. In FIG. 10A, each pixel HRP(x, y) in which both x and y are odd are used to form the quincunx odd field and are labeled with "ODD" for clarity. In FIG. 10C, each pixel QEP(i, j) in quincunx even field QEF_1000 is equal to pixel HRP(2*i+1, 2*j+1) of high resolution video frame HRFV_1000. Thus, as shown in FIG. 10C, pixel QOP(0, 0) is set equal pixel HRP(1, 1); pixel QOP(1, 0) is set equal pixel HRP(3, 1); pixel QOP(2, 0) is set equal pixel HRP(5, 1); pixel QOP(0,1) is set equal pixel HRP(1, 3); pixel QOP(1, 1) is set equal pixel HRP(3, 3); pixel QOP(2,1) is set equal pixel HRP(5, 3).

While the quincunx interlacing scheme shown in FIG. 10A-10C naturally leads to calling the quincunx fields as "odd" and "even" because in the quincunx odd field, the x and y coordinates of the associated pixels from the high resolution video frames are odd and in the quincunx even field the x and y coordinates of the associated pixels from the high resolution video frames are even. However, more generally for each high resolution video frame a first-type quincunx field and a second-type quincunx field is generated. The associated pixels used to generate the first-type quincunx field are diagonally offset from the associated pixels used to generate the second-type quincunx field. For example, in one embodiment of the present invention, each pixel FTQFP(x, y) of the first-type quincunx field is associated with pixel HRP(2*x+1, 2*y) of the high resolution video frame. While each pixel STQFP(i, j) of the second-type quincunx field is associated with pixel HRP(2*i, 2*j+1) of the high resolution video frame. In this embodiment the arrangement of dot electrodes shown in FIGS. 4D and 4E would be used to display the quincunx video stream.

In general interlace displays do not provide the same picture quality of progressive displays at the same resolution level. For example a high definition display has a resolution of 1920×1080. A display using quincunx interlacing would only need a resolution of 960×540 to display the high definition images. However, the picture quality would be lower on the quincunx interlaced display. Therefore, some embodiments of the present invention achieve equivalent picture quality using a novel oversampling technique. Specifically, in some embodiments of the present invention, a quincunx interlaced display would have a resolution higher than 960×540 but lower than 1920×1080. For example a specific embodiment of the present invention using quincunx interlacing has a resolution of 1280×720 which is similar to a 2560×1440 resolution. The image quality of the higher resolution quincunx interlace display compensates for the interlacing technique to improve the picture quality to the same level as the 1920×1080 display.

In other embodiments of the present invention, the incoming high resolution video stream is processed specifically for quincunx interlacing so that the image quality of the quincunx interlace display is improved to almost the same image quality of a more expensive higher resolution display. For example, in some embodiments of the present invention, the pixels in the quincunx fields are generated using group of pixels near the associated pixel of the high resolution video frame rather than just copying the associated pixel from the high resolution video frame. For clarity, a specific embodiment of the invention using even and odd quincunx fields is described in detail however other embodiments of the present invention may use other fields.

As illustrated in FIG. 11, to generate a quincunx pixel QP(x, y) of a quincunx field, a pixel block PB_1100 of high-resolution pixels from a high resolution video frame is filtered by a smoothing filter F_1110. Pixel Block PB_1100 of high-resolution pixels includes the associated pixel of quincunx pixel QP(x, y). Specifically, quincunx pixel QP(x, y) is associated with high-resolution pixel HRP(s, t) of high resolution video frame 1100. As used herein "high resolution pixel" refers to a pixel from a high resolution video frame and "quincunx pixel" refers to a pixel in a quincunx field.

For clarity the high resolution pixels in pixel block PB_1100 are labeled starting in the top left corner and going to the right in the top row as HRP(s−1, t−1), HRP (s, t−1), HRP(s+1, t−1), HRP(s+2, t−1); in the second row as HRP (s−1, t), HRP (s, t), HRP(s+1, t), HRP(s+2, t); in the third row as HRP(s−1, t+1), HRP (s, t+1), HRP(s+1, t+1), HRP (s+2, t+1), and in the bottom row as HRP(s−1, t+2), HRP (s, t+2), HRP(s+1, t+2), and HRP(s+2, t+2), where s and t are integers that depend on x and y (i.e. pixel QP(x, y) as explained below). Smoothing filter F_1110 includes 16 filter values also arranged in a 4×4 block. The filter values in smoothing filter F_1110 are labeled starting in the top left corner and going to the right in the top row as F(−1, −1), F(0, −1), F(1, −1), F(2, −1); in the second row as F(−1, 0), F(0, 0), F(1, 0), F(2, 0); in the third row as F(−1, 1), F(0, 1), F(1, 1), F(2, 1); and in the bottom row as F(−1, 2), F(0, 2), F(1, 2), and F(2, 2). The pixels and filter values are applied to a cross correlation circuit 1120, which generates quincunx pixel QP(x, y). Other embodiments of the present invention may use a different number of pixels and different sized filters to calculate quincunx pixels. Some of these additional embodiments are described below.

Cross correlation circuit 1120 multiples each pixel of the 4×4 pixel block with the filter value in the same location within the 4×4 block of filter values and sums up the 16 products. Generally, each color component of the pixel is calculated separately. Thus if the pixels are stored in RGB format, the red component of quincunx pixel QP(x, y) is calculated using the red components of each of the high resolution pixels. Similarly, the blue component of quincunx pixel QP(x, y) is calculated using the blue components of each of the high resolution pixels; and the green component of quincunx pixel QP(x, y) is calculated from the green components of each of the high resolution pixels.

For a quincunx even fields as described above with respect to the "EVEN" and "ODD" pixels shown in FIG. 10. The variables s and t, which is used to select and index the pixels of the high resolution video frame are equal to 2 times x and 2 times y respectively, where x and y are used to index the quincunx pixels in the quincunx even field. For quincunx odd fields The variables s and t, which is used to select and index the pixels of the high resolution video frame are equal to 2 times x plus 1 and 2 times y plus 1, respectively, where x and y are used to index the quincunx pixels in the quincunx even field.

In most embodiments of the present invention, the filter values of smoothing filter 1110 are configurable. To improve image quality of the quincunx display, the smoothing filter should cause a smoothing (or blurring) effect in a 2×2 array while also having a sharpening effect on pixels outside the 2×2 array. In general, the magnitude (i.e. absolute value) of the filter values at the edge of the filter should be smaller than the magnitude of the filter values near the center of the filter. Furthermore, the filter values near the center of the filter should be positive, while the filter values near the edge of the filter can be negative. For example in many embodiments of the present invention, the magnitude of the filter values at near the center of the filter are ten times the magnitude of the filter values near the edge of the filter. To maintain the same brightness the sum of all the filter values is usually equal to 1. However in some embodiments of the present invention the brightness of the video may be adjusted by having the filter values add up to be greater than or less than 1.

FIG. 12A illustrates the filter values in a smoothing filter F_1210 in accordance to one embodiment of the present invention. In smoothing filter F_1210, the four filter values in the center of smoothing filter F_1210 (i.e. the four center values) are equal to 5/16. The four filter values in the corner of smoothing filter F_1210 (i.e. the four corner values) are equal to 0. The eight filter values at the sides of smoothing filter F_1210 (i.e. the eight side values) are equal to −1/32. Specifically, filter values F(0, 0), F(1, 0), and F(0, 1) are equal to 5/16; filter values F(−1, −1), F(2, −1), F(−1, 2), and F(2, 2) are equal to 0; and filter values F(0, −1), F(1, −1), F(−1, 0), F(2, 0), F(−1, 1), F(2, 1), F(0, 2), and F(1, 2) are equal to −1/32.

FIG. 12A illustrates the filter values in a smoothing filter F_1210 in accordance to one embodiment of the present invention. In smoothing filter F_1210, the four filter values in the center of smoothing filter F_1210 are equal to 5/16. The four filter values in the corner of smoothing filter F_1210 are equal to 0. And the 8 filter values at the sides of smoothing filter F_1210 are equal to −1/32. Specifically, filter values F(0, 0), F(1, 0), and F(0, 1) are equal to 5/16; filter values F(−1, −1), F(2, −1), F(−1, 2), and F(2, 2) are equal to 0; and filter values F(0, −1), F(1, −1), F(−1, 0), F(2, 0), F(−1, 1), F(2, 1), F(0, 2), and F(1, 2) are equal to −1/32.

FIG. 12B illustrates the filter values in a smoothing filter F_1210 in accordance to another embodiment of the present invention. In smoothing filter F_1220, the four filter values in the center of smoothing filter F_1220 are equal to 5/14. The four filter values in the corner of smoothing filter F_1220 8 filter values at the sides of smoothing filter F_1220 are equal to −1/28. Specifically, filter values F(0, 0), F(1, 0), and F(0, 1) are equal to 5/14; and filter values F(−1, −1), F(2, −1), F(−1, 2), F(2, 2), F(0, −1), F(1, −1), F(−1, 0), F(2, 0), F(−1, 1), F(2, 1), F(0, 2), and F(1, 2) are equal to −1/28

Figure 12C:

FIG. 12C illustrates the filter values in a smoothing filter F_1230 in accordance to one embodiment of the present invention. In smoothing filter F_1230, the four filter values in the center of smoothing filter F_1230 are equal to 1/3. The two filter values in the top right corner and bottom left corner of smoothing filter F_1230 are equal to 0. And the 8 filter values at the sides of smoothing filter F_1210 are equal to −1/32. Specifically, filter values F(0, 0), F(1, 0), and F(0, 1) are equal to 1/3; filter values F(2, −1) and F(−1, 2) are equal to 0; and filter values F(−1, −1), F(2, 2), F(0, −1), F(1, −1), F(−1, 0), F(2, 0), F(−1, 1), F(2, 1), F(0, 2), and F(1, 2) are equal to −1/30.

Figure 13:
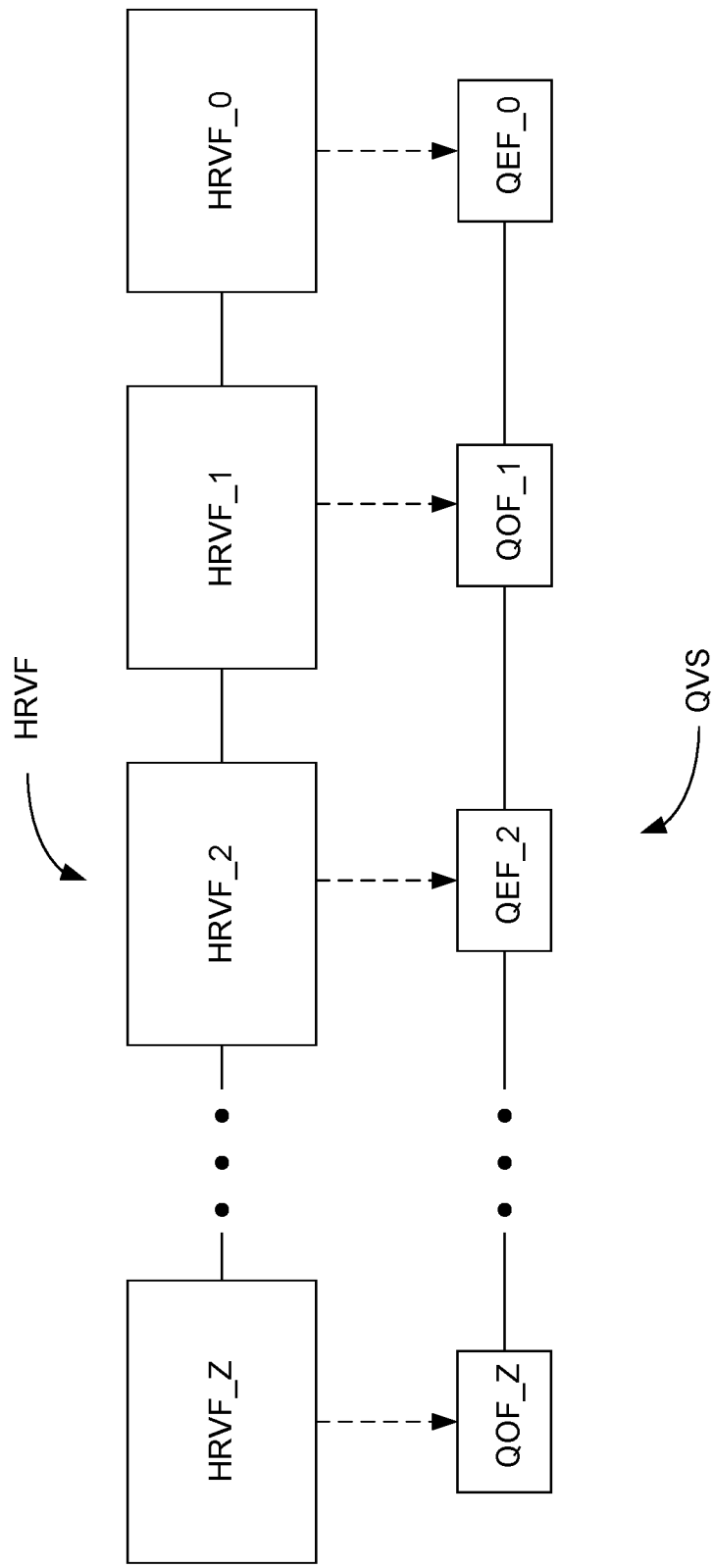
FIG. 13 illustrates the creation of a quincunx video stream from a high resolution video stream in accordance with one embodiment of the present invention.

By using a smoothing filter with quincunx interlacing, the image quality of the quincunx display is greatly improved. Some embodiments of the present invention, take advantage of the improved image quality by reducing the field count and size of the quincunx video stream. As illustrated in FIG. 13, a high resolution video stream HRVS includes Z+1 high resolution video frames HRVF_0, HRVF_1, HRVF_2, to HRVF_Z, where Z is a positive integer. A quincunx video stream QVS is formed from high resolution video stream HRVS using the techniques described above. However, instead of forming both a quincunx even field and a quincunx odd field from each high resolution video frame, only a single quincunx field is formed from each high resolution video frame. Specifically as shown in FIG. 9, quincunx even field QEF_0 is formed from high resolution video frame HRVF_0; quincunx odd field QOF_1 are formed from high resolution video frame HRVF_1; Quincunx even field QEF_2 is formed from high resolution video frame HRVF_2 and so forth until quincunx odd field QOF_Z is formed from high resolution video frame HRVF_Z (assuming Z is an odd number). Thus, for each high resolution video frame HRVF_X, a quincunx even field QEF_X is formed if X is an even number or a quincunx odd field QOF_X is formed if X is an odd number. As explained a quincunx field only has a quarter of the pixels as a high resolution video frame. Thus, by only creating a single quincunx field from each high resolution video frame a high level of video compression is achieved.

FIGS. 14A and 14B shows a pixel block PB_1410 and a smoothing filter F_1420 used in another embodiment of the present invention. In particular, pixel block PB_1410 includes four high resolution pixels arranged in a 2×2 block For clarity the pixels in the top row starting in the top left corner and going to the right are labeled as HRP(s, t) and HRP (s+1, t). The pixels in the second row are labeled as HRP (s, t+1) and HRP(s+1, t+1). The variables s and t are integers that depend on x and y (i.e. pixel QP(x, y)) as explained above. Smoothing filter F 1410 includes 4 filter values also arranged in a 2×2 block. The filter values in smoothing filter F_1420 are labeled starting in the top left corner and going to the right in the top row as F(0, 0) and F(1, 0). In the second row, the filter values are labeled as F(0, 1) and F(1, 1). All of the filter values in filter F_1420 are equal to 1/4.

Figure 15B:
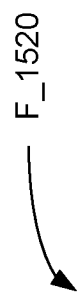
FIGS. 15A and 15B, show the pixel block and smoothing filter used in another embodiment of the present invention.
Figure 15A:
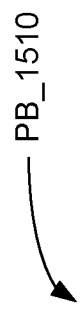

FIGS. 15A and 15B shows a pixel block PB_1510 and a smoothing filter F_1520 used in another embodiment of the present invention. In particular, pixel block PB_1510 includes nine high resolution pixels arranged in a 3×3 block For clarity the pixels in the top row starting in the top left corner and going to the right are labeled as HRP(s, t), HRP(s+1, t) and HRP (s+2, t). The pixels in the second row are labeled as HRP (s, t+1), HRP(s+1, t+1), and HRP(s+2, t+1). The pixels in the third row are labeled as HRP(s, t+2), HRS(s+1, t+2), and HRP(s+2, t+2). The variables s and t are integers that depend on x and y (i.e. pixel QP(x, y)) as explained above. Smoothing filter F_1510 includes 9 filter values also arranged in a 3×3 block. The filter values in smoothing filter F_1520 are labeled starting in the top left corner and going to the right in the top row as F(0, 0), F(1, 0), F(2,0). In the second row, the filter values are labeled as F(0, 1), F(1, 1), and F(2, 1). In the third row, the filter values are labeled as F(0, 2), F(1, 2), and F(2, 2). In filter F_1520, filter values F(0, 0), F(1, 0), F(0, 1), and F(1,1) are equal to 1/3. Filter values F(2,0), F(2, 1), F(0, 2), F(1, 2), and F(2, 2) are equal to −1/15. {Should also be changed in FIG. 15B unless this is for the purpose of showing a non unity filter}

As explained above with respect to FIGS. 4A-4E and FIGS. 5A-5E, the light modulating backplanes of the present invention have four arrangements of configurable multi-electrode pixels. Some embodiments of the present invention can make use of all four arrangements of configurable multi-electrode pixels to display a video stream. For these embodiments a high resolution video frame can be sub-sampled four different ways to form four different quincunx video fields. For clarity the four different quincunx fields that can be sub-sampled from a high resolution video frame are called the quincunx top left field, the quincunx top right field, the quincunx bottom left field, and the quincunx bottom right field. Conceptually, the high resolution frame is divided into 2×2 blocks of 4 pixels. Each pixel of quincunx top left field is associated with a top left pixel a block of pixels; each pixel of quincunx top right field is associated with a top right pixel of a block of pixels; each pixel of quincunx bottom left field is associated with the bottom left pixel of a block of pixels; and each pixel of quincunx bottom right field is associated with the bottom right pixel of a pixel block. Quincunx video streams that use four different quincunx video fields will be called quad-quincunx video streams.

Figure 16:
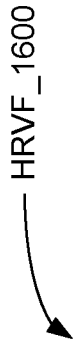
FIG. 16 illustrates the relationship of quincunx pixels and high resolution pixels.

FIG. 16 illustrates the sub-sampling of the four quincunx field more precisely. Specifically, FIG. 16 shows a small section of a high resolution video frame HRVF_1600. More specifically, twenty four pixels from the top left corner of high resolution video frame HRVF_1600 are shown. The pixels of high resolution video frame HRVF_1600 have an x-coordinate indicating the column location of the pixel and a y-coordinate indicating the row location of the pixel. Pixels in high resolution video frame HRVF_1000 are labeled as pixel HRP{x, y}. With pixel HRP(0, 0) being in the top left corner of high resolution video frame HRVF_1000.

Quincunx top left field QTLF_1700 (a portion of which is shown in FIG. 17A) has only one forth the number of pixels as high resolution frame HRVF_1600. Each pixel QTLP(i, j) of quincunx top left field is associated with pixel HRP(2*i, 2*j) of high resolution video frame HRVF_1600. In FIG. 16, each pixel HRP(x, y) in which both x and y are even are used to form the quincunx top left field and are labeled with "TL" for clarity. In FIG. 17A, each pixel QTLP(i, j) in quincunx top left field QEF_1700 is equal to pixel HRP(2*i, 2*j) of high resolution video frame HRFV_1600. Thus, as shown in FIG. 17A, pixel QTLP(0, 0) is set equal to pixel HRP(0, 0); pixel QTLP(1, 0) is set equal to pixel HRP(2, 0); pixel QTLP(2, 0) is set equal to pixel HRP(4, 0); pixel QTLP(0, 1) is set equal pixel HRP(0, 2); pixel QTLP(1, 1) is set equal to pixel HRP(2, 2); pixel QTLP(2, 1) is set equal pixel HRP(4, 2).

Quincunx top right field QTRF_1700 (a portion of which is shown in FIG. 17B) has only one forth the number of pixels as high resolution frame HRVF_1600. Each pixel QTRP(i, j) of quincunx top right field is associated with pixel HRP(2*i+1, 2*j) of high resolution video frame HRVF_1600. In FIG. 16, each pixel HRP(x, y) in which x is odd and y is even are used to form the quincunx top right field and are labeled with "TR" for clarity. In FIG. 17B, each pixel QTRP(i, j) in quincunx top right field QEF_1700 is equal to pixel HRP(2*i+1, 2*j) of high resolution video frame HRFV_1600. Thus, as shown in FIG. 17B, pixel QTRP(0, 0) is set equal pixel HRP(1, 0); pixel QTRP(1, 0) is set equal pixel HRP(3, 0); pixel QTRP(2, 0) is set equal pixel HRP(5, 0); pixel QTRP(0, 1) is set equal pixel HRP(1, 2); pixel QTRP(1, 1) is set equal pixel HRP(3, 2); pixel QTRP(2, 1) is set equal pixel HRP(5, 2).

Quincunx bottom left field QBLF_1700 (a portion of which is shown in FIG. 17C) has only one forth the number of pixels as high resolution frame HRVF_1600. Each pixel QBLP(i, j) of quincunx even field is associated with pixel HRP(2*i, 2*j+1) of high resolution video frame HRVF_1600. In FIG. 16, each pixel HRP(x, y) in which x is even and y is odd are used to form the quincunx bottom left field and are labeled with "BL" for clarity. In FIG. 17C, each pixel QBLP(i, j) in quincunx bottom left field QBLF_1700 is equal to pixel HRP(2*i, 2*j+1) of high resolution video frame HRFV_1600. Thus, as shown in FIG. 17C, pixel QBLP(0, 0) is set equal pixel HRP(0, 1); pixel QBLP(1, 0) is set equal pixel HRP(2, 1); pixel QBLP(2, 0) is set equal pixel HRP(4, 1); pixel QBLP(0,1) is set equal pixel HRP(0, 3); pixel QBLP(1, 1) is set equal pixel HRP(2, 3); pixel QBLP(2,1) is set equal pixel HRP(4, 3).

Quincunx bottom right field QBRF_1700 (a portion of which is shown in FIG. 17D) has only one forth the number of pixels as high resolution frame HRVF_1600. Each pixel QBRP(i, j) of quincunx even field is associated with pixel HRP(2*i+1, 2*j+1) of high resolution video frame HRVF_1600. In FIG. 16, each pixel HRP(x, y) in which both x and y are odd are used to form the quincunx bottom right field and are labeled with "BR" for clarity. In FIG. 17D, each pixel QBRP(i, j) in quincunx bottom right field QBRF_1700 is equal to pixel HRP(2*i+1, 2*j+1) of high resolution video frame HRFV_1600. Thus, as shown in FIG. 17D, pixel QBRP(0, 0) is set equal pixel HRP(1, 1); pixel QBRP(1, 0) is set equal pixel HRP(3, 1); pixel QBRP(2, 0) is set equal pixel HRP(5, 1); pixel QBRP(0,1) is set equal pixel HRP(1, 3); pixel QBRP(1, 1) is set equal pixel HRP(3, 3); pixel QBRP(2,1) is set equal pixel HRP(5, 3).

The filtering techniques described above with respect to quincunx even fields and quincunx odd fields can also be used to enhance the image quality of the quincunx top left fields, the quincunx top right fields, the quincunx bottom left fields, and the quincunx bottom right fields. However for asymmetrical filters, such as filter F_1230 (FIG. 12C) and filter F_1520 (FIG. 15B), the asymmetrical filters can be rotated 90 degrees for quincunx top right fields and quincunx bottom left fields to improve the video quality of the quad-quincunx video stream.

Figure 18:
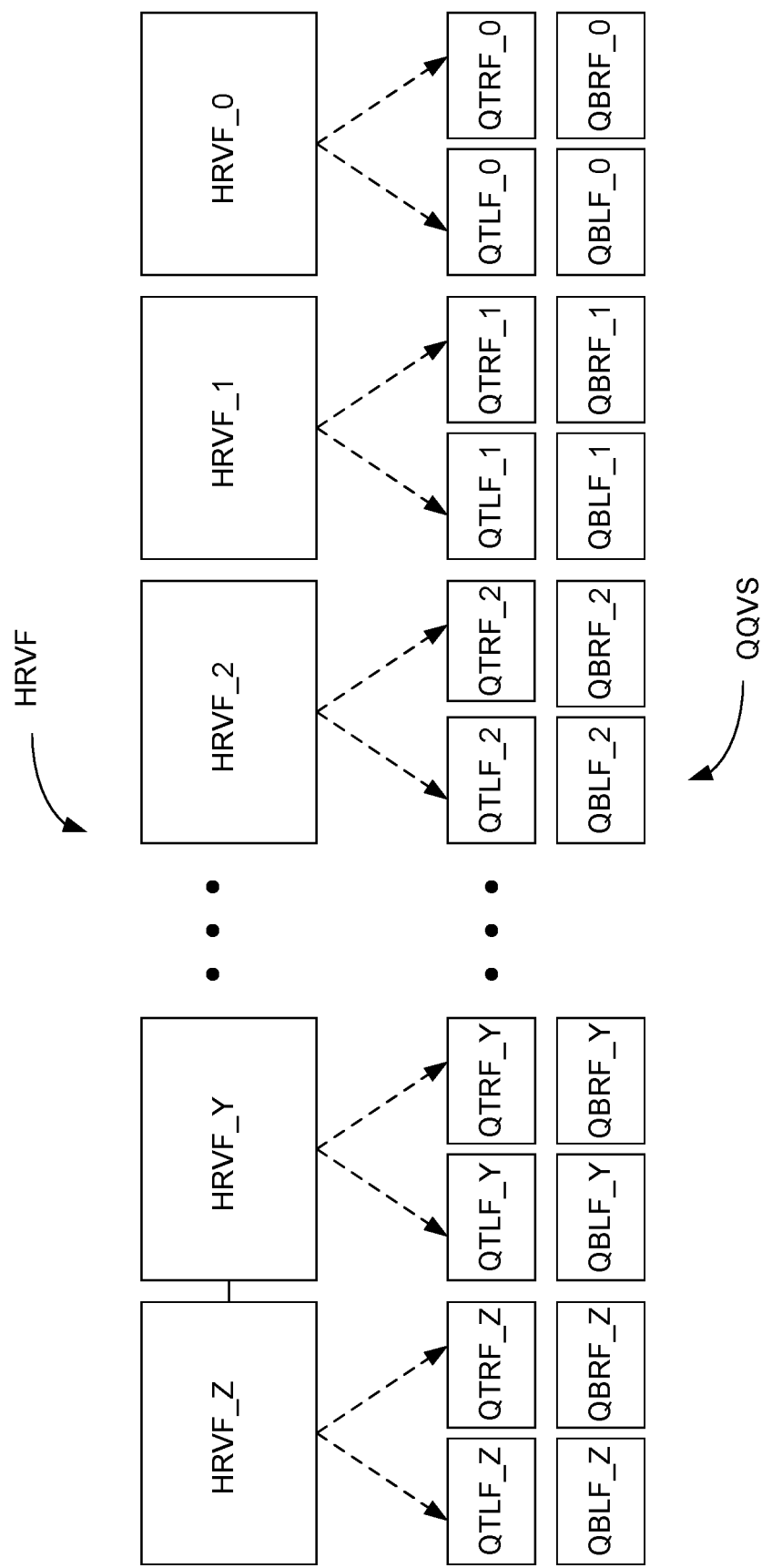
FIG. 18 illustrates the creation of a quad-quincunx video stream from a high resolution video stream in accordance with one embodiment of the present invention.

FIG. 18 illustrates one method to convert a high resolution video stream HRVS into a quad-quincunx video stream QQVS that uses four types of quincunx video fields (i.e. top left, top right, bottom left and bottom right) in accordance with one embodiment of the present invention. Specifically, high resolution video stream HRVS includes Z+1 high resolution video frames HRVF_0, HRVF_1, HRVF_2, to HRVF_Y, and HRVF_Z, (where Y and Z are positive integer and Y is equal to Z−1). Each frame of high resolution video stream HRVS is sub-sampled to create four quincunx fields. Specifically as shown in FIG. 18, high resolution video frame HRVF_0 is sub-sampled to create quincunx top left field QTLF_0, quincunx top right field QTRF_0, quincunx bottom right field QBRF_0, and quincunx bottom left field QBLF_0. High resolution video frame HRVF_1 is sub-sampled to create quincunx top left field QTLF_1, quincunx top right field QTRF_1, quincunx bottom right field QBRF_1, and quincunx bottom left field QBLF_1. High resolution video frame HRVF_2 is sub-sampled to create quincunx top left field QTLF_2, quincunx top right field QTRF_2, quincunx bottom right field QBRF_2, and quincunx bottom left field QBLF_2. This process continues for each video frame until high resolution video frames HRVF_Y and HRVF_Z, which are sub-sampled to create quincunx top left field QTLF_Y, quincunx top right field QTRF_Y, quincunx bottom right field QBRF_Y, and quincunx bottom left field QBLF_Y and quincunx top left field QTLF_Z, quincunx top right field QTRF_Z, quincunx bottom right field QBRF_Z, and quincunx bottom left field QBLF_Z, respectively.

Within quad-quincunx video stream QQVS, each set of quincunx fields created from a high resolution video frame HRVF_X should follow the set of fields created from high resolution video frame HRVF_X−1 and precede the set of fields created from high resolution video frame HRVF_X+1. Thus for example the set of quincunx fields created from high resolution video frame HRVF_1 (i.e. quincunx top left field QTLF_1, quincunx top right field QTRF_1, quincunx bottom right field QBRF_1, and quincunx bottom left field QBLF_1) should follow the set of quincunx field created from high resolution video frame HRVF_0 (i.e. quincunx top left field QTLF_0, quincunx top right field QTRF_0, quincunx bottom right field QBRF_0, and quincunx bottom left field QBLF_0). Conversely, the set of quincunx fields created from high resolution video frame HRVF_1 (i.e. quincunx top left field QTLF_1, quincunx top right field QTRF_1, quincunx bottom right field QBRF_1, and quincunx bottom left field QBLF_1) should precede the set of quincunx field created from high resolution video frame HRVF_2 (i.e. quincunx top left field QTLF_2, quincunx top right field QTRF_2, quincunx bottom right field QBRF_2, and quincunx bottom left field QBLF_2).

The order of the fields in each set can vary between each set or be the same in each set. Generally, consistency in the order of the set would likely improve video quality. In a particular embodiment of the present invention, the order in each set is the quincunx top left field followed by the quincunx top right field followed by the quincunx bottom right field followed by the quincunx bottom left field. In another embodiment of the present invention, the order in each set is the quincunx top left field followed by the quincunx bottom right field followed by the quincunx top right field followed by the quincunx bottom left field. In still another embodiment of the present invention the order in each set is the quincunx bottom right field followed by the quincunx top left field followed by the quincunx bottom left field followed by the quincunx top right field. The field rate of quad-quincunx video stream QQVS in FIG. 18 should be four times greater than the frame rate of high resolution video frame HRVF to maintain consistency between the quincunx video stream and the high resolution video stream.

While quad-quincunx video stream QQVS of FIG. 18 would have a very high quality image, the high field rate and large data size of quad-quincunx video QQVS may be problematic. Therefore, some embodiments of the present invention use a reduced field rate with a smaller data size by creating less than four fields from each high resolution video frame however, the type if quincunx field would differ from frame to frame.

Figure 19:
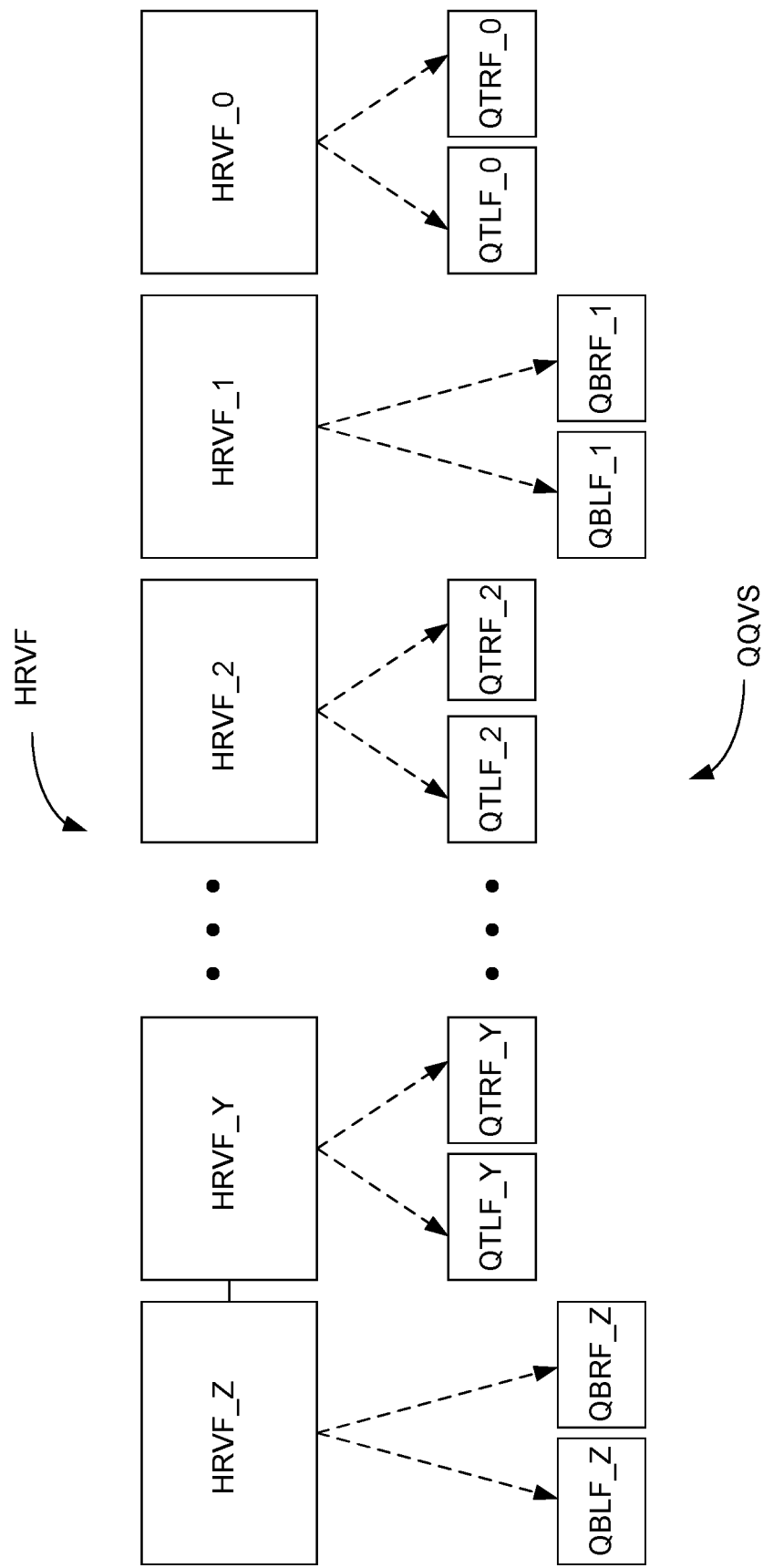
FIG. 19 illustrates the creation of a quad-quincunx video stream from a high resolution video stream in accordance with another embodiment of the present invention.

FIG. 19 illustrates one method to convert a high resolution video stream HRVS into a quad-quincunx video stream QQVS that uses four types of quincunx video fields (i.e. top left, top right, bottom left and bottom right) in accordance with another embodiment of the present invention.

Specifically, high resolution video stream HRVS includes Z+1 high resolution video frames HRVF_0, HRVF_1, HRVF_2, to HRVF_Y, and HRVF_Z, (where Y and Z are positive integer and Y is equal to Z−1). Each frame of high resolution video stream HRVS is sub-sampled to create two quincunx fields. Specifically as shown in FIG. 19, high resolution video frame HRVF_0 is sub-sampled to create quincunx top left field QTLF_0 and quincunx top right field QTRF_0. High resolution video frame HRVF_1 is sub-sampled to create quincunx bottom right field QBRF_1, and quincunx bottom left field QBLF_1. High resolution video frame HRVF_2 is sub-sampled to create quincunx top left field QTLF_2 and quincunx top right field QTRF_2. This process continues for each video frame until high resolution video frames HRVF_Y and HRVF_Z, which are sub-sampled to create quincunx top left field QTLF_Y and quincunx top right field QTRF_Y and quincunx bottom right field QBRF_Z, and quincunx bottom left field QBLF_Z, respectively. In general, the even numbered high resolution video frames are sub-sampled to create quincunx top left fields and quincunx top right fields, and the odd numbered high resolution video frames are sub-sampled to create quincunx bottom right fields and quincunx bottom left fields.

Figure 20:
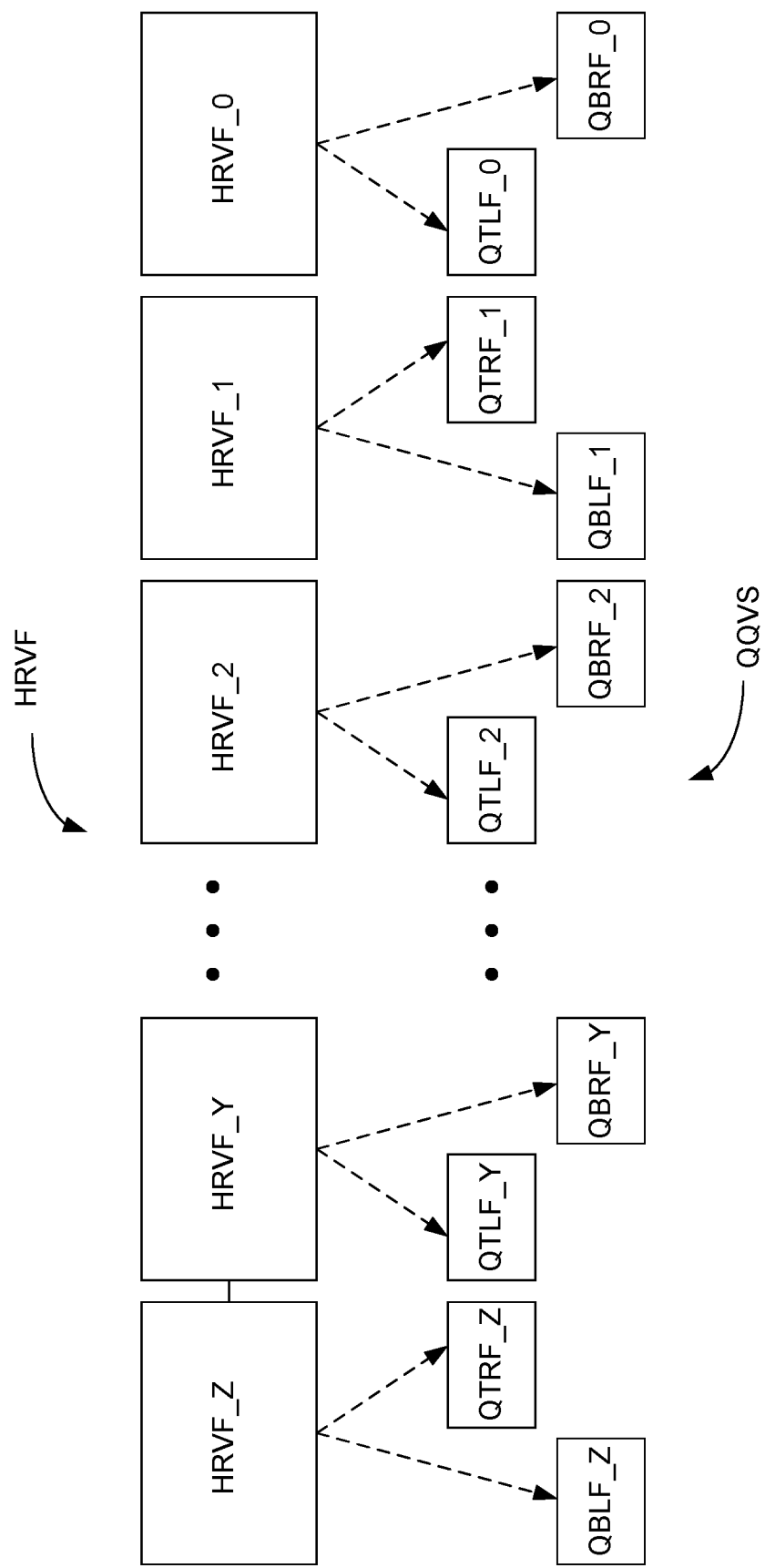
FIG. 20 illustrates the creation of a quad-quincunx video stream from a high resolution video stream in accordance with another embodiment of the present invention.

FIG. 20 illustrates one method to convert a high resolution video stream HRVS into a quad-quincunx video stream QQVS that uses four types of quincunx video fields (i.e. top left, top right, bottom left and bottom right) in accordance with another embodiment of the present invention.

Specifically, high resolution video stream HRVS includes Z+1 high resolution video frames HRVF_0, HRVF_1, HRVF_2, to HRVF_Y, and HRVF_Z, (where Y and Z are positive integer and Y is equal to Z−1). Each frame of high resolution video stream HRVS is sub-sampled to create two quincunx fields. Specifically as shown in FIG. 20, high resolution video frame HRVF_0 is sub-sampled to create quincunx top left field QTLF_0 and quincunx bottom right field QBRF_0. High resolution video frame HRVF_1 is sub-sampled to create quincunx top right field QTRF_1, and quincunx bottom left field QBLF_1. High resolution video frame HRVF_2 is sub-sampled to create quincunx top left field QTLF_2 and quincunx bottom right field QBRF_2. This process continues for each video frame until high resolution video frames HRVF_Y and HRVF_Z, which are sub-sampled to create quincunx top left field QTLF_Y and quincunx bottom right field QBRF_Y and quincunx top right field QTRF_Z, and quincunx bottom left field QBLF_Z, respectively. In general, the even numbered high resolution video frames are sub-sampled to create quincunx top left fields and quincunx bottom right fields, and the odd numbered high resolution video frames are sub-sampled to create quincunx top right fields and quincunx bottom left fields.

As explained above, within quad-quincunx video stream QQVS, each set of quincunx fields created from a high resolution video frame HRVF_X should follow the set of fields created from high resolution video frame HRVF_X−1 and precede the set of fields created from high resolution video frame HRVF_X+1. Thus for example the set of quincunx fields created from high resolution video frame HRVF_1 (i.e. quincunx bottom right field QBRF_1, and quincunx bottom left field QBLF_1) should follow the set of quincunx field created from high resolution video frame HRVF_0 (i.e. quincunx top left field QTLF_0 and quincunx top right field QTRF_0). Conversely, the set of quincunx fields created from high resolution video frame HRVF_1 (i.e. quincunx bottom right field QBRF_1, and quincunx bottom left field QBLF_1) should precede the set of quincunx field created from high resolution video frame HRVF_2 (i.e. quincunx top left field QTLF_2 and quincunx top right field QTRF_2).

Again, the order of the fields in each set can vary between each set or be the same in each set. In a particular embodiment of the present invention, the order in each even numbered set is the quincunx top left field followed by the quincunx top right field, while the order in each odd numbered set is the quincunx bottom right field followed by the quincunx bottom left field. The field rate of quad-quincunx video stream QQVS in FIG. 19 should be two times greater than the frame rate of high resolution video frame HRVF to maintain consistency between the quincunx video stream and the high resolution video stream. The quincunx video stream of FIG. 18 would be half the size quincunx video stream of FIG. 19. Other embodiments of the present invention may divide the types of quincunx field in the even numbered sets and odd numbered sets differently. For example, in another embodiment of the present invention, the even numbered sets of quincunx fields include the quincunx top left field and the quincunx bottom right field, while the odd numbered sets of quincunx fields includes the quincunx top right field and the quincunx bottom left field.

In the various embodiments of the present invention, novel structures and methods have been described for generating a quincunx video stream. The various embodiments of the structures and methods of this invention that are described above are illustrative only of the principles of this invention and are not intended to limit the scope of the invention to the particular embodiment described. For example, in view of this disclosure those skilled in the art can define other quincunx fields, smoothing filters, pixel blocks, configurable multi-electrode pixels, light modulating units, and so forth, and use these alternative features to create a method or system according to the principles of this invention. Thus, the invention is limited only by the following claims.

What is claimed is:

1. A method to generate a quad-quincunx video stream from a high resolution video stream having a plurality of high resolution video frames, the method comprising:
generating a first first-type quincunx field from a first high resolution video frame for the quad-quincunx video stream;
generating a first second-type quincunx field from a second high resolution video frame, wherein the first second-type quincunx field follows the first first-type quincunx field in the quad-quincunx video stream;
generating a first third-type quincunx field from a third high resolution video frame, wherein the first third-type quincunx video field follows the first second-type quincunx field in the quad-quincunx video stream; and
generating a first fourth-type quincunx field from a fourth high resolution video frame, wherein the first fourth-type quincunx video field follows the first third-type quincunx field in the quad-quincunx video stream.

2. The method of claim 1, wherein
the first first-type quincunx field is a top left quincunx field;
the first second-type quincunx field is a bottom right quincunx field;
the first third-type quincunx field is a top right quincunx field; and
the first fourth-type quincunx field is a bottom left quincunx field.

3. The method of claim 1, wherein
the first first-type quincunx field is a top left quincunx field;
the first second-type quincunx field is a top right quincunx field;
the first third-type quincunx field is a bottom right quincunx field; and
the first fourth-type quincunx field is a bottom left quincunx field.

4. The method of claim 1, wherein
the first first-type quincunx field is a top left quincunx field;
the first second-type quincunx field is a bottom right quincunx field;
the first third-type quincunx field is a bottom left quincunx field; and
the first fourth-type quincunx field is a top right quincunx field.

5. The method of claim 1, further comprising:
generating a second third-type quincunx field from the first high resolution video frame, wherein the second third-type quincunx video field follows the first first-type quincunx field in the quad-quincunx video stream; and
generating a second fourth-type quincunx field from the second high resolution video frame, wherein the second fourth-type quincunx video field follows the first second-type quincunx field in the quad-quincunx video stream.

6. The method of claim 5, wherein the second third-type quincunx field precedes the first second-type quincunx field and the second fourth-type quincunx field precedes the first third-type quincunx field.

7. The method of claim 5 further comprising:
generating a second first-type quincunx field from the third high resolution video frame, wherein the second first-type quincunx video field follows the second fourth-type quincunx field in the quad-quincunx video stream; and
generating a second second-type quincunx field from the fourth high resolution video frame, wherein the second fourth-type quincunx video field follows the first third-type quincunx field in the quad-quincunx video stream.

8. The method of claim 7, wherein the second first-type quincunx field precedes the first third-type quincunx field and the second second-type quincunx field precedes the first fourth-type quincunx field.

9. The method of claim 7, wherein
the first first-type quincunx field is a top left quincunx field;
the first second-type quincunx field is a top right quincunx field;
the first third-type quincunx field is a bottom right quincunx field; and
the first fourth-type quincunx field is a bottom left quincunx field.

10. The method of claim 7 further comprising:
generating a third second-type quincunx field from the first high resolution video frame, wherein the third second-type quincunx video field follows the second third-type quincunx field in the quad-quincunx video stream; and
generating a third fourth-type quincunx field from the first high resolution video frame, wherein the third fourth-type quincunx video field follows the third second-type quincunx field in the quad-quincunx video stream.

11. The method of claim 10, wherein the third second-type quincunx field and the third fourth-type quincunx field precede the first second-type quincunx field.

12. The method of claim 10 further comprising:
generating a third first-type quincunx field from the second high resolution video frame, wherein the third first-type quincunx video field follows the third fourth-type quincunx field in the quad-quincunx video stream; and
generating a third third-type quincunx field from the second high resolution video frame, wherein the third third-type quincunx video field follows the third first-type quincunx field in the quad-quincunx video stream.

13. The method of claim 12, wherein the third first-type quincunx field and the third third-type quincunx field precede the first third-type quincunx field.

14. The method of claim 12 further comprising:
generating a fourth second-type quincunx field from the third high resolution video frame, wherein the fourth second-type quincunx video field follows the first third-type quincunx field in the quad-quincunx video stream; and generating a fourth fourth-type quincunx field from the third high resolution video frame, wherein the fourth fourth-type quincunx video field follows the fourth second-type quincunx field in the quad-quincunx video stream.

15. The method of claim 14, wherein the fourth second-type quincunx field and the fourth fourth-type quincunx field precede the first fourth-type quincunx field.

16. The method of claim 14 further comprising:
generating a fourth first-type quincunx field from the fourth high resolution video frame, wherein the fourth first-type quincunx video field follows the fourth fourth-type quincunx field in the quad-quincunx video stream; and
generating a fourth third-type quincunx field from the fourth high resolution video frame, wherein the fourth third-type quincunx video field follows the fourth first-type quincunx field in the quad-quincunx video stream.

17. The method of claim 10, wherein
the first first-type quincunx field is a top left quincunx field;
the first second-type quincunx field is a top right quincunx field;
the first third-type quincunx field is a bottom right quincunx field; and
the first fourth-type quincunx field is a bottom left quincunx field.

18. The method of claim 1, wherein each quincunx pixel in the first first-type quincunx field has an associated pixel in the first high resolution video frame and further comprising calculating each quincunx pixel of the first first-type quincunx field using smoothing filter and a pixel block containing high resolution pixels including the associated pixel.

19. The method of claim 18, wherein the calculating each quincunx pixel of the first first-type quincunx field using smoothing filter and a pixel block containing high resolution pixels including the associated pixel further comprises computing a cross-correlation of the pixel block and the smoothing filter.

20. The method of claim 19, wherein the computing a cross-correlation of the pixel block and the smoothing filter further comprises:
computing a product of each pixel in the pixel block with a corresponding filter value in the smoothing filter to form a plurality of products; and
adding the plurality of products.

* * * * *